(12) United States Patent
Motooka et al.

(10) Patent No.: US 6,229,591 B1
(45) Date of Patent: May 8, 2001

(54) PHOTOGRAPHIC PROCESSOR

(75) Inventors: Eiji Motooka; Masaaki Tsuji; Toshihiko Aizawa, all of Wakayama (JP)

(73) Assignee: Noritsu Koki Co., Ltd., Wakayama-ken (JP)

( * ) Notice: Subject to any disclaimer, the term of this patent is extended or adjusted under 35 U.S.C. 154(b) by 0 days.

(21) Appl. No.: 09/242,421

(22) PCT Filed: Jun. 16, 1998

(86) PCT No.: PCT/JP98/02631

§ 371 Date: Feb. 16, 1999

§ 102(e) Date: Feb. 16, 1999

(30) Foreign Application Priority Data

Jun. 17, 1997 (JP) .................................................... 9-160081
Jun. 17, 1997 (JP) .................................................... 9-160082
Jun. 17, 1997 (JP) .................................................... 9-160273
Jun. 17, 1997 (JP) .................................................... 9-160274

(51) Int. Cl.[7] .................................................... G03B 27/32
(52) U.S. Cl. .................................... 355/27; 355/32; 355/72
(58) Field of Search .................................... 355/27, 28, 40, 355/41

(56) References Cited

U.S. PATENT DOCUMENTS 5,148,216 * 9/1992 Park ........................................ 355/72
5,434,643 * 7/1995 Ishikawa et al. ........................ 355/27
5,790,240 * 8/1998 Ishikawa et al. ........................ 355/68

FOREIGN PATENT DOCUMENTS 0628852   12/1994  (EP) .
0629904   12/1994  (EP) .

* cited by examiner

Primary Examiner—Safet Metjahic
Assistant Examiner—E P. LeRoux
(74) Attorney, Agent, or Firm—Jordan and Hamburg LLP

(57) ABSTRACT

A photographic processing system has a first printing section for printing a film image on photographic paper, a second printing section for printing image data which has been converted into a light signal on the photographic paper, and a common developing section for developing the image exposed on the photographic paper by the first or second printing section. The first printing section and the developing section are disposed adjacent to each other at lower part of the system, and the second printing section is disposed above the first printing section. The second printing section includes a magazine loader unit on which a magazine for setting therein the photographic paper in the form of a roll is mounted with a withdrawal port for the photographic paper opened forward of the system, a first transporter for transporting the photographic paper drawn out from the magazine downward, and a second transporter extending rearward from lower part of the magazine loader unit for transporting the photographic paper transported from the first transporter to the developing section.

19 Claims, 35 Drawing Sheets

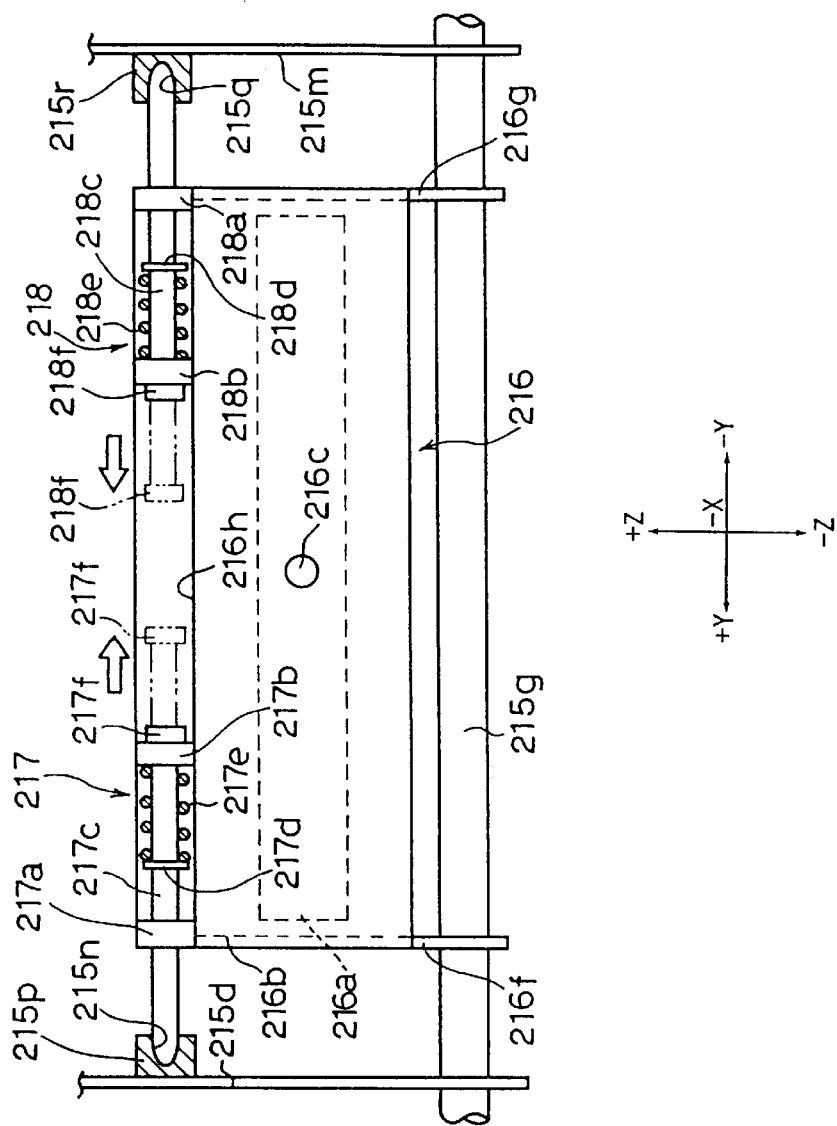
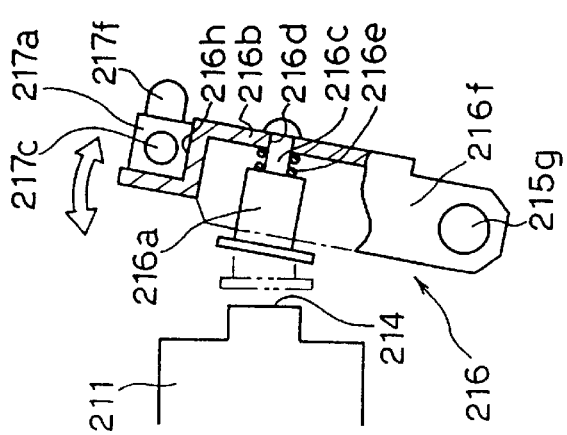
FIG. 23B
FIG. 23A

PHOTOGRAPHIC PROCESSOR

BACKGROUND OF THE INVENTION

The present invention pertains to a photographic processor comprising a printing section for printing an image on photographic paper as a photosensitive material and a developing section for developing the image printed on the photographic paper.

Heretofore, it has been a customary practice, in the field of photographic processing, in case of obtaining a composite image in which a picture image on a film and a character image, such as a comment, on the picture image are jointly displayed, to optically print a picture image on a picture region of photographic paper while covering a character region of the photographic paper with a shield mask, then to optically print a character image on the photographic paper by placing a lithographic film carrying the character image, such as a comment, over the character region of the photosensitive material in a super-imposed manner while covering the picture region with a shield mask, and thereafter to develop the printed image.

In the optical photo processing system for obtaining a composite image of picture image and character image according to the above method, there were various problems such that it takes time to prepare a lithographic film for enabling printing of a character image and that a shield mask is necessary individually for covering the picture region and the character region, which makes it difficult to perform efficient printing of the composite image.

As a means for solving the above problem, there is proposed an idea of digitizing an image by reading a picture image and a character image by an image sensor such as a CCD and preparing a composite image in advance in which the digitized picture image and character image are combined so as to print the composite image on photographic paper. However, in such a digital processing system, a picture image on a film is required to be read by the image sensor even if a character image printing is not necessary, which bears another problem of lowering printing efficiency.

There is another idea of combining the optical photo processing system and the digital photo processing system such that the digital photo processing system is used when a composite image of picture image and character image is printed and the optical photo processing system is used when solely a picture image on a film is printed. The above arrangement of simply combining the optical photo processing system and the digital photo processing system would merely make the whole system large, which becomes another problem.

In view thereof, an object of this invention is to provide a photographic processing system that enables efficient printing of a composite image of picture image and character image without lowering printing efficiency even when solely a picture image on a film is to be printed yet with realizing a compact size of the system.

SUMMARY OF THE INVENTION

To accomplish the above object, a photographic processing system according to this invention comprises: a first printing section including a printing unit for printing a film image onto a photosensitive material by projection; a second printing section including a printing unit for printing image data onto the photosensitive material by converting the image data into a light signal and outputting the light signal; and a common developing section for developing the printed photosensitive material. The first and second printing sections each have a magazine loader unit for mounting thereon a magazine including therein the photosensitive material in a roll form, and a transporter for transporting the photosensitive material drawn out from one of the magazines to the developing section via a corresponding one of the printing units.

According to this arrangement, when only a picture image on a film is printed, the film image is optically printed on the photosensitive material by the first printing section, and the photosensitive material carrying the printed image is transported to the developing section shared by the second printing section for development. When a composite image of picture image and character image is printed, the picture image and the character image which have been digitized and jointed as the composite image are printed on the photosensitive material by the second printing section, and the photosensitive material carrying the printed image is transported to the developing section shared by the first printing section for development.

BRIEF DESCRIPTION OF THE DRAWINGS

FIGS. 23(a) and 23(b) are diagrams of an attachment structure of a presser member in the second printing section in FIG. 3, specifically, FIG. 23(a) being a side view, and FIG. 23(b) being a rear view;

BEST MODE FOR CARRYING OUT THE INVENTION

Figure 1:
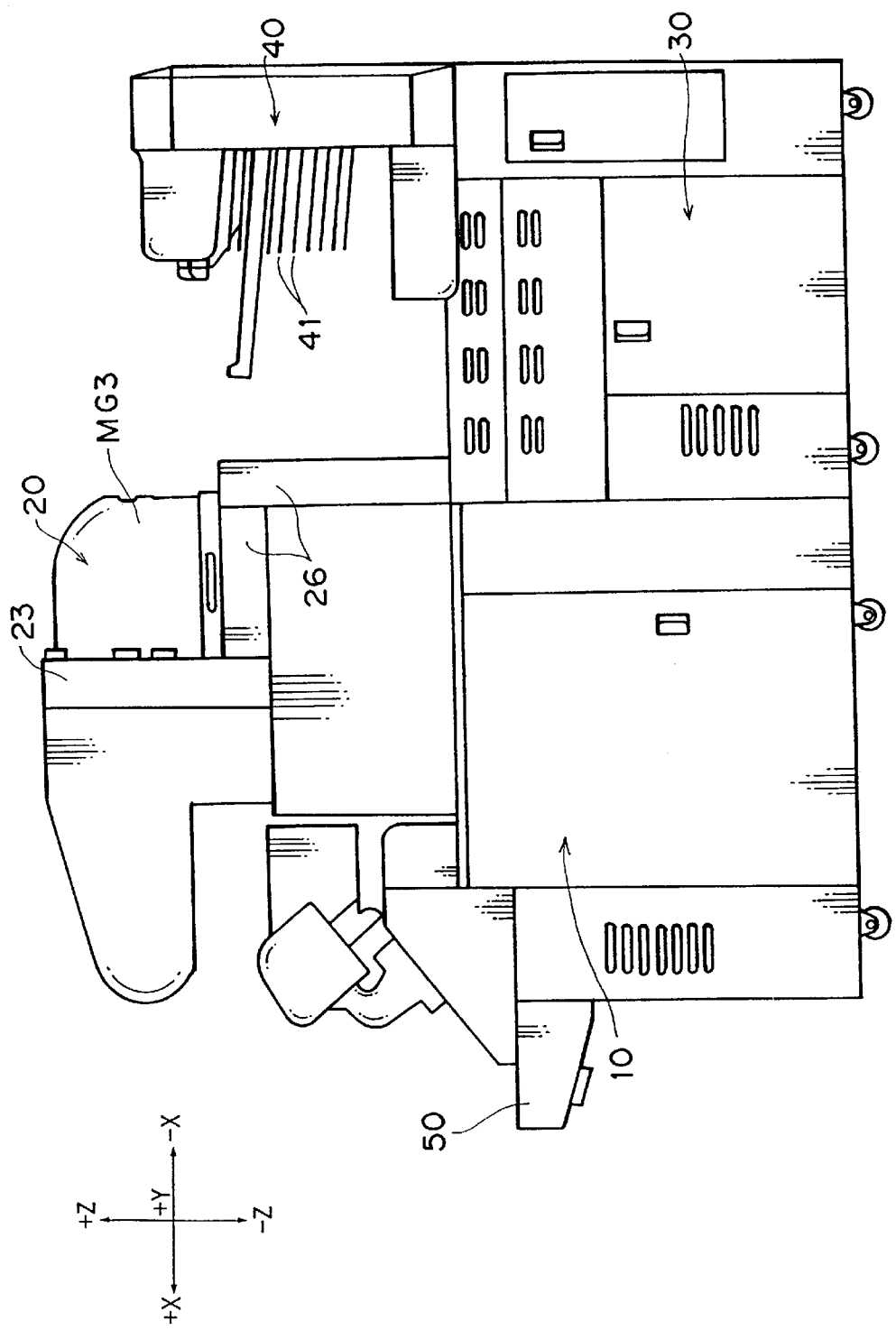
FIG. 1 is a side view of a photographic processing system embodying the present invention.

FIG. 1 is a diagram showing an entire construction of a photographic processing system embodying the present invention. In FIG. 1, X-Y-Z coordinate system is shown to clarify the positional relationship among constituent elements of the system. In FIG. 1, the photographic processing system comprises a first printing section 10 disposed on a forward side of the system (in +X direction), a second printing section 20 disposed above the first printing section 10 (in the +Z direction), a common developing section 30 disposed behind the first printing section (in −X direction), and a paper discharge section 40 disposed above the developing section 30 (in the +Z direction).

An operation panel 50 is provided at a front portion (in +X direction) of the first printing section 10, and is arranged with various keys thereon such as a start switch, a printing section selector key for selecting the first printing section 10 and the second printing section 20, and a magnification setter key for setting a magnification ratio when printing. The operation panel 50 is also provided with a display monitor for confirming the condition set by an operator. With this arrangement, the operator operates the photographic processing system in front of the operation panel 50 (in +X direction).

Figure 2:
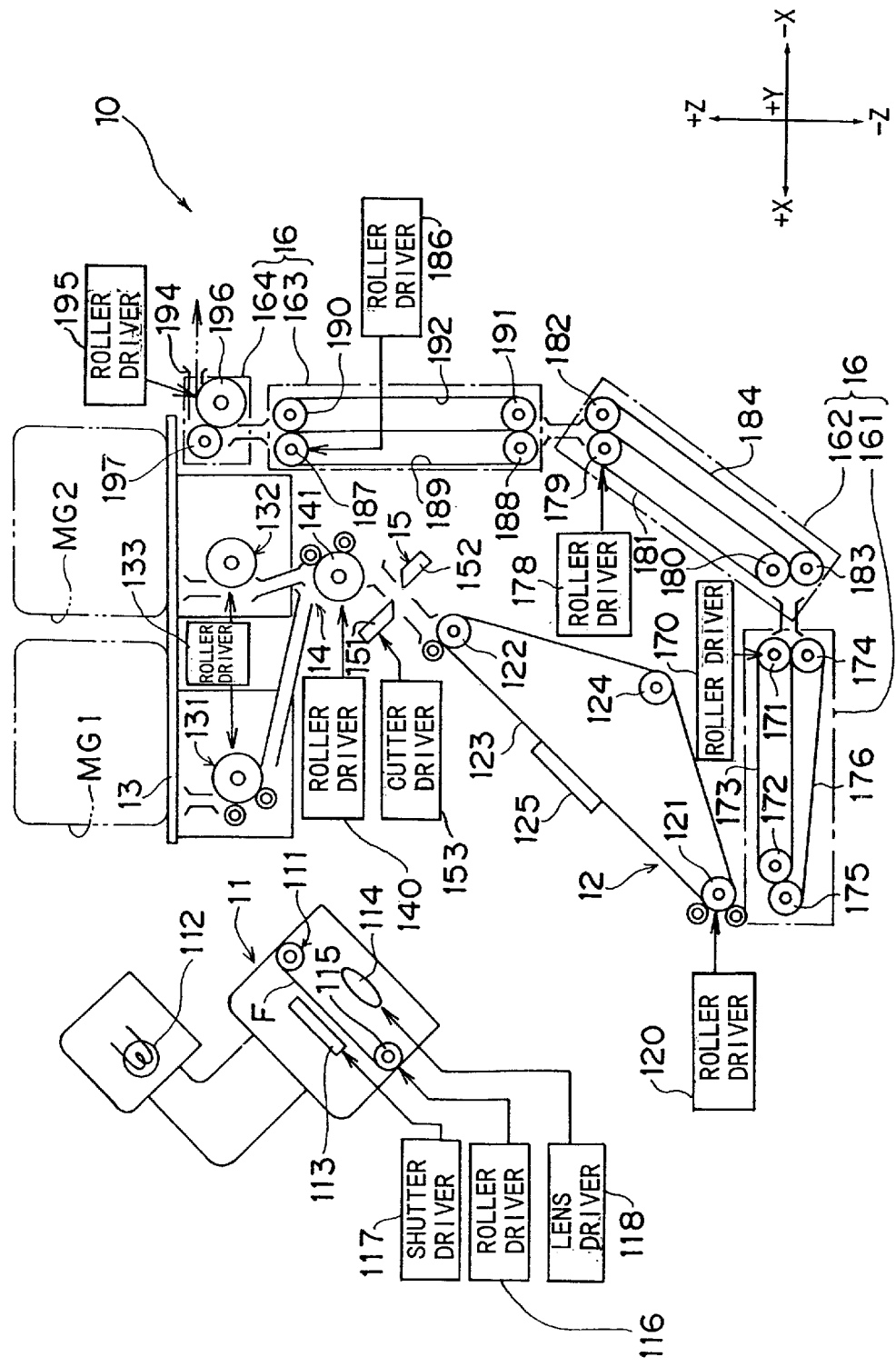
FIG. 2 is a schematic diagram of a first printing section of the photographic processing system in FIG. 1.

FIG. 2 is a schematic diagram of the first printing section 10. In FIG. 2, the first printing section 10 is adapted for printing (exposing) a film image onto photographic paper by projection. The first printing section 10 includes a film image projector 11 disposed at front (in +X direction) and upper (in +Z direction) part thereof, a printing unit (exposing unit) 12 disposed at a center thereof, a magazine loader unit 13 for mounting thereon two magazines in each of which a roll of photographic paper of different size is loaded, a first transporter 14 for transporting the photographic paper selectively drawn out from the first magazine MG1 or the second magazine MG2 mounted on the magazine loader unit 13 to the printing unit 12, a cutter unit 15 disposed between the printing unit 12 and the first transporter 14, and a second transporter 16 for transporting the photographic paper after the printing by the printing unit 12 to the developing section 30.

The film image projector 11 includes a film feeder unit 111 for feeding a developed negative film F frame after frame to a printing position, a light source 112 such as a halogen lamp disposed above the negative film F which is fed by the film feeder unit 111, a shutter 113 disposed between the negative film F and the light source 112, and an optic lens 114 for focusing a film image onto a plane of photographic paper transported at the printing position of the printing unit 12. The optic lens 114 is set at such an oblique state as to project light from the light source 112 onto the printing position of the printing unit 12 provided at the center of the first printing section 10.

The film feeder unit 111 includes a take up roller 115 for winding the negative film F, and a roller driver unit 116 including a DC motor for driving the take up roller 115 to intermittently feed the negative film F frame by frame to the printing position. The shutter 113 is operatively opened and closed by a shutter driver unit 117 including a DC motor. The optic lens 114 is arranged in spaced relation from the plane of the photographic paper by a lens driver unit 118 including a DC motor to accurately focus a film image onto the plane of the photographic paper.

The printing unit 12 includes a drive roller 121 which is rotatably driven by a roller driver unit 120 including a DC motor, a driven roller 122, a transport belt 123 wound between the drive roller 121 and the driven roller 122, a tension roller 124 for applying a specified tension force to the transport belt 123, and a shield mask 125 for shielding a specified region of the photographic paper while pressing the photographic paper transported over the transport belt 123 against the transport belt 123. The shield mask 125 is so obliquely arranged as to set the plane of the photographic paper transported over the transport belt 123 normal to an optic axis of the light source 112.

The magazine loader unit 13 is disposed behind the film image projector 11 (in −X direction) and includes a first feed roller 131 beneath the first magazine MG1 and a second feed roller 132 beneath the second magazine MG2. The magazine loader unit 13 is operated such that selectively rotating the first feed roller 131 or the second feed roller 132 by the roller driver unit 133 including a DC motor selectively draws out the photographic paper of different size loaded in the first magazine MG1 or the second magazine MG2.

The first transporter 14 includes a transport roller 141 driven by a roller driver unit 140 including a DC motor to transport the photographic paper drawn out from the first magazine MG1 or the second magazine MG2 toward the printing unit 12.

The cutter unit 15 includes a first blade 151 arranged on the same side of the photographic paper as the film image is printed, and a second blade 152 arranged on the opposite side of the printing side of the photographic paper. The first blade 151 is vertically moved by a cutter driver unit 153 including a DC motor to cut the roll of photographic paper transported along a first transport path 14 at a predetermined length. The cut sheets of photographic paper, each having the predetermined length, are successively conveyed on the transport belt 123 of the printing 12 toward the center of the printing unit 12.

The second transporter 16 includes a transverse transport unit 161 for transversely transporting the cut sheet of photographic paper (hereafter, simply referred to as "cut sheet") discharged from the printing unit 12 toward the rear part of the system (in −X direction), an oblique transport unit 162 for transporting the cut sheet discharged from the transverse transport unit 161 obliquely and upwardly (in −X and +Z direction), a vertical transport unit 163 for transporting the cut photographic sheet discharged by the oblique transport unit 162 upward (in +Z direction), and a discharge unit 164 for feeding the cut sheet discharged from the vertical transport unit 163 to the developing section 30.

The transverse transport unit 161 includes an upper transport belt 173 wound between a drive roller 171 driven by a roller driver unit 170 including a DC motor and a driven roller 172, and a lower transport belt 176 wound between a drive roller 174 driven by the roller driver unit 170 and a driven roller 175. The upper transport roller 173 and the lower transport roller 176 are disposed close to each other to transport the cut sheet rearward while nipping the same therebetween.

The oblique transport unit 162 includes a left transport belt 181 wound between a drive roller 179 driven by a roller driver unit 178 including a DC motor and a driven roller 180, and a right transport belt 184 wound between a drive roller 182 driven by the roller driver unit 178 and a driven roller 183. The left transport roller 181 and the right transport roller 184 are disposed close to each other to transport the cut sheet obliquely and upwardly while nipping the same therebetween.

The vertical transport unit 163 includes a left transport belt 189 wound between a drive roller 187 driven by a roller driver unit 186 including a DC motor and a driven roller 188, and a right transport belt 192 wound between a drive roller 190 driven by the roller driver unit 186 and a driven roller 191. The left transport roller 189 and the right transport roller 192 are disposed close to each other to transport the cut sheet upward while nipping the same therebetween.

The discharge unit 164 includes a transport path 194 for transporting the cut photographic sheet to the developing section 30, a drive roller 196 driven by a roller driver unit 195 including a DC motor, and a driven roller 197 in pressing contact with the drive roller 196 to transport the cut sheet along the transport path 194 while nipping the same between the drive roller 196 and the driven roller 197.

Figure 3:
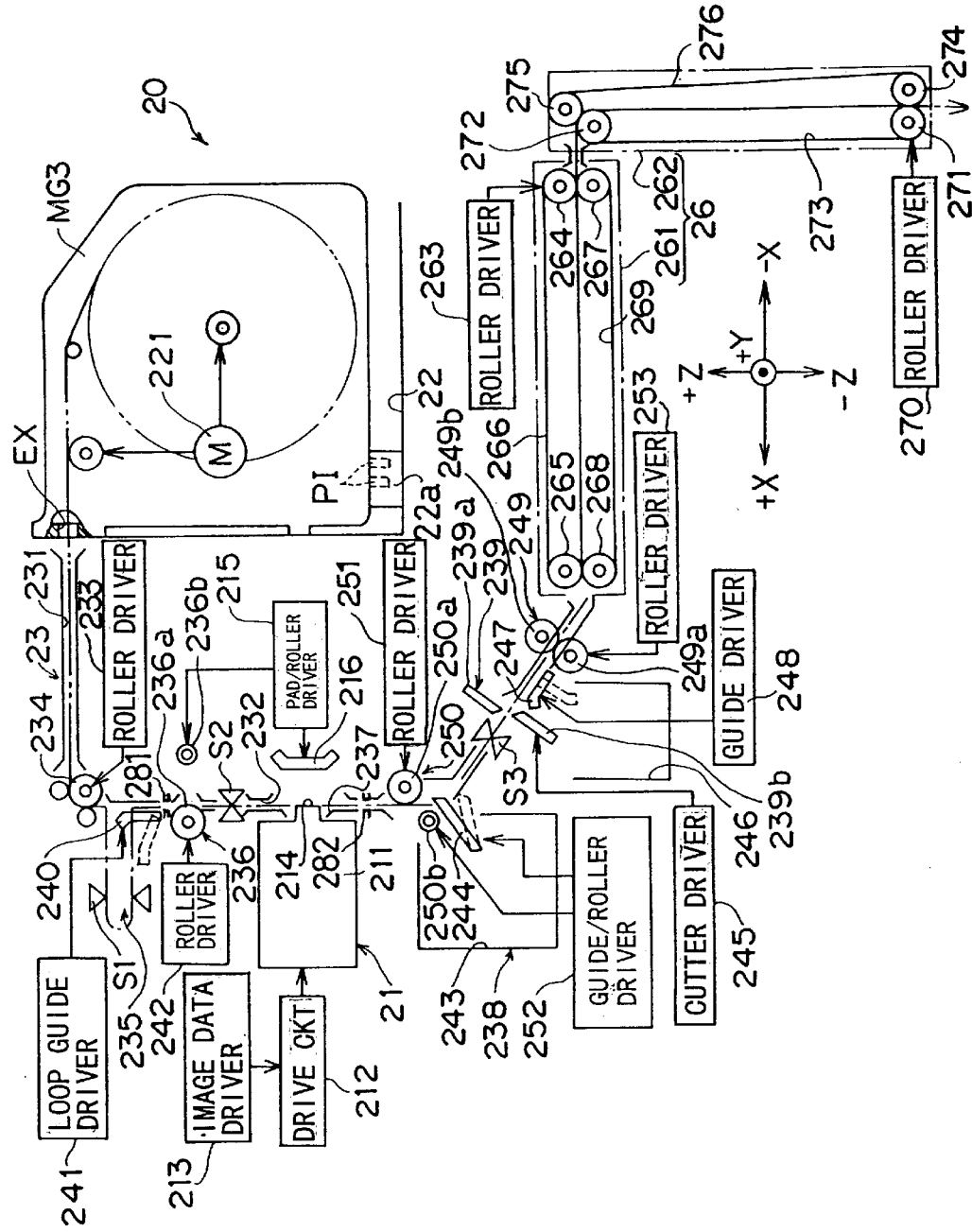
FIG. 3 is a schematic diagram of a second printing section of the photographic processing system in FIG. 1.

FIG. 3 is a schematic diagram of the second printing section 20. In FIG. 3, the second printing section 20 prints a digital image onto photographic paper as a photosensitive material, and comprises an image transfer unit 21 disposed at a forward portion (in +X direction) thereof, a magazine loader unit 22 disposed behind the image transfer unit 21 (in −X direction) for mounting thereon a magazine MG3 in which a roll of photographic paper is set, a first transporter 23 for transporting the photographic paper drawn out from the magazine MG3 mounted on the magazine loader unit 22 downstream via the image transfer unit 21, and a second transporter 26 for transporting the photographic paper that has been transported from the first transporter 23 and printed by the image transfer unit 21 to the developing section 30.

The image transfer unit 21 includes an image display device 211 having a fiber optic cathode ray tube (FOCRT)

for displaying an image, a drive circuit 212 for driving the image display device 211, and an image data output unit 213 for outputting image data to the drive circuit 212. The image display device 211 is arranged such that an image display plane 214 thereof is directed rearward (in −X direction) of the system. A pressing pad 216 is disposed at such a position as to oppose to the image display plane 214 of the image display device 211. The pressing pad 216 is moved toward and away from the image display device 211 by a pad/roller driver unit 215 including a DC motor and a cam drive mechanism. Specifically, the pressing pad 216 is pressed against the image display plane 214 during an image printing by the image display device 211 to prevent the photographic paper from being displaced from the image display plane 214. An arrangement of the pad/roller driver unit 215 is described below.

The image data output unit 213 outputs image data obtained by picking up a picture image such as a film image by an image sensor such as a Charge Coupled Device (CCD) line after line or several lines after lines after a specified image processing, and also outputs character image data that has been inputted through an external device such as a personal computer line after line or several lines after lines after a specified image processing.

The magazine loader unit 22 is such that the magazine MG3 is so arranged as to set a withdrawal port EX thereof for drawing out the photographic paper upward (in +Z direction) with front part thereof directed forward (in +X direction). The magazine loader unit 22 is so operated as to draw out the photographic paper set in the magazine MG3 through the withdrawal port EX by a magazine drive motor 221.

Figure 4A:
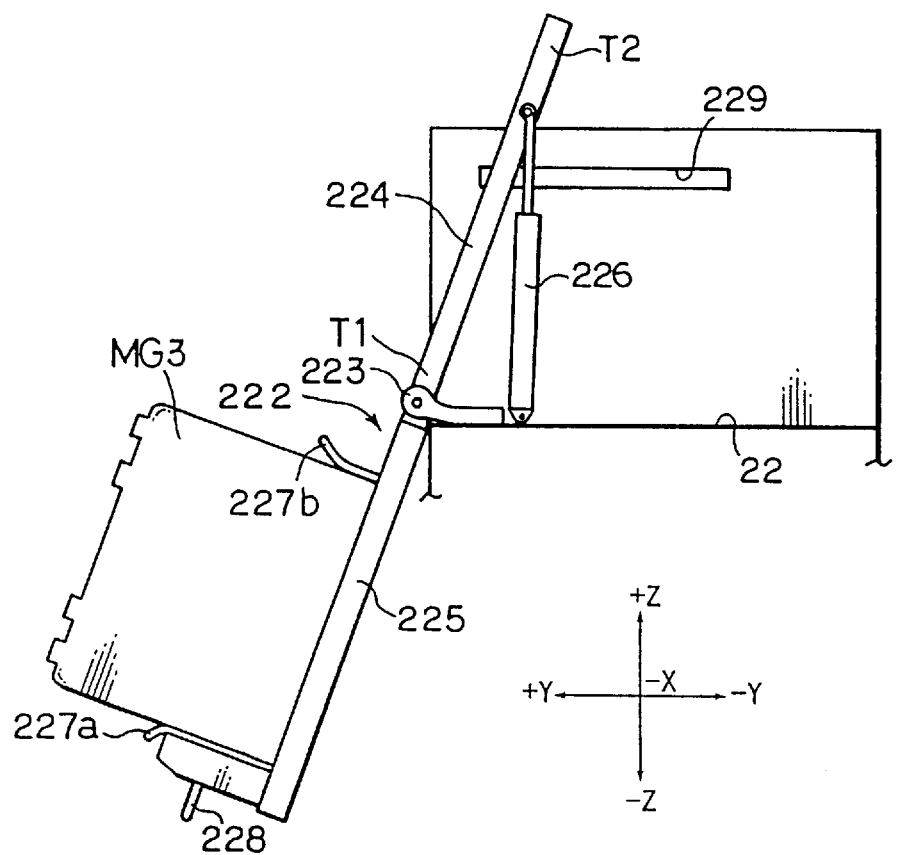
FIGS. 4(a) and 4(b) are diagrams of a magazine loader mechanism of a magazine loader unit in the second printing section shown in FIG. 3, specifically, FIG. 4(a) showing a state that a magazine loading base is inclined downward relative to the magazine loader unit, and FIG. 4(b) showing a state that the magazine loading base is lifted upward.
Figure 4B:
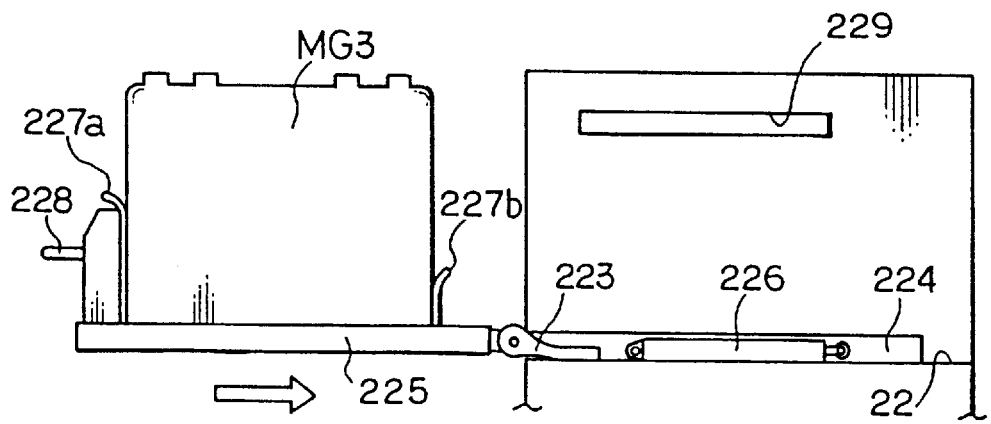

The magazine loader unit 22 includes, as shown in FIGS. 4(a) and 4(b), a magazine loader mechanism 222. FIGS. 4(a) and 4(b) are diagrams of the magazine loader unit 22 viewed from rearward direction (in −X direction). However, the terms "left" and "right" in this section denote left and right respectively viewed from forward direction (in +X direction). Specifically, the magazine loader mechanism 222 includes a pair of support members 223 (only rear support member 223 is shown in FIGS. 4(a) and 4(b)) provided at a right end (in +Y direction) of the magazine loader unit 22 at respective opposite ends in the depth direction of the system (in X direction), a pair of guide rails 224 (only the rear guide rail 224 is shown in FIGS. 4(a) and 4(b)) each supported on the magazine loader unit 22 via the corresponding support member 223 to be pivotable about an axis of rotation near one end T1 so as to vertically and pivotally move the opposite end T2, a magazine loading base 225 mounted on the guide rails 224 to be slidable in and out of the guide rails 224 in the length direction thereof, and a brake member 226 such as a hydraulic damper mounted between a certain position on a lower portion of the magazine loader unit 22 and a certain position on the side of the opposite end T2 of each of the guide rails 224.

The magazine loading base 225 is such that, as shown in FIGS. 4(a) and 4(b), sliding the magazine loading base 225 in +Y direction along the guide rails 224 extensively projects the magazine loader unit 22 outward (in +Y direction). Position fixing plates 227a, 227b are formed upright respectively at opposite ends (in Y direction) of the magazine loading base 225. A handle bar 228 extending outward is provided at the right position fixing plate 227a. Reference numeral 229 denotes a paper guide outlet formed in the magazine loader unit 22 at a position corresponding to a withdrawal port EX of the magazine MG3.

In order to mount the magazine MG3 on the magazine loader unit 22 using the magazine loader mechanism 22 having the above construction, as shown in FIG. 4(a), the magazine MG3 is loaded onto the magazine loading base 225 while sliding the same downward along the position fixing plates 227a and 227b when the magazine loading base 225 is projected out and tilted down with the right side of the guide rails 224 (+Y direction side) slanting downward. Then, gripping the handle bar 228 and exerting an upward directing force to the magazine loader unit 225 pivotally lifts the guide rails 224 upward about the axis of rotation of the support members 223 so as to lift the magazine loading base 225 up to the position shown in FIG. 4(b).

Thereafter, sliding the magazine loading base 225 into the guide rails 224 in the direction shown by the arrow in FIG. 4(b) (in −Y direction) sets the magazine loading base 225 at a specified position of the magazine loader unit 22. Thereby, even if the magazine MG3 is relatively heavy, the magazine MG3 can be easily loaded onto the magazine loader unit 22 even though set at a high level.

The brake member 226 applies a brake force to the guide rails 224 to prevent abrupt rotation of the guide rails 224 and fall of the magazine MG3 loaded on the magazine loading base 225. The magazine loader unit 22 is provided with a locking member (not shown) for preventing a displacement of the magazine loading base 225 which has been set at the specified position on the magazine loader unit 22 from the position shown in FIG. 4(b). Moving the magazine loading base 225 in accordance with an order opposite to the above order enables unloading of the magazine MG3 from the magazine loader unit 22.

Referring back to FIG. 3, the first transporter 23 includes a transverse transport unit 231 for transversely transporting photographic paper drawn out from the magazine MG3 through the withdrawal port EX, and a vertical transport unit 232 for transporting the photographic paper downward after altering the feeding direction of photographic paper transported by the transverse transport unit 231 by 90°. A first transport roller pair 234, driven by a roller driver unit 233 including a DC motor, is provided at a position between the transverse transport unit 231 and the vertical transport unit 232. The photographic paper drawn out from the magazine MG3 and guided along the transverse transport unit 231 is transported to the vertical transport unit 232 by the first transport roller pair 234.

A loop forming section 235 is provided in the vertical transport unit 232 at a position near the first transport roller pair 234, and a second transport roller pair 236 is provided downstream of the loop forming section 235. A printing unit 237 is provided downstream of the second transport roller pair 236, and a storage section 238 and a cutter unit 239 are provided downstream of the printing unit 237 in this order.

The loop forming section 235 has a function of temporarily storing the photographic paper that has been transported by the first transport roller pair 234 in a loop form to restart downstream transport of the photographic paper at a stabilized transport pitch (transport rate), and includes a loop guide 240 that pivotally changes its posture about a lower end thereof between the first position shown by the solid line in FIG. 3 and the second position shown by the imaginary line in FIG. 3, and a loop guide driver unit 241 including a DC motor for switching the state of the loop guide 240 between the first position and the second position. When the loop guide 240 is set at the first position, the loop guide 240 forms part of the vertical transport unit 232. The loop forming section 235 is provided with a loop sensor S1 for detecting whether the photographic paper forming a loop in the loop forming section 235 reaches a predetermined length.

The second transport roller pair 236 includes a drive roller 236a driven by a roller driver unit 242 including a DC motor, and a driven roller 236b which is driven to be moved toward and away from the drive roller 236a by the pad/roller driver unit 215. A lead end sensor S2 is provided between the second transport roller pair 236 and the printing unit 237 to detect the lead end of the photographic paper. The pad/roller driver unit 215 is so constructed as to drive a common DC motor to pressingly move the pressing pad 216 toward and away from the image display device 211, while pressingly moving the driven roller 236b toward and away from the drive roller 236a.

Figure 5A:
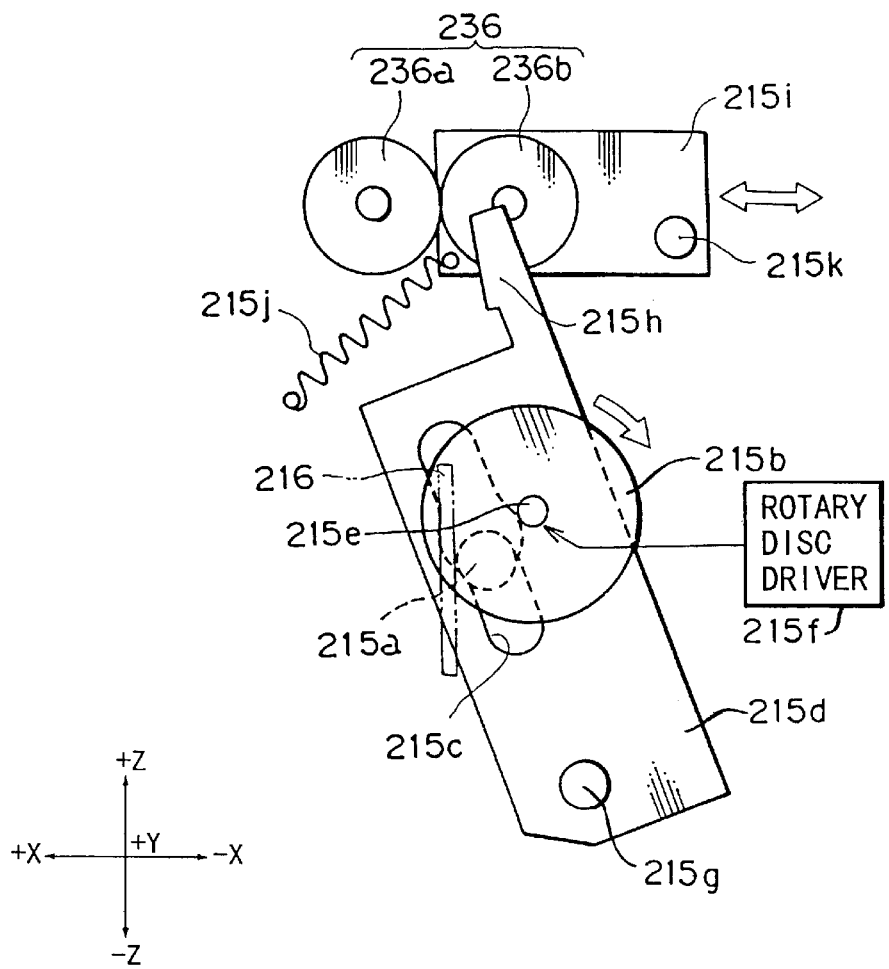
FIGS. 5(a) and 5(b) are diagrams showing a construction of a pad/roller driver unit in the second printing section shown in FIG. 3, specifically, FIG. 5(a) showing the construction of the driver unit, and FIG. 5(b) showing a movement of a rotary plate of the driver unit.

Specifically, the pad/roller driver unit 215 includes, as shown in FIG. 5(a), a rotary disc 215b disposed below the driven roller 236b (in the −Z direction) with a cam follower 215a provided at a periphery thereof, a cam plate 215d formed with a hole 215c through which the cam follower 215a slides, and a rotary disc driver unit 215f including a DC motor for rotating the rotary disc 215b about a center of rotation 215e. The cam plate 215d is formed with a projecting piece 215h at an upper part thereof. Sliding the cam follower 215a along the hole 215c in association with a rotation of the rotary disc 215b pivots the cam plate 215d about an axis of pivot shaft 215g provided at a lower position of the cam plate 215d.

A pivot plate (not shown) which pivotally rotates about the axis of a pivot shaft 215g in unison with the cam plate 215d is provided at a position opposing to the cam plate 215d in spaced relation thereto. The pressing pad (presser member) 216 is detachably attached to the cam plate 215d between the cam plate 215d and the pivot plate. The pressing pad 216 moves between a contact position in contact with the image display plane 214 of the image display device 211 and a spaced position away from the image display plane 214 in association with a pivotal movement of the cam plate 215d and the pivot plate.

The driven roller 236b is mounted on a movable plate 215i at a forward portion (in +X direction) thereof. The movable plate 215i is movable in the depth direction of the system (in X direction), and is biased forward (in +X direction) by a coil spring 215j to render the driven roller 236b in pressing contact with the drive roller 236a. The movable plate 215i is formed with a roller 215k at a rear portion (in −X direction) thereof. Pivotally rotating the cam plate 215d in such a direction as to cause the projecting piece 215h to abut against the roller 215k moves the movable plate 215i rearward (in −X direction) against a biasing force of the coil spring 215j. When the movable plate 215i is moved rearward, the driven roller 236b is spaced away from the drive roller 236a.

Figure 5B:
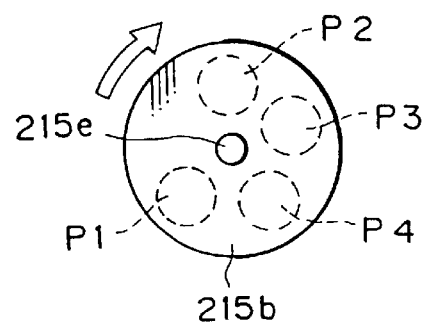

In the pad/roller driver unit 215 having the above arrangement, when the rotary disc 215b is rotated in the direction shown by the arrow in FIG. 5(a) and the cam follower 215a reaches the first position P1 shown by the solid line in FIG. 5(b), the cam plate 215d moves to the position shown in FIG. 5(a). In this state, the driven roller 236b is pressed against the drive roller 236a, and the pressing pad 216 is elastically rendered in pressing contact with the image display plane 214 of the image display device 211.

When the cam follower 215a reaches the second position P2 shown by the dashed line in FIG. 5(b), the cam plate 215d is moved slightly rearward (−X direction) from the position shown in FIG. 5(a). At this time, the pressing pad 216 is moved away from the image display plane 214 of the image display device 211. However, since the projecting piece 215h of the cam plate 215d does not press the roller 215k of the movable plate 215i, the driven roller 236b is kept in pressing contact state with the drive roller 236a.

Next, when the cam follower 215a reaches the third position P3 shown by the dashed line in FIG. 5(b), the cam plate 215d is moved slightly further rearward (−X direction) from the position shown in FIG. 5(a). At this time, the pressing pad 216 is further moved away from the image display plane 214 of the image display device 211. At this time, since the projecting piece 215h of the cam plate 215d presses the roller 215k of the movable plate 215i, the driven roller 236b is set away from the drive roller 236a.

Further, when the cam follower 215a reaches the fourth position P4 shown by the dashed line in FIG. 5(b), the cam plate 215d is moved slightly forward (+X direction) compared to the position when the cam follower 215a is set at the third position P3. At this time, the pressing pad 216 approaches toward the image display plane 214 of the image display device 211 compared to the state when the cam follower 215a is set at the third position P3, but does not come into actual contact with the image display plane 214. At this time, since the projecting piece 215h of the cam plate 215d is set away from the roller 215k of the movable plate 215i, the driven roller 236b is pressed against the drive roller 236b by the biasing force of the coil spring 215j.

With the above arrangement of the pad/roller driver unit 215, the pressing pad 216 and the driven roller 236b are moved in association with each other at an accurate timing and with a simplified construction.

Referring back to FIG. 3, the printing unit 237 has a hollow portion for performing an image exposure onto the photographic paper, and the hollow portion is formed by partially cutting away the vertical transport unit 232. The image display device 211 is arranged on the forward side (+X direction) of the printing unit 236 with the image display plane 214 thereof opposing to the vertical transport unit 232, and the pressing pad 216 is provided on the rear side (−X direction) of the printing unit 236.

The storage section 238 has a function of passing the photographic paper by the hollow portion of the printing unit 237 to temporarily store the photographic paper which has been transported downstream by a certain length prior to printing. The storage section 238 includes a paper housing box 243 disposed below the image display device 211 for storing the certain length of the photographic paper therein, and a guide plate 244 for guiding the certain length of the photographic paper that has been transported from upstream into the paper housing box 243.

The guide plate 244 is so arranged as to change its posture between the first position shown by the solid line in FIG. 3 and the second position shown by the imaginary line in FIG. 3. A third transport roller pair 250 including a drive roller 250a and a driven roller 250b which is movable toward and away from the drive roller 250a is provided immediately above the guide plate 244. The drive roller 250a is arranged rearward (in −X direction) and above (in the +Z direction) the driven roller 250b. In other words, the driven roller 250b is arranged forward (in +X direction) and below (in the −Z direction) of the drive roller 250a. The drive roller 250a is rotated by a roller driver unit 251 including a DC motor, and the driven roller 250b is driven in association with the movement of the guide plate 244 by a guide/roller driver unit 252 including a DC motor and a cam mechanism which is described below.

Figure 6A:
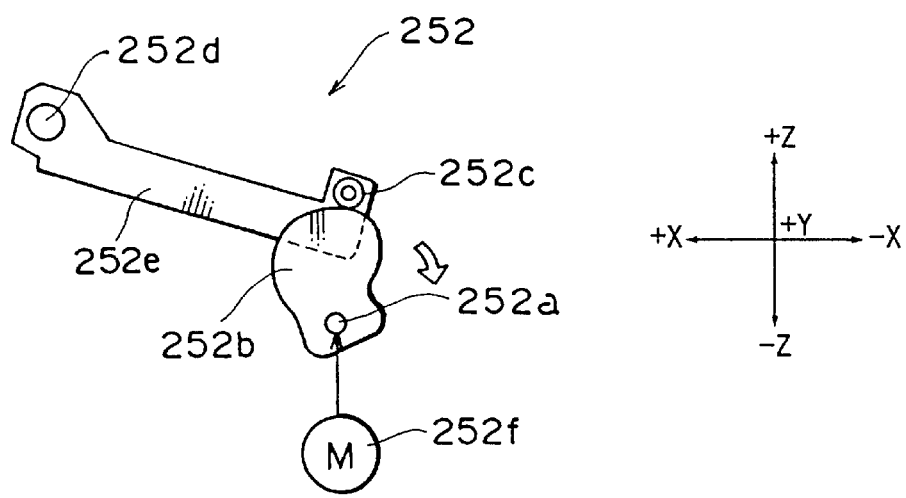
FIGS. 6(a) and 6(b) are diagrams showing a construction of a guide/roller driver unit in the second printing section shown in FIG. 3, specifically FIG. 6(a) showing the construction of the driver unit, and FIG. 6(b) showing a movement of a guide plate and a third transport roller pair.
Figure 6B:
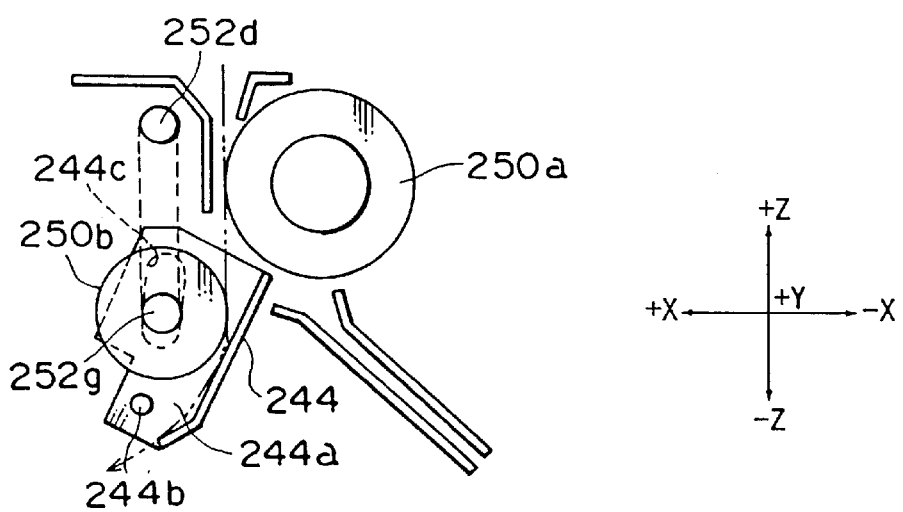

The guide/roller driver unit 252 includes, as shown in FIG. 6(a), a cam plate 252b pivotally rotatable about a pivot 252a, an arm 252e with one end thereof integrally attached with a pivot 252d located at a forward side of the cam plate 252b (in +X direction) and the opposite end thereof mounted with a cam follower 252c that slides along the perimeter of the cam plate 252b to render the arm 252e pivotable about the pivot 252d, and a DC motor 252f for driving the cam plate 252b. A pivot member 252g is, as shown in FIG. 6(b), integrally mounted on the arm 252e below the pivot member 252d (in the −Z direction) to pivot the arm 252e about the pivot member 252d. The driven roller 250b is rotatably supported on the arm 252e about the pivot member 252g.

The guide plate 244 is, as shown in FIG. 6(b), formed with side plates 244a respectively provided at opposite widthwise ends (in Y direction) (only one side plate 244a is shown in FIG. 6(b)) which is pivotable about a pivot 244b passing through the side plate 244a. An oblong through hole 244c is formed at a substantially center of the side plate 244a, and the pivot member 252g is fitted in the through hole 244c.

In the guide/roller driver unit 252 having the above construction, when the cam plate 252b is rotated in the arrow direction in FIG. 6(a), and the arm 252e is set at the position shown in FIG. 6(a), the pivot member 252g is moved to the position substantially immediately below the pivot 252d as shown in FIG. 6(b). At this time, the driven roller 250b is spaced away from the drive roller 250a to define a large clearance between the drive roller 250a and the driven roller 250b. At this time, the guide plate 244 is set at such a position, as shown in shown in FIG. 6(b), closest to a substantially upright posture to guide the photographic paper that has been transported from upstream through the large clearance between the drive roller 250a and the driven roller 250b into the paper housing box 243.

Figure 7A:
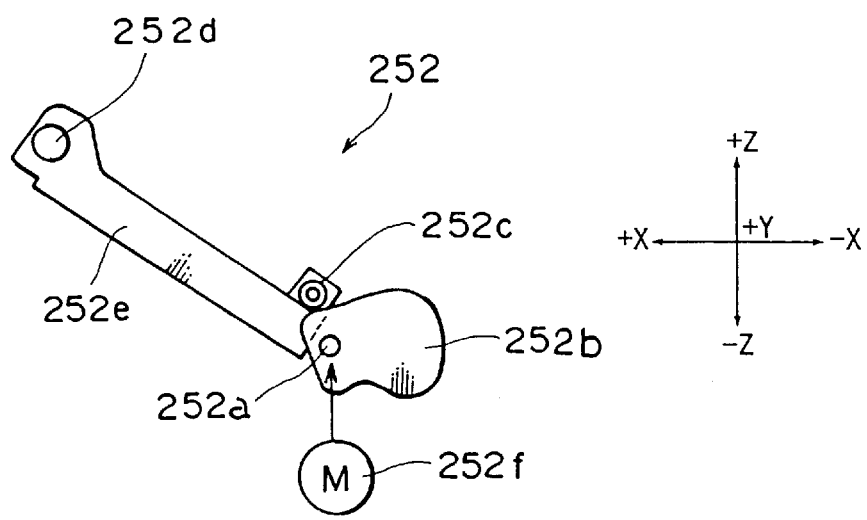
FIGS. 7(a) and 7(b) are diagrams showing the construction of the guide/roller driver unit in the second printing section shown in FIG. 3, specifically FIG. 7(a) showing the construction of the driver unit, and FIG. 7(b) showing a movement of the guide plate and the third transport roller pair.
Figure 7B:
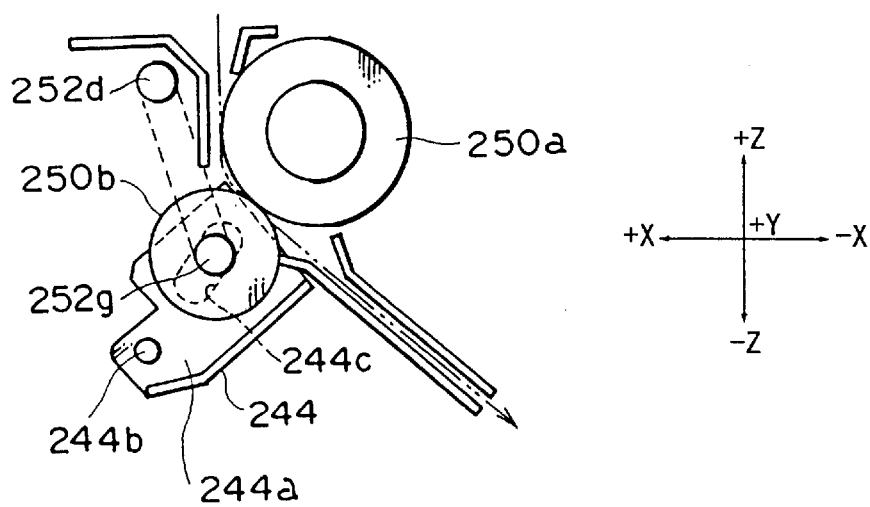

On the other hand, when the arm 252e is set at the position shown in FIG. 7(a), the pivot member 252g is moved to the position shown in FIG. 7(b) located rearward (in −X direction) of the position of FIG. 6(b). At this time, the driven roller 250b is moved toward the drive roller 250a. However, there is provided a small clearance between the drive roller 250a and the driven roller 250b to pass the photographic paper without difficulty. At this time, the guide plate 244 is, as shown in FIG. 7(b), tilted to such a position below the third transport roller pair 250 located downstream of the vertical transport unit 232 as to open the downstream side of the third transport roller pair 250 along the vertical transport unit 232. As a result, as shown by the arrow in FIG. 7(b), the photographic paper that has been transported from upstream passes through the small clearance between the drive roller 250a and the driven roller 250b and is guided downstream of the vertical transport unit 232.

Figure 8A:
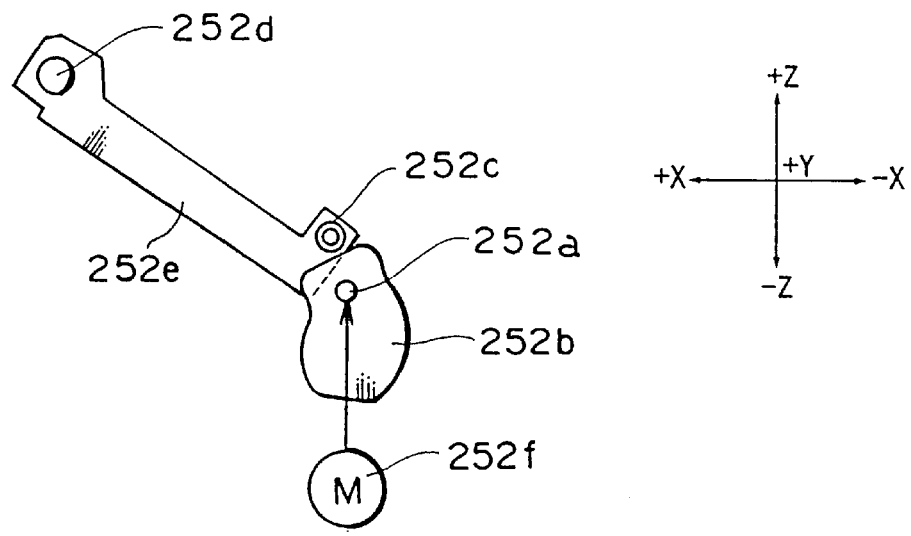
FIGS. 8(a) and 8(b) are diagrams showing the construction of the guide/roller driver unit in the second printing section shown in FIG. 3, specifically FIG. 8(a) showing the construction of the driver unit, and FIG. 8(b) showing a movement of the guide plate and the third transport roller pair.
Figure 8B:
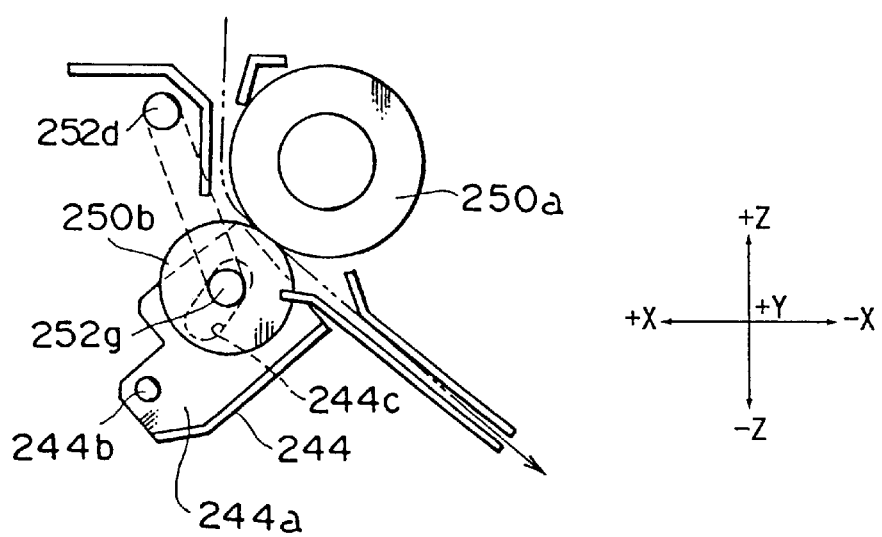

When the arm 252e is set at the position shown in FIG. 8(a), the pivot member 252g is moved to the position shown in FIG. 8(b) which is further rearward (in −X direction) of the position in FIG. 7(b). At this time, the driven roller 250b is in pressing contact with the drive roller 250a, and the guide plate 244 is set at the substantially same position as FIG. 7(b). As a result, as shown by the arrow in FIG. 8(b), the photographic paper that has been transported from upstream is transported downstream of the vertical transport unit 232 while securely nipped between the third transport roller pair 250.

Figure 9A:
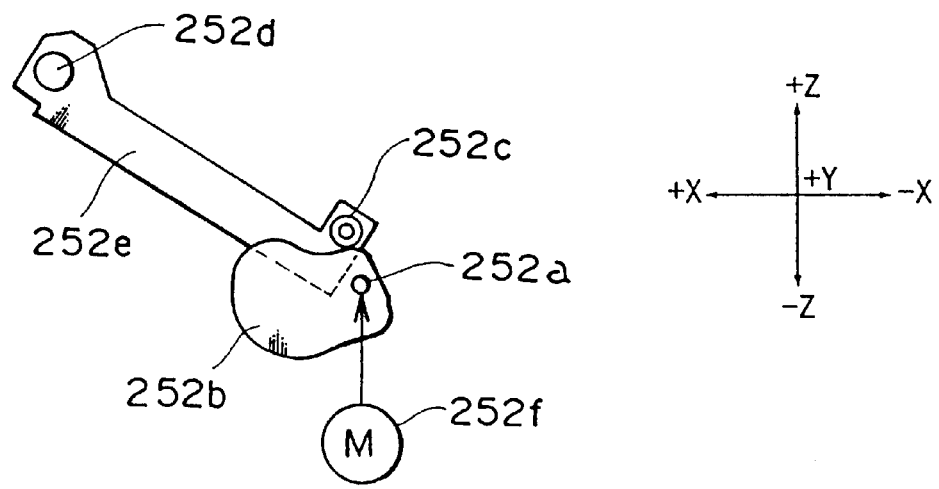
FIGS. 9(a) and 9(b) are diagrams showing the construction of the guide/roller driver unit in the second printing section shown in FIG. 3, specifically FIG. 9(a) showing the construction of the driver unit, and FIG. 9(b) showing a movement of the guide plate and the third transport roller pair.
Figure 9B:
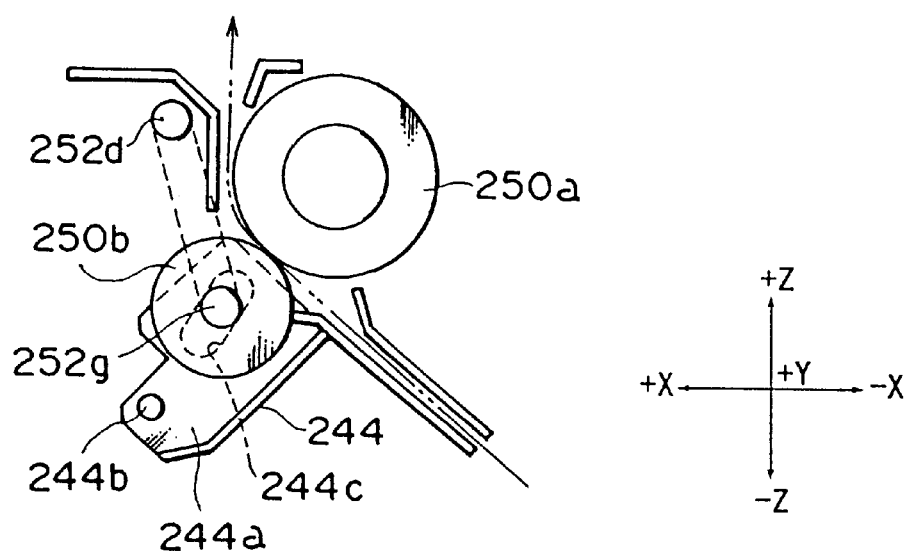

Further, when the arm 252e is set at the position shown in FIG. 9(a), the pivot member 252g is moved to the position shown in FIG. 9(b) which is slightly forward (in +X direction) of the position in FIG. 7(b). At this time, the driven roller 250b is spaced away from the drive roller 250a to define a small clearance between the drive roller 250a and the driven roller 250b to pass the photographic paper without difficulty. At this time, the guide plate 244 is set at the substantially same position as FIG. 7(b), and as shown by the arrow in FIG. 9(b), the photographic paper is fed backward toward upstream of the cutter unit 239 while passing through the clearance between the drive roller 250a and the driven roller 250b.

With the above arrangement of the guide/roller driver unit 252, the guide plate 244 and the driven roller 250b are moved in association with each other at an accurate timing with a simplified construction.

Referring back to FIG. 3, the cutter unit 239 includes a first blade 239a, a second blade 239a respectively opposing to the opposite sides of the photographic paper, and a cutter driver unit 245 including a DC motor for moving the second blade 239b toward and away from the first blade 239a. A refuse collecting box 246 for collecting small pieces of paper waste (refuse) produced when the photographic paper is trimmed off by the cutter unit 239 is provided below the first and second blades 239a, 239b, and a guide plate 247 for guiding the refuse into the refuse collecting box 246 is provided. The guide plate 247 is pivotable between the first position shown by the solid line in FIG. 3 and the second position shown by the imaginary line in FIG. 3 about a certain pivot point by a guide driver unit 248 including a DC motor. The guide plate 247 constitutes part of the vertical transport unit 232 when set at the first position.

A paper sensor S3 for detecting the lead end of the photographic paper is provided immediately before the cutter unit 239. A fourth transport roller pair 249 is provided downstream of the cutter unit 239 to transport a sheet of photographic paper which has been cut by the cutter unit 239 to the second transporter 26. The fourth transport roller pair 249 includes a drive roller 249a and a driven roller 249b, and the drive roller 249a is driven by a roller driver unit 253 including a DC motor.

The second transporter 26 includes a transverse transport unit 261 for transporting the sheet of photographic paper cut by the cutter unit 239 (hereinafter, merely referred to as "cut sheet") in a transverse direction, and a vertical transport unit 262 for transporting the cut sheet that has been transported transversely by the transverse transport unit 261 in a vertical direction toward the developing section 30.

The transverse transport unit 261 includes an upper transport belt 266 wound between a drive roller 264 driven by a roller driver unit 263 including a DC motor and a driven roller 265, and a lower transport belt 269 wound between a drive roller 267 driven by the roller driver unit 263 and a driven roller 268. The upper transport roller 266 and the lower transport roller 269 are disposed close to each other to transport the cut sheet rearward (in −X direction) while nipping the same therebetween.

The vertical transport unit 262 includes a left transport belt 273 wound between a drive roller 271 driven by a roller driver unit 270 including a DC motor and a driven roller 272, and a right transport belt 276 wound between a drive roller 274 driven by the roller driver unit 270 and a driven roller 275. The left transport roller 273 and the right transport roller 276 are disposed close to each other to transport the cut sheet downward (in the −Z direction) while nipping the same therebetween.

Figure 10:
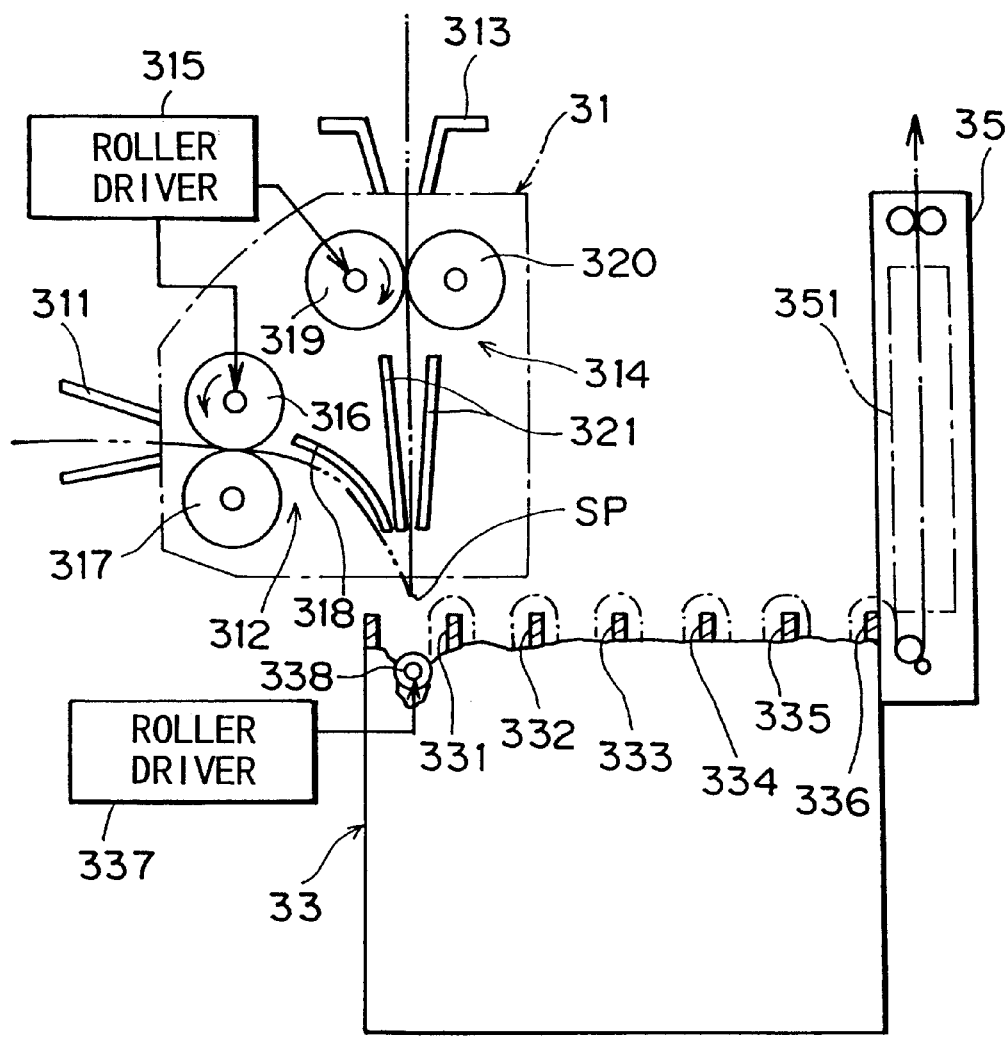
FIG. 10 is a diagram showing a construction of a developing section of the photographic processing system in FIG. 1.

FIG. 10 is a schematic diagram of the developing section 30. In FIG. 10, the developing section 30 includes a feeder unit 31 for feeding the cut sheet that has been printed by the first printing section 10 or the second printing section 20 downstream to a developing start position SP, a processing section 33 for developing the cut sheet fed at the developing start position SP, and a dryer chamber 35 for drying the developed cut sheet in the heated air.

The feeder unit 31 includes a first inlet 311 for guiding the cut sheet discharged from the discharge unit 164 of the first printing section 10 into the developing section 30, a first feeder 312 for feeding the cut sheet guided through the first inlet 311 to the developing start position SP located in the vicinity of an inlet of the processing tank 32, a second inlet 313 for guiding the cut sheet discharged from the vertical transport unit 262 of the second printing section 20 into the developing section 30, and a second feeder 314 for feeding the cut sheet guided through the second inlet 313 to the developing start position SP.

The first feeder 312 includes a drive roller 316 driven by a roller driver unit 315 including a DC motor, a driven roller 317 rendered in pressing contact with the drive roller 316, and a guide plate 318 disposed downstream of the drive roller 316 and the driven roller 317. The first feeder 312 is operated such that the cut sheet guided through the first inlet 311 is fed to the developing start position SP along the guide plate 318 while nipped between the drive roller 316 and the driven roller 317.

The second feeder 314 includes a drive roller 319 driven by the roller driver unit 315 including a DC motor, a driven roller 320 rendered in pressing contact with the drive roller 319, and a guide plate 321 disposed downstream of the drive roller 319 and the driven roller 320. The second feeder 314 is operated such that the cut sheet guided through the second inlet 313 is fed to the developing start position SP along the guide plate 321 while nipped between the drive roller 319 and the driven roller 320. The guide plate 318 of the first feeder 312 and the guide plate 321 of the second feeder 314 are constructed integral with each other.

The processing section 33 includes a developing tank 331 disposed immediately below the developing start position SP in which a developing liquid is filled, a bleaching/fixing tank 332 in which a bleaching/fixing liquid is filled, a first stabilizing tank 333 in which a stabilizing liquid is filled, a second stabilizing tank 334 in which a stabilizing liquid is filled, a third stabilizing tank 335 in which a stabilizing liquid is filled, and a fourth stabilizing tank 336 in which a stabilizing liquid is filled. The tanks 331 to 336 are arranged from the forward direction (+X direction) to the rearward direction (−X direction) in this order. In each of the tanks 331 to 336, provided is a transport roller unit 338 driven by a roller driver unit 337 including a DC motor to transport the cut sheet in and out throughout the tanks 331 to 336.

The dryer chamber 35 is provided with a heater unit 351 including a heater (not shown) and a fan (not shown), and is adapted to dry the cut sheet after the development in the heated air to discharge the cut sheet outside the developing section 30.

The paper discharge section 40 is adapted to successively set the cut sheets of photographic paper that have passed through the dryer chamber 35 in each tray 41 vertically arranged one over another.

Figure 11:
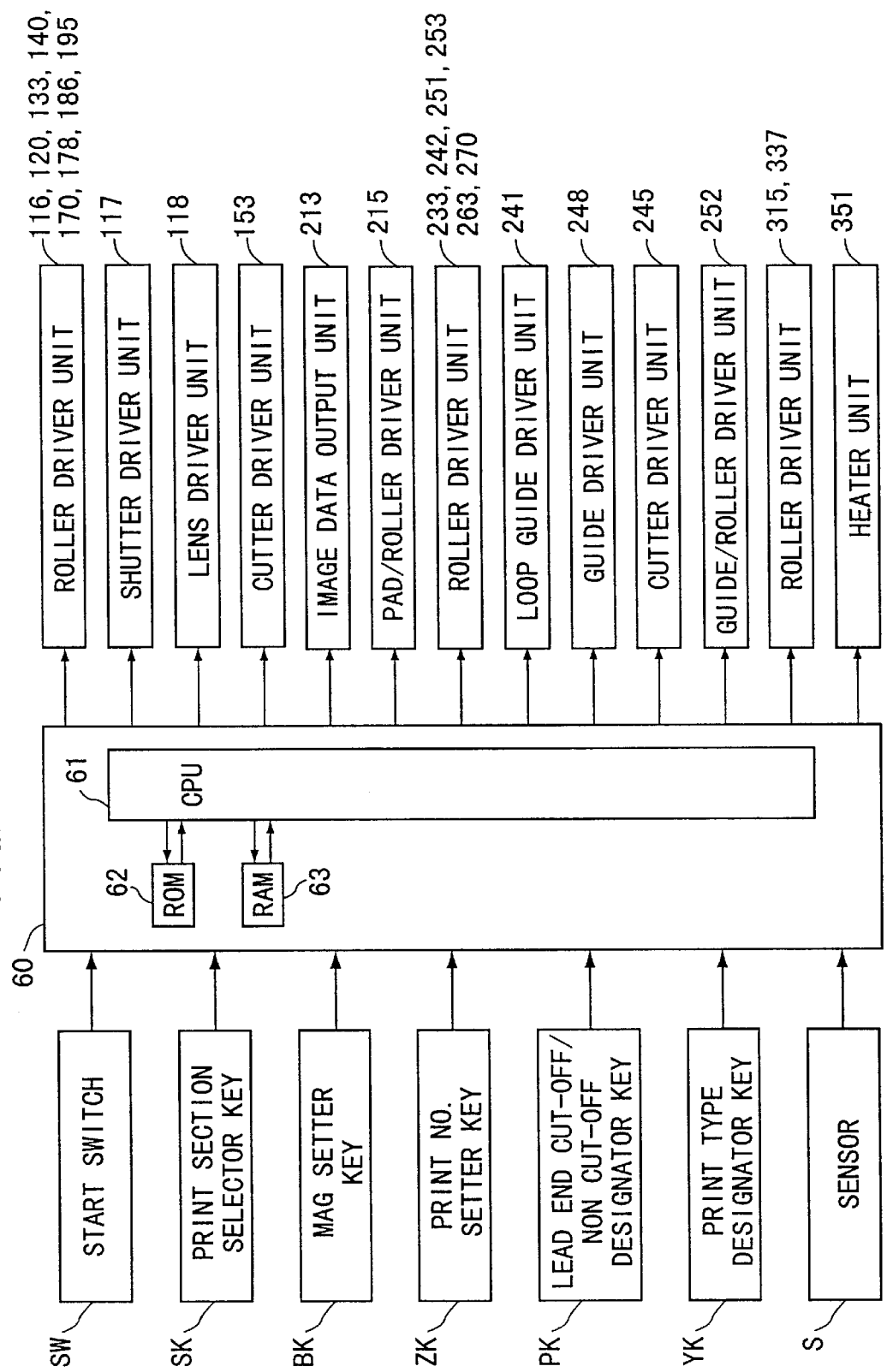
FIG. 11 is a diagram showing a construction of a control system of the photographic processing system in FIG. 1.

FIG. 11 is a block diagram showing a control system for primarily controlling the photographic processing system according to this invention. A control section 60 includes a CPU 61 for implementing a predetermined computation, an ROM 62 in which a predetermined program data is stored, and an RAM 63 for temporarily storing processed data therein to control an overall operation of the photographic processing system according to the predetermined program.

Specifically, the CPU 61 controls the roller driver units 116, 120, 133, 140, 170, 178, 186, 195, the shutter driver unit 117, the lens driver unit 118, and the cutter driver unit 153 in the first printing section 10, the image data output unit 213, the pad/roller driver unit 215, the roller driver units 233, 242, 251, 253, 263, 270, the loop guide driver unit 241, the cutter driver unit 245, the guide driver unit 248, and the guide/roller driver unit 252 in the second printing section 20, and the roller driver units 315, 337, the heater unit 351 in the developing section 30 in response to a signal inputted from a start switch SW, a printing section selector key SK, a magnification setter key BK, a print sheet number setter key ZK, a leader portion cut-off/non-cut-off designator key PK, and a printing type designator key YK, and various sensors S.

The photographic processing system having the above arrangement is operated as follows. Specifically, in the case where a film image is printed and a composite image of picture image and character image is not necessary, the first printing section 10 is selected by the printing section selector key SK. Then, when various conditions are set, and the start switch SW is turned on, the negative film F is wound up frame by frame by the film image projector 11 to project each of the film image successively onto the printing unit 12. Simultaneously, the photographic paper is drawn out from the magazine MG1 (or MG2) loaded on the magazine loader unit 13, cut at the specified length by the cutter unit 15, and transported to the specified printing position of the printing unit 12. The photographic paper is drawn out from the magazine MG1 (or MG2) as timed with the winding operation of the negative film F by the film image projector 11.

The photographic paper, after the printing by the printing unit 12, is transported downstream by the transport belt 123, and then transported into the developing section 30 via the transverse transport unit 161, the oblique transport unit 162, the vertical transport unit 163, and the discharge unit 164.

The cut sheet of photographic paper transported up to the developing section 30 is fed to the developing start position SP by the feeder unit 31 to develop the printed image in the processing section 33. The cut sheet after the development is transported into the dryer chamber 35 for drying operation. After the drying operation, the cut sheet is discharged onto the paper discharge section 40.

Figure 12:
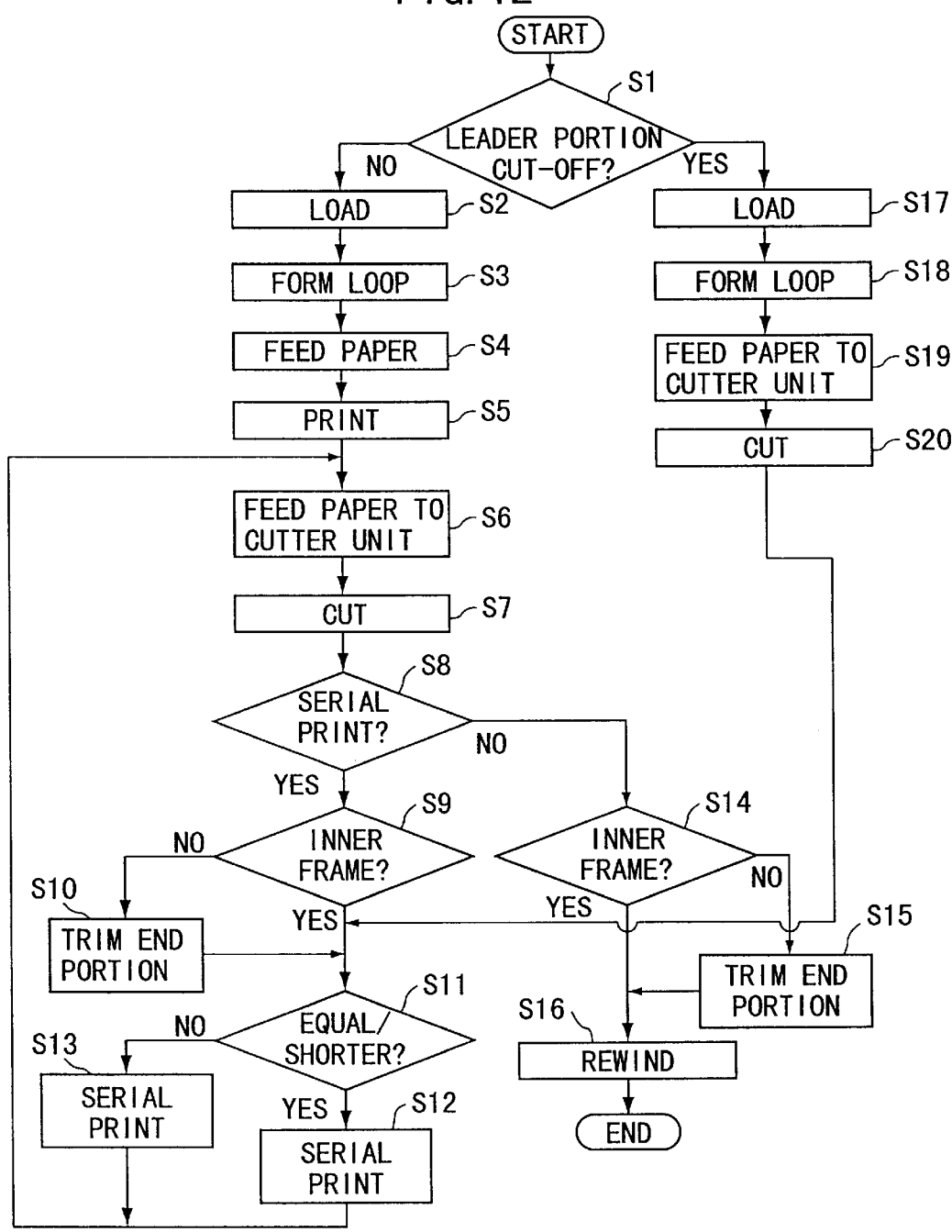
FIG. 12 is a flowchart showing an operation of the second printing section in FIG. 3.

Next, an operation of the photographic processing system when the second printing section 20 is selected by the printing section selector key SK is described with reference to the flowchart of FIG. 12 and operation diagrams of FIGS. 13 through 22. The case where the second printing section 20 is selected means that a composite image of picture image and character image is printed. When the second printing section 20 is selected, the following operation is conducted as a pre-operation. A picture image such as a film image is read by an image sensor by operating an external device such as a personal computer, and a character image is inputted through the keyboard or its equivalent to combine the picture image and the character image so as to form a composite image. Then, the composite image is applied with a certain image processing.

When the above pre-operation is completed, various conditions are set, and the start switch SW is turned on, it is judged whether a leader portion cut-off operation is designated (in Step S1). The leader portion cut-off operation is such that the leader portion of the roll of photographic paper is cut off by a certain length (e.g., about 100 mm) in a direction normal to the length direction thereof, if the leader portion has not been applied with this cutting.

Figure 13:
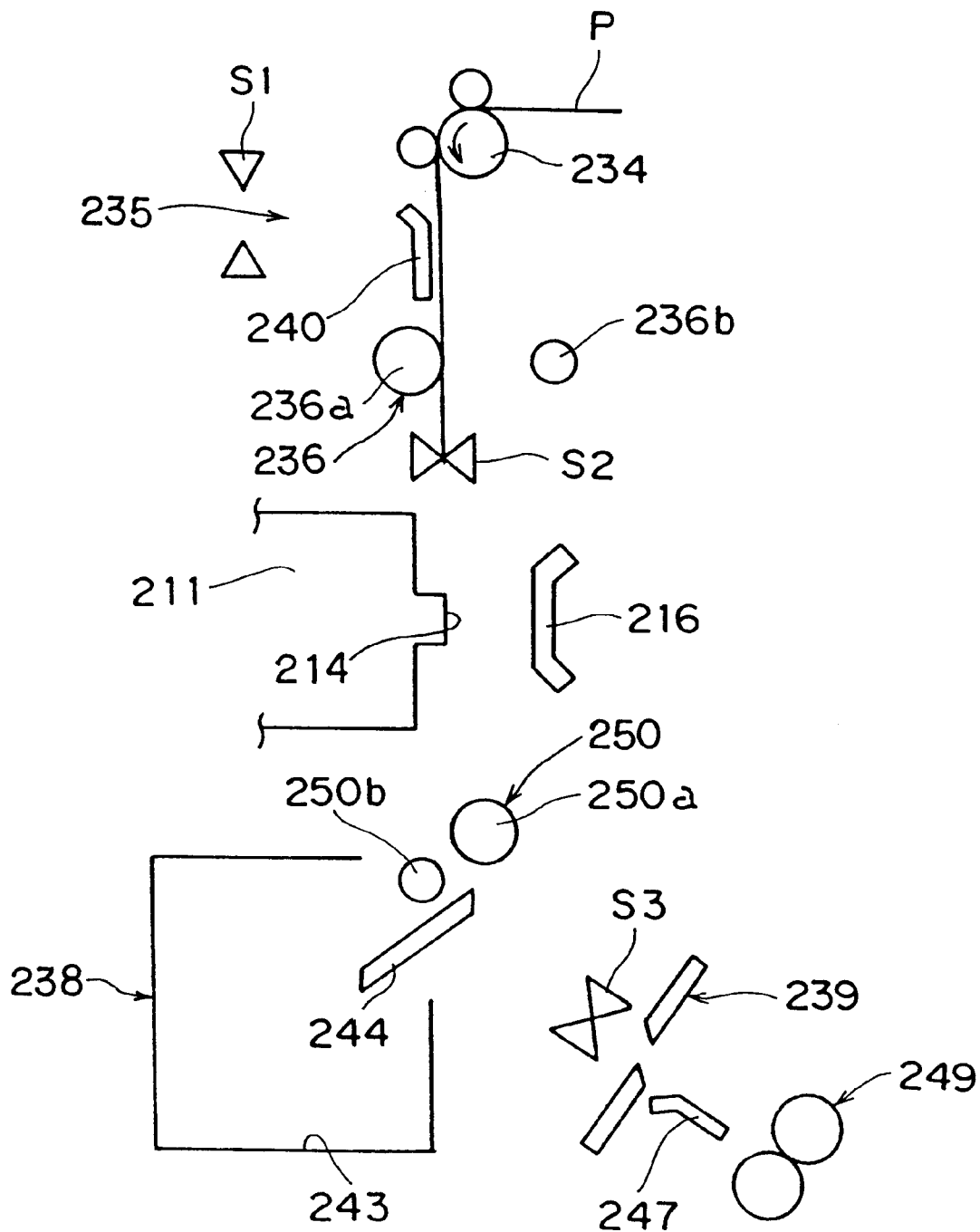
FIG. 13 is a diagram showing essential parts of the second printing section in FIG. 3 for illustrating an operation thereof.

If it is judged that the leader portion cut-off operation is not designated (NO in Step S1), the photographic paper drawn out from the magazine MG3 is loaded onto the first transporter 23 (in Step S2). At this time, as shown in FIG. 13, the driven roller 236b of the second transport roller pair 236 is spaced away from the drive roller 236a, and the loop guide 240 of the loop forming section 235 is set at the first position. Accordingly, the photographic paper P is drawn out from the magazine MG3 such that the lead end thereof is allowed to reach the position of the paper sensor S2.

At this time, the pressing pad 216 is spaced away from the image display plane 214 of the image display device 211 to allow the photographic paper P to be guided into the paper housing box 243 of the storage section 238 while guided by the guide plate 244 and the driven roller 250b of the third transport roller pair 250.

Figure 14:
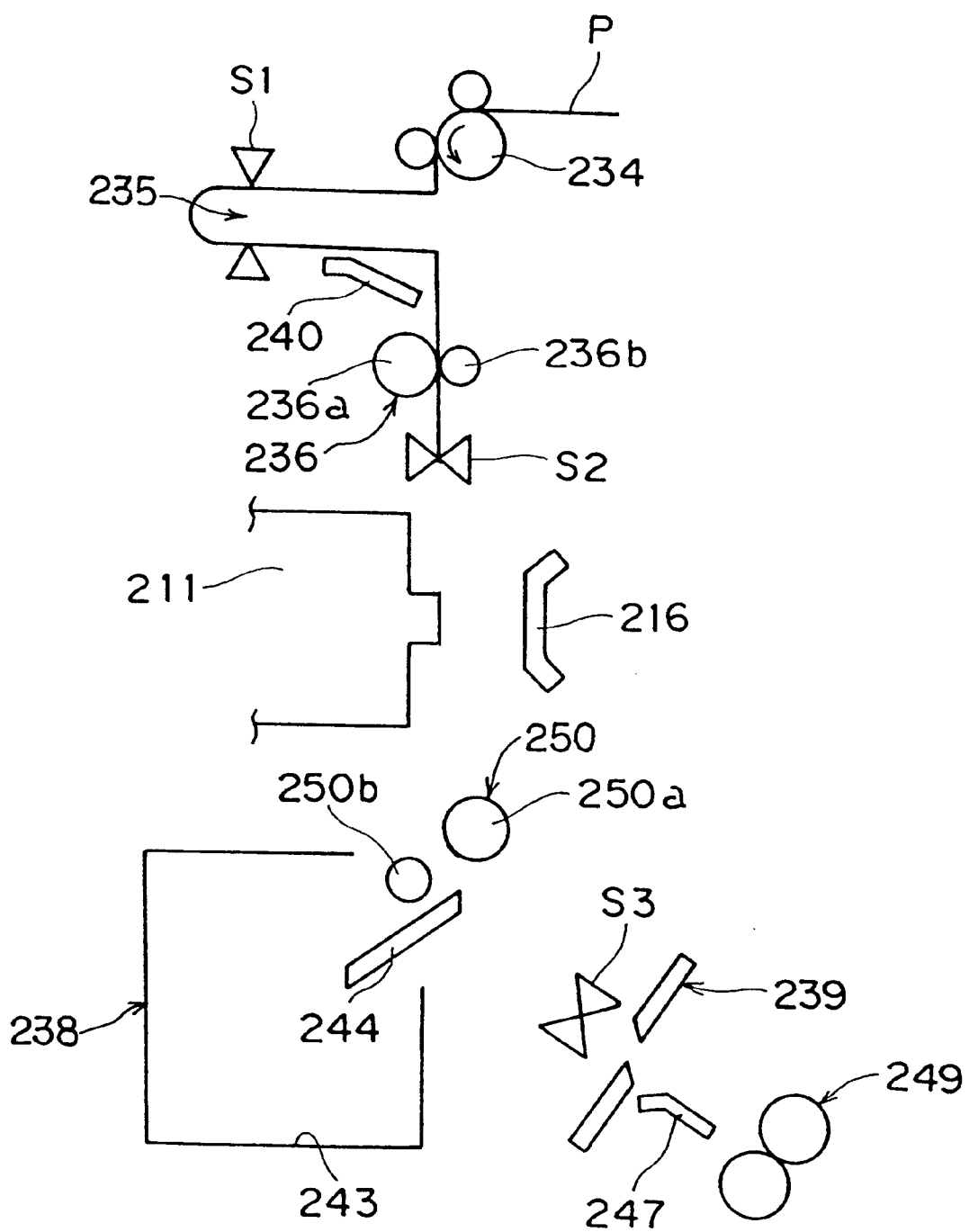
FIG. 14 is a diagram showing the essential parts of the second printing section in FIG. 3 for illustrating an operation thereof.

When the lead end of the photographic paper P reaches the paper sensor S2, the loop forming section 235 starts to form a loop of the photographic paper P to allow the loop of the photographic paper P to stay in the loop forming section 235 (in Step S3). Specifically, when the lead end of the photographic paper P reaches the paper sensor S2, as shown in FIG. 14, the driven roller 236b of the second transport roller pair 236 is moved toward the drive roller 236a to securely nip the lead end of the photographic paper P between the drive roller 236a and the driven roller 236b. At this time, the loop guide 240 is set at the second position. Then, despite the transport suspended state of the photographic paper P toward downstream side, the photographic paper P is continued to be drawn out from the magazine MG3 by the first transport roller pair 234. As a result, certain part of the photographic paper P is formed into a loop in the loop forming section 235. This operation is intermittently repeated each time the loop sensor S1 detects a peak portion of the loop of the photographic paper P.

The loop sensor S1 is mounted, in this embodiment, at such a position as to set the length of the photographic paper staying in the loop form in the loop forming section 235 at a value (N−50): where N=A+B; A denotes a distance from the paper sensor S2 to the center position of the image display device 211; and B denotes a length of the cut sheet corresponding to the size of the image to be printed (unit: mm). The reason for deducting 50 mm from the length N mm is to suppress the length of unusable remaining part of the photographic paper P which is disposed as waste paper or refuse as much as possible when the roll of photographic paper P is used up, and a new one is loaded on the magazine MG3.

Figure 15:
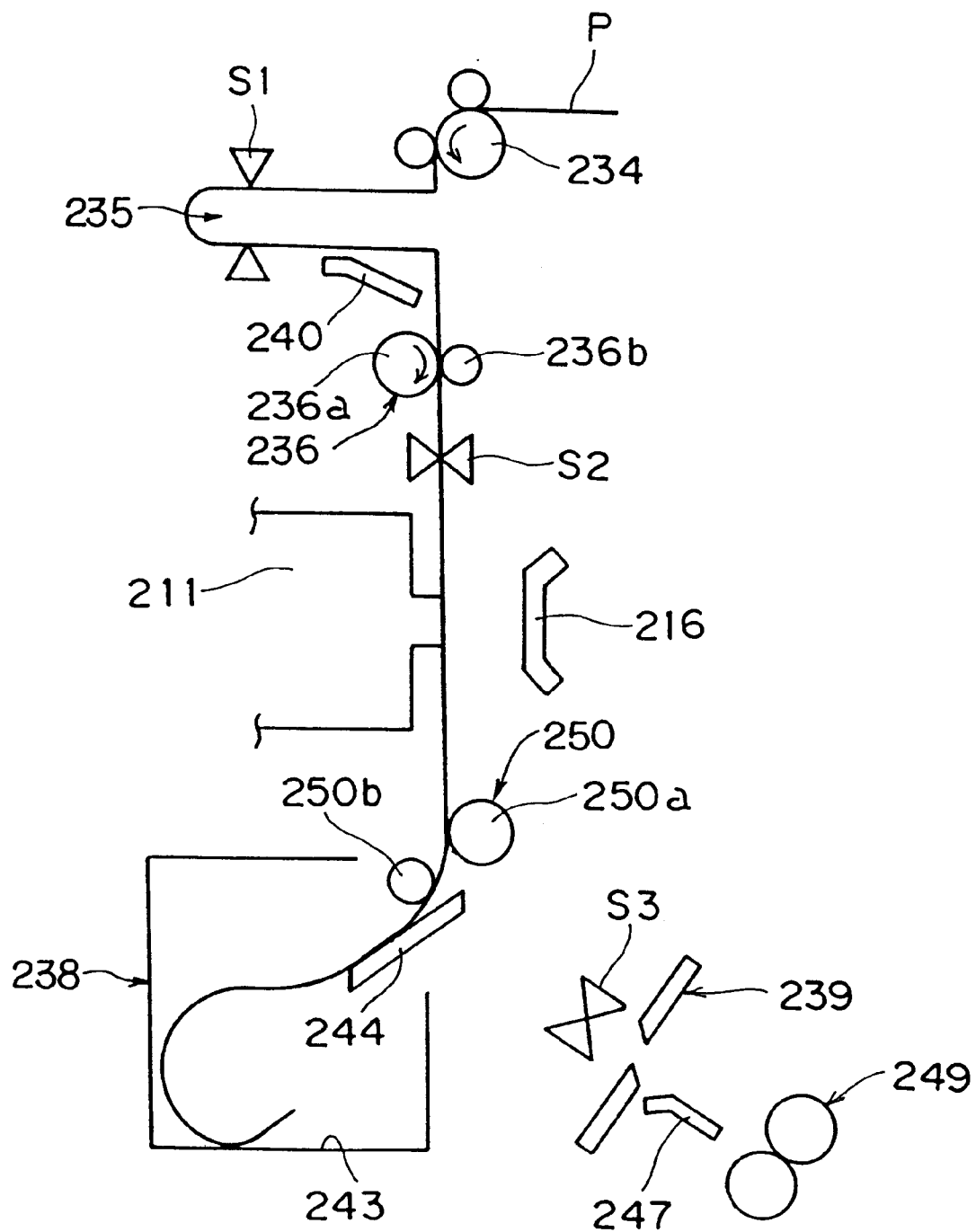
FIG. 15 is a diagram showing the essential parts of the second printing section in FIG. 3 for illustrating an operation thereof.

Next, the photographic paper P of a certain length necessary for printing one image is fed out from the loop forming section 235 (in Step S4). Specifically, as shown in FIG. 15, the drive roller 236a of the second transport roller pair 236 is rotated forward to feed the photographic paper P downstream by such a length as to match the distance from the center of the image display device 211 to the lead end of the photographic paper P with the length necessary for one image printing while passing the image display device 211 without printing. Since the guide plate 244 and the driven roller 250b of the third transport roller pair 250 are set at the position shown in FIG. 6(b), the photographic paper P fed by the driver roller 236a at this time is guided into the paper housing box 243 in the form of a loop.

In Step S4, the first transport roller pair 234 is rotated in synchronism with the rotation of the second transport roller pair 236 to draw out the photographic paper from the magazine MG3 in such a manner as to set the length of the photographic paper P staying in the loop forming section 235 at a substantially constant value.

Thus, since the photographic paper P is temporarily stored into the storage section 238 after fed out from the loop forming section 235, the photographic paper P is applied with a substantially constant tension force to enable accurate feeding of the photographic paper by a certain length.

Figure 16:
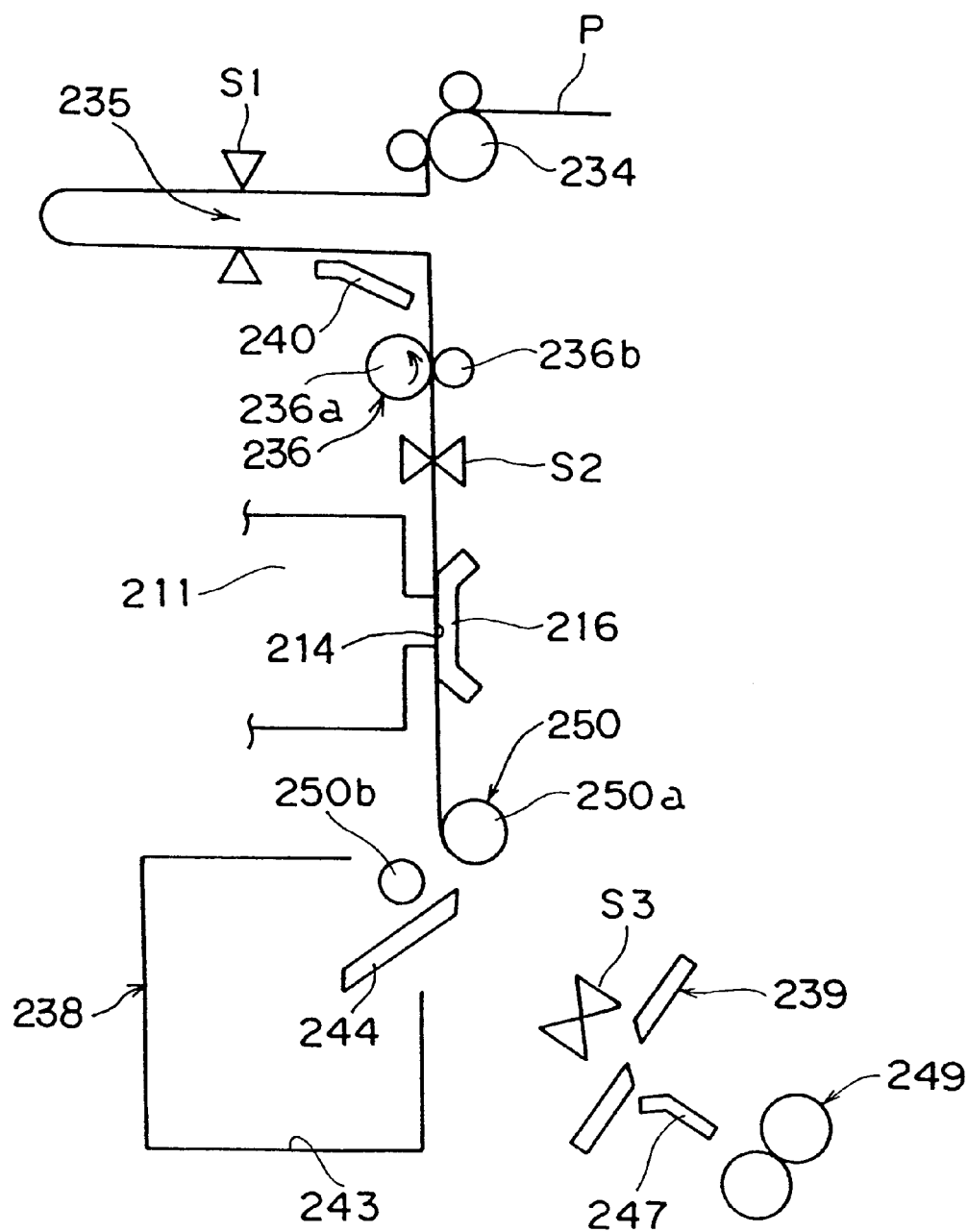
FIG. 16 is a diagram showing the essential parts of the second printing section in FIG. 3 for illustrating an operation thereof.

Next, an image is printed onto the photographic paper P (in Step S5). In this Step, as shown in FIG. 16, the pressing pad 216 is pressed against the image display plane 214 of the image display device 211, and the drive roller 236a of the second transport roller pair 236 is intermittently rotated in the reverse direction to feed back the photographic paper P stored in the paper housing box 234 intermittently upstream while rendering the photographic paper P in pressing contact against the image display plane 214 of the image display device 211. At this time, the image display device 211 is operated such that the image is displayed line after line or several lines after lines onto the image display plane 214 as timed with the feed-back operation of the photographic paper P to print the image onto the photographic paper P.

Accompanied with the feed-back operation of the photographic paper P, the photographic paper P near the loop forming section 235 is once returned to the loop forming section 235. When the printing is finished, the pressing pad 216 is spaced away from the image display plane 214 of the image display device 211.

In this way, the photographic paper P is printed during the feed-back transport from the storage section 238. Accordingly, the photographic paper P can be fed back at an accurate transport rate without a fluctuated load applied onto the photographic paper P. The roller driver unit 242 for rotating the drive roller 236a and the control section 60 constitute transport drive controller means for transporting the photographic paper P downstream from the loop forming section 235 by the length at least necessary for an image printing while passing the printing unit 237 without a printing and then feeding back the photographic paper P upstream for the printing.

Figure 17:
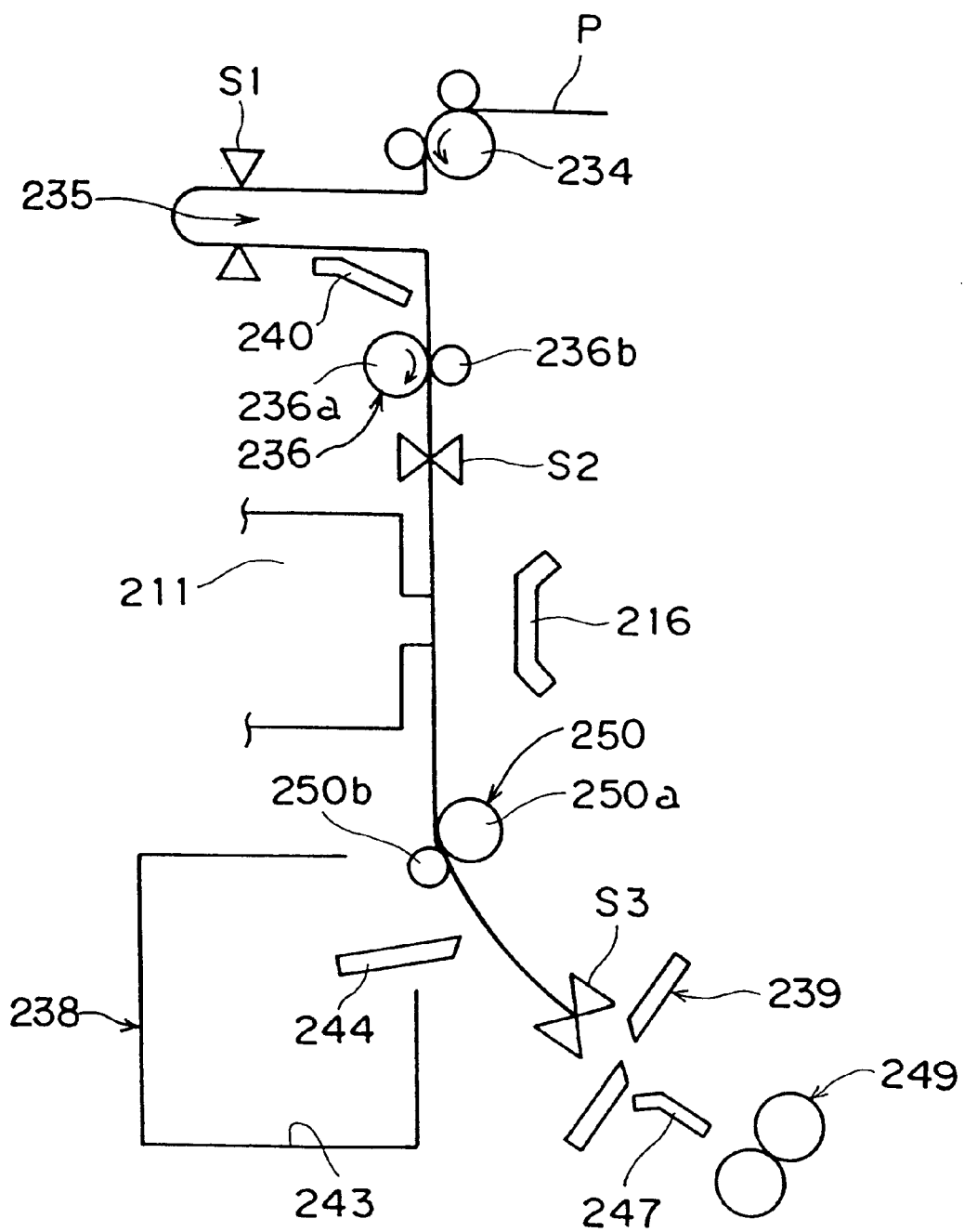
FIG. 17 is a diagram showing the essential parts of the second printing section in FIG. 3 for illustrating an operation thereof.

Subsequently, the photographic paper P after the printing is fed to the cutter unit 239 (in Step S6). At this time, as shown in FIG. 17, the guide plate 244 and the driven roller 250b of the third transport roller pair 250 set at the position shown in FIG. 6(b) are moved to the position shown in FIG. 7(b). Specifically, when the guide plate 244 is set at the position below the third transport roller pair 250 located downstream of the vertical transport unit 232, the photographic paper P transported from upstream side is transported to the cutter unit 239 along the vertical transport unit 232 without feeding into the paper housing box 243. At this time, although the driven roller 250b is moved toward the drive roller 250a, the small clearance defined between the drive roller 250a and the driven roller 250b allows the photographic paper P to pass between the drive roller 250a and the driven roller 250b without difficulty.

In the above state, the second transport roller pair 236 transports the photographic paper P after the printing to such a position as to allow the lead end of the photographic paper P to reach the paper sensor S3 provided immediately before the cutter unit 239. At this time, the photographic paper P is drawn out from the magazine MG3 by the first transport roller pair 234 as timed with the transport by the second transport roller pair 236 to set the length of the photographic paper P staying in the loop forming section at a substantially constant value.

Figure 18:
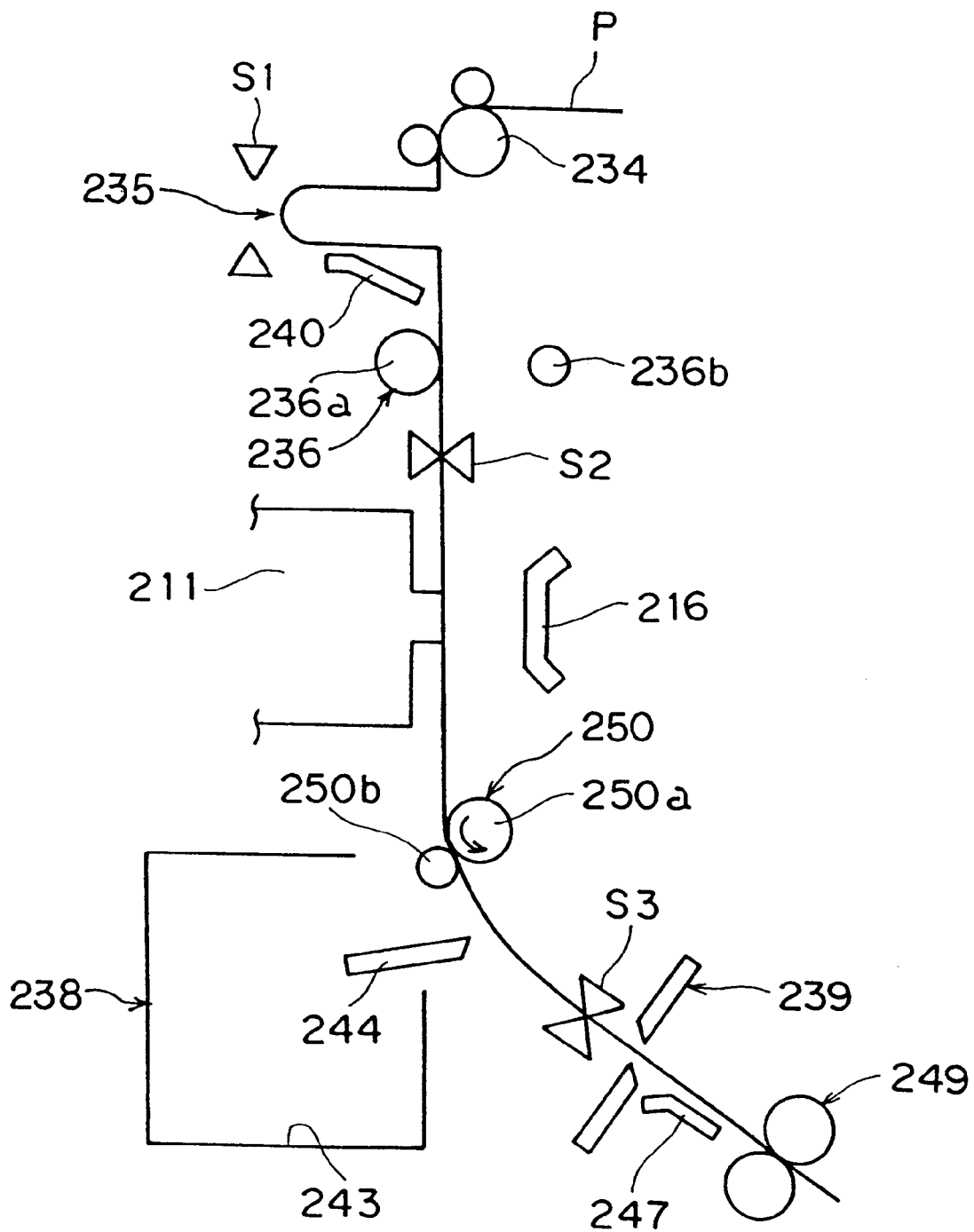
FIG. 18 is a diagram showing the essential parts of the second printing section in FIG. 3 for illustrating an operation thereof.

When the lead end of the photographic paper P reaches the paper sensor S3, as shown in FIG. 18, the driven roller 236b of the second transport roller pair 236 is moved away from the drive roller 236a. Also, the guide plate 244 and the driven roller 250b of the third transport roller pair 250 are moved to the position shown in FIG. 8(b) from the position shown in FIG. 7(b) to render the driven roller 250b in pressing contact against the drive roller 250a with the photographic paper P interposed therebetween. Thereupon, the drive roller 250a is rotated forward to transport the photographic paper P by the length corresponding to the printed image toward the cutter unit 239 based on the lead end position of the photographic paper P detected by the paper sensor S3. After feeding of the photographic paper P by the determined length, the photographic paper P is cut thereat (in Step S7). When the photographic paper P is fed by the length corresponding to the printed image toward the cutter unit 239, the fourth transport roller pair 249 provided downstream of the cutter unit 239 is also rotated to feed the cut sheet of photographic paper P forward into the second transporter 26.

Figure 19:
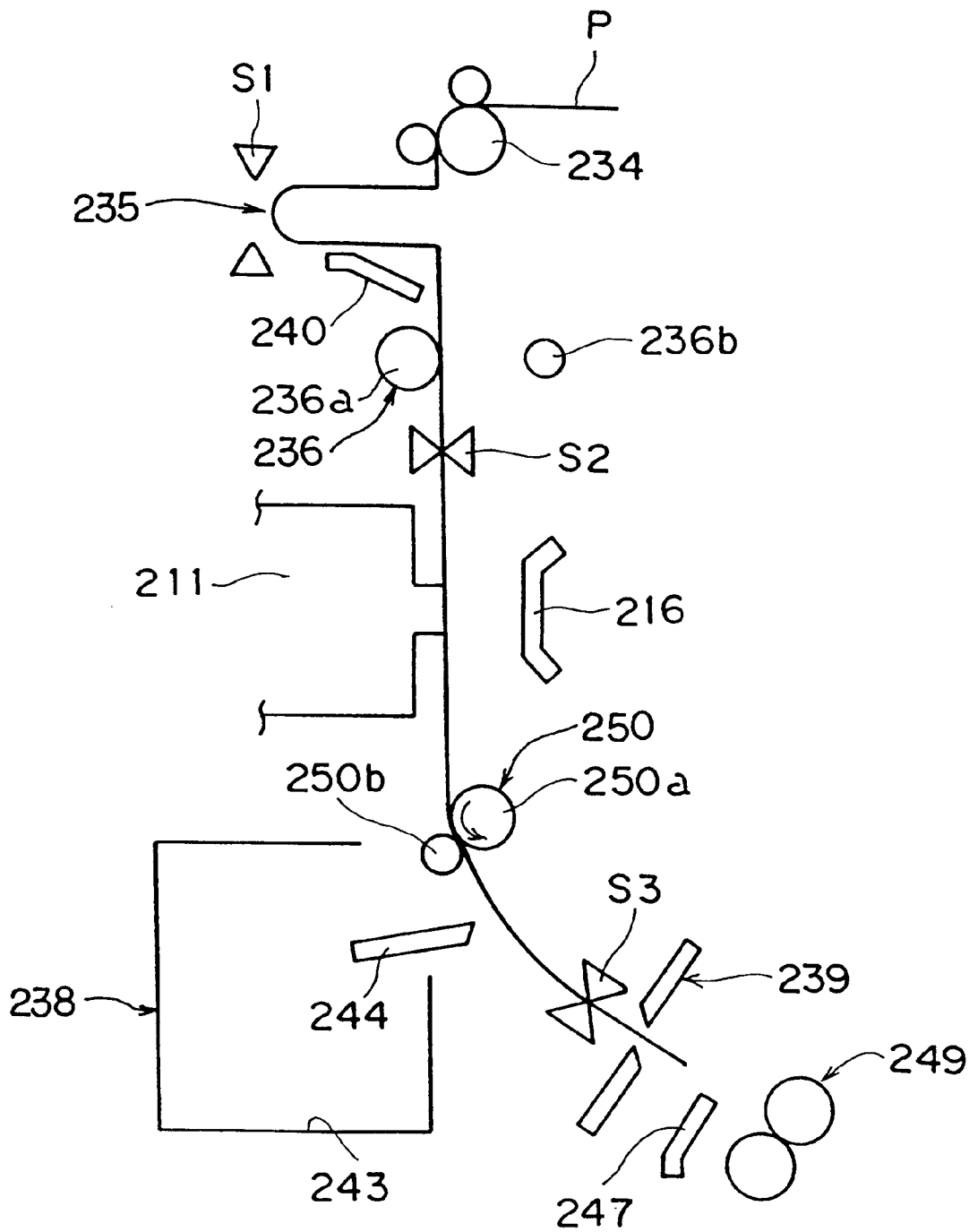
FIG. 19 is a diagram showing the essential parts of the second printing section in FIG. 3 for illustrating an operation thereof.

Next, it is judged whether a serial printing is necessary (namely, whether there are a series of images to be printed) (in Step S8). If it is judged that the serial printing is necessary (YES in Step S8), it is judged whether with-inner-frame format is designated (i.e., the printed image has a white frame portion around the periphery thereof to define an inner frame) (in Step S9). If it is judged that without-inner-frame format is designated (i.e., the printed image has a full image on the cut sheet without a white frame portion and magnified with a slightly enlarged magnification ratio corresponding to the missing white frame portion), the lead end of the cut sheet of photographic paper P is trimmed off (in Step S10). Specifically, as shown in FIG. 19, the remaining roll of the photographic paper P after the cuffing operation in Step S7 is slightly transported forward to the cutter unit 239 by the third transport roller pair 250 by a certain length (e.g., about 3 mm) to trim off the lead end of the remaining roll of the photographic paper P. Thereby, an end portion carrying a border image of the slightly magnified full image according to the without-inner-frame format (corresponding to the lead end of the next cut sheet of photographic paper P) is trimmed off. At this time, the guide plate 247 located below the cutter unit 239 is moved to the second position to guide the refuse generated by trimming off the end portion is introduced into the refuse collecting box 246. Thereafter, the guide plate 247 is returned to the first position.

Figure 20:
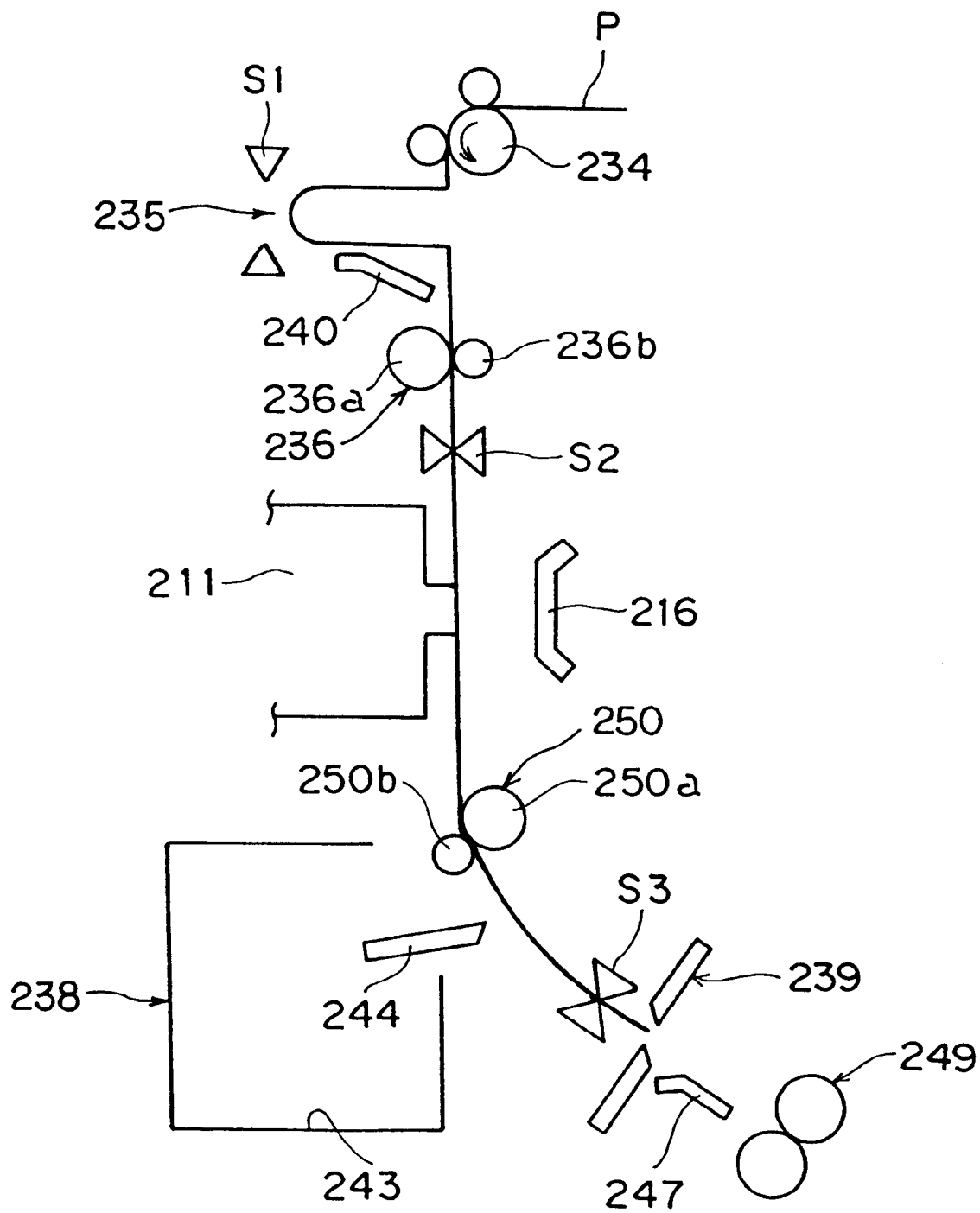
FIG. 20 is a diagram showing the essential parts of the second printing section in FIG. 3 for illustrating an operation thereof.

Next, it is judged whether the length of the photographic paper P for a next printing is equal to or shorter than the distance from the center of the image display device 211 to the cutter unit 239 (e.g., 152 mm) (in Step S11). At this time, as shown in FIG. 20, the guide plate 244 and the driven roller 250b set at the position in FIG. 8(b) are moved to the position shown in FIG. 9(b) to move the driven roller 250b away from the drive roller 250a while moving the driven roller 236b toward the drive roller 236a to nip the photographic paper P between. Simultaneously with the nipping operation, the first transport roller pair 234 is rotated to make a loop of the photographic paper P in the loop forming section 235. When the loop sensor S1 detects the loop, the driving of the first transport roller pair 234 is suspended.

Figure 21:
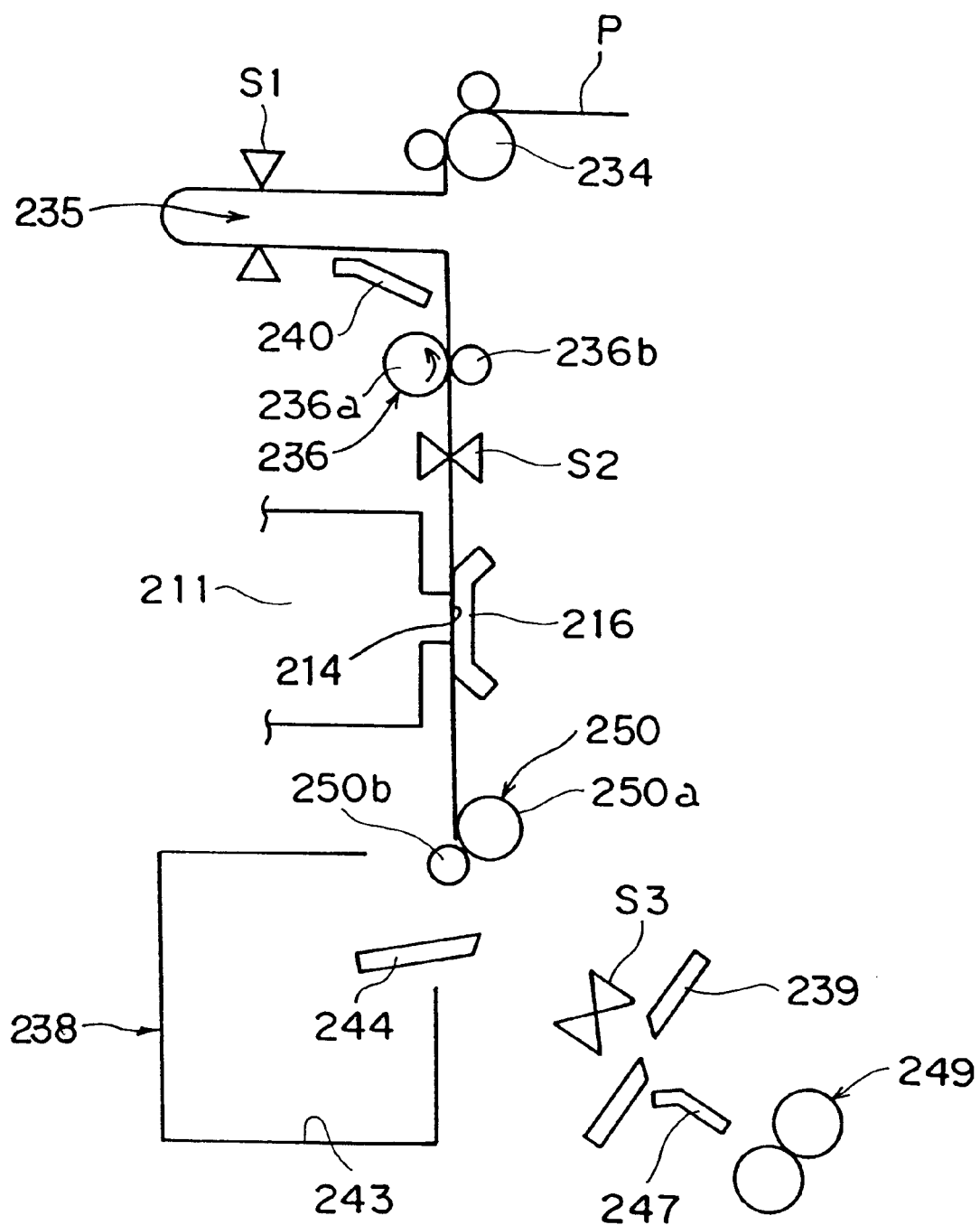
FIG. 21 is a diagram showing the essential parts of the second printing section in FIG. 3 for illustrating an operation thereof.

Next, if it is judged that the length of the photographic paper P for the next printing is equal to or shorter than the predetermined length (YES in Step S11), as shown in FIG. 21, the second transport roller pair 236 is driven in the reverse direction to make the distance from the center of the image display device 211 to the lead end of the remaining roll of photographic paper P equal to the length necessary for the next printing. If the length necessary for the printing equals to the distance from the image display device 211 to the cutter unit 239, the reverse feeding is not necessary. After Step S11, the pressing pad 216 is pressed against the display plane 214 of the image display device 211, and the second transport roller pair 236 is intermittently driven to intermittently feed the photographic paper P backward to allow a printing by the image display device 211 in the similar manner as mentioned above (in Step S12). Thereafter, the routine returns to Step S6 to repeat the loop throughout Steps S6 to S12.

When the distance from the center of the display plane 214 of the image display device 211 to the cutter unit 239 is set at such a value as to correspond to the size of printed image (size of the cut sheet of photographic paper) of frequent use, it is possible to directly feed the photographic paper P backward from the cutter unit 239 without a temporal storage thereof by the length necessary for a printing when the printing is conducted to the second and subsequent frame images as far as the image to be printed has a size not larger than the frequently-used size. Thereby, the image forming process is sped up to improve the printing efficiency.

When the length of the photographic paper P necessary for a next printing is longer than the predetermined length (NO in Step S11), the third transport roller pair 236 is driven to feed the photographic paper P backward in a state that the pressing pad 216 is spaced away from the display plane 214 of the image display device 211 until the lead end of the photographic paper P reaches an upstream position nearest to the third transport roller pair 250. Then, the guide plate 244 and the driven roller 250b set at the position shown in FIG. 9(b) are moved to the position shown in FIG. 6(b). Thereafter, the second transport roller pair 236 is driven to house a certain length of the photographic paper P in the paper housing box 243 while making a loop in the loop forming section 235 until the length of the loop becomes the length necessary for a printing.

Figure 22:
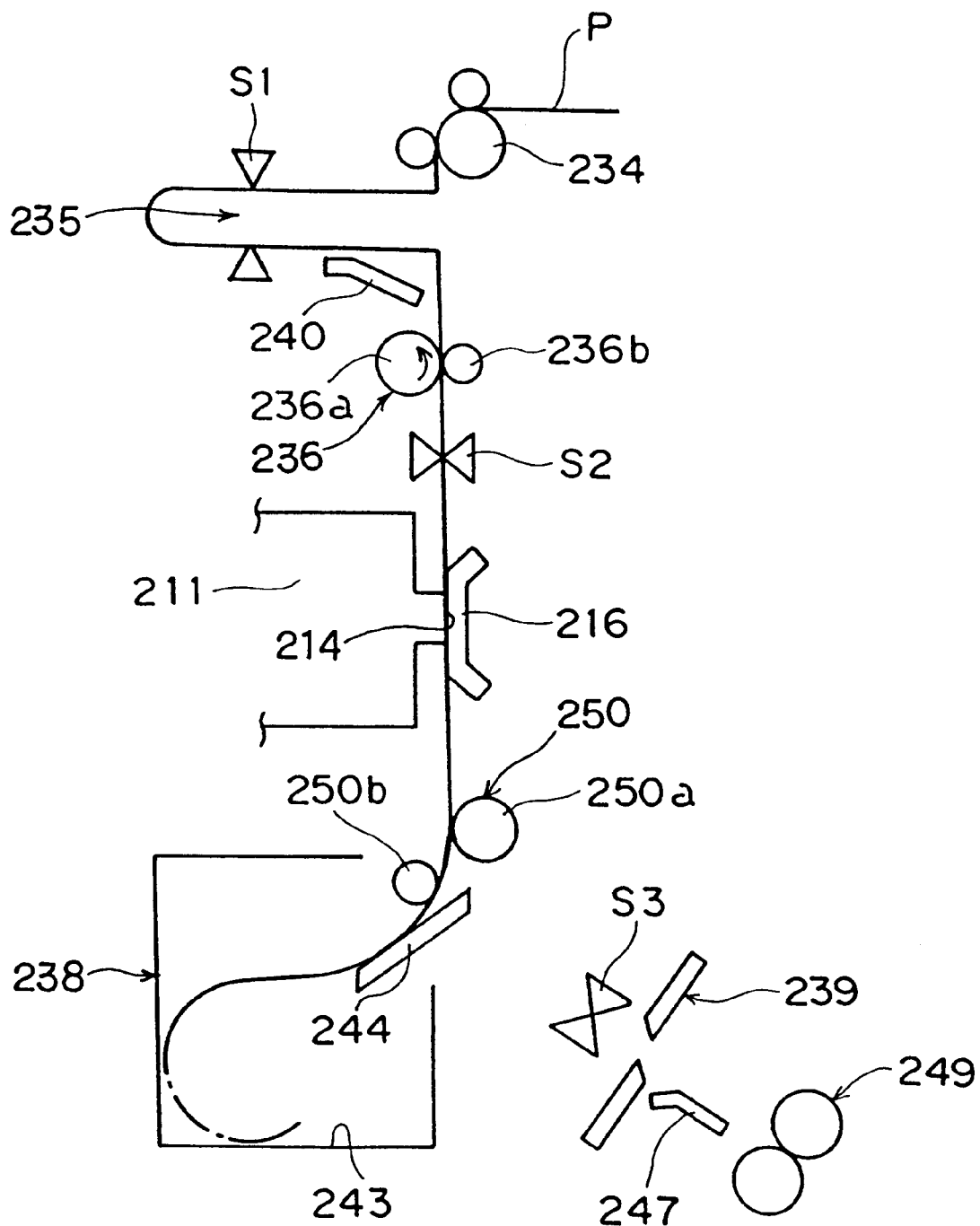
FIG. 22 is a diagram showing the essential parts of the second printing section in FIG. 3 for illustrating an operation thereof.
Figure 24:
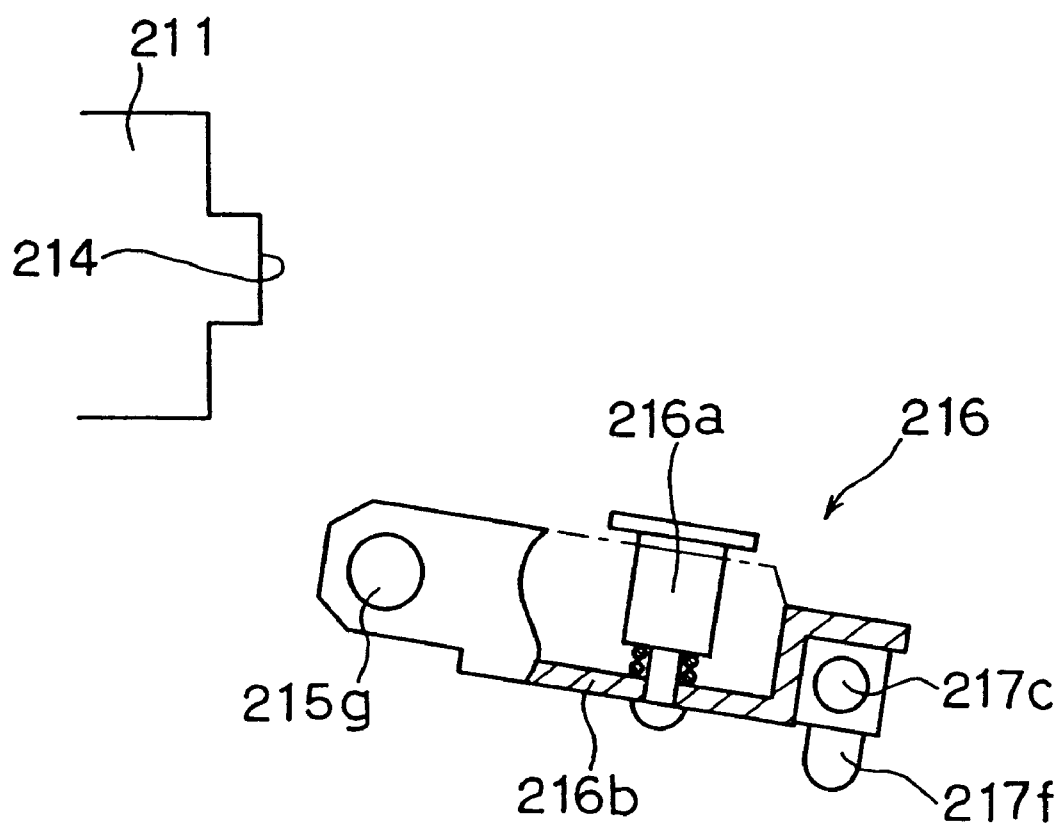
FIG. 24 is a diagram showing a state that the presser member in FIGS. 23(a) and 23(b) is disengaged from a moving member and spaced away from a display plane of an image display device.

Next, as shown in FIG. 22, the photographic paper P in the paper housing box 243 is intermittently fed backward by the second transport roller pair 236 in a state that the pressing pad 216 is pressed against the display plane 214 of the image display device 211 with the photographic paper P interposed therebetween to allow a printing by the image display device 211 in the similar manner as mentioned above (in Step S13). Thereafter, the routine returns to Step S6 to repeat the loop throughout Steps S6 to S13. When the printing is conducted according to the with-inner-frame format (YES in Step S9), the operation after Step S11 is implemented.

If a serial printing is not necessary after the cutting operation in Step S7 (NO in Step S8), it is judged whether the printing is to be implemented according to the with-inner-frame format (in Step S14). If the printing is implemented according to the without-inner-frame format (NO in Step S14), the lead end of the photographic paper P is trimmed off similarly to Step S10 (in Step S15). If the printing is conducted according to the with-inner-frame format (YES in Step S14), the photographic paper P is rewound into the magazine MG3 (in Step S16). The cut sheet of photographic paper P after the printing is transported to the developing section 30 via the second transporter 26 to perform a developing operation in the similar manner as the first printing section 10.

If the leader portion cut-off operation of the photographic paper P is designated (YES in Step S1), the photographic paper drawn out from the magazine MG3 is loaded to the first transporter 23 similarly to Step S2 (in Step S17).

Subsequently, a loop is formed in the loop forming section 235 similarly to Step S3 (in Step S18). Similarly to Step S6, the photographic paper P is transported to the cutter unit 239 (in Step S19), and the leader portion of the photographic paper P is cut off in a direction normal to the length direction thereof by a certain length (in Step S20). Thereafter, the routine proceeds to Step S11 to conduct a printing similar to the above.

Since the photographic processing system of this invention comprises the first printing section 10 and the second printing section 20, the first printing section 10 and the second printing section 20 are used such that the first printing section 10 is used when a picture image on a film is to be printed and the second printing section 20 is used when a composite image of picture image and character image is to be printed. Thereby, even in the case of printing only a picture image on a film, the printing can be performed without a lowered efficiency, and in the case of printing a composite image of picture image and character image, the printing can be efficiently performed. Further, since the developing section 30 is used commonly for the first printing section 10 and the second printing section 20, the system can be made compact.

Further, in the above embodiment, the image display device 211 of the image transfer unit 21 constituting the second printing section 20 is composed of a FOCRT to enable a close-contact printing. Accordingly, an image with a high resolution can be obtained. Alternatively, a PLZT element may be used to constitute the image display device 211, in place of the FOCRT. In case of using the PLZT element, a known arrangement suitable for the PLZT element may be adopted for the drive circuit 212 and the image data output unit 213. The PLZT element is composed of a transparent ceramics material with a high dielectricity obtained by adding lanthanum to a titanic acid lead zirconate, and includes a shutter array utilizing an optoelectric effect inherent to the material.

Further, the image display device 211 may comprise a Cathode Ray Tube (CRT) in place of a FOCRT. In this case, an entire image is displayed at one time, instead of 1 to several lines display as in the case of FOCRT. To sum up, the image display device 211 may take various forms as long as it can output image data in a converted form of optic signal on photographic paper.

In the above embodiment, the length of the photographic paper P that is to be transported from the loop forming section 235 toward the storage section 238 during a printing by the second printing section 20 is set at such a value as to correspond the length necessary for the printing. Alternatively, the length may be set slightly longer than the above value. Also, the construction and operation of detailed parts of the photographic processing system in the above embodiment may take various modifications and alterations.

FIGS. 23(*a*) and 23(*b*) are diagrams showing a preferred attachment structure of the pressing pad 216 in the above embodiment. Specifically, FIG. 23(*a*) is a side view of the pressing pad 216, and FIG. 23(*b*) is a rear view thereof. Note that the left/right direction shown in FIG. 23(*b*) denotes a direction viewed from the front side (+X direction) of the system. In these drawings, the pressing pad 216 includes a pad member 216*a* which is pressed against the light emitting plane 214 of the image display device 211 to render the photographic paper in close contact with the light emitting plane 214, and an attachment plate 216*b* for mounting the pad member 216*a* thereon. The pressing pad 216 is provided between the cam plate 215*d* which is pivotally mounted about the pivot shaft 215*g* shown in FIG. 3 and a pivot plate 215*m* which is also pivotally mounted about the pivot shaft 215*g* in unison with the cam plate 215*d*.

The pad member 216*a* is such that a shaft 216*c* protruding rearward (−X direction) is fixedly inserted through a through hole 216*d* in the attachment plate 216*b*. A bias member 216*e* such as a coil spring for biasing the pad member 216*a* in such a direction as to be away from the attachment plate 216*b* is provided on the shaft 216*c*. With this arrangement, when the pad member 216*a* is moved in such a direction as to render the photographic paper in pressing contact with the light emitting plane 214 of the image display device 211, the photographic paper securely comes into close contact with the light emitting plane 214 due to an elastic force of the bias member 216*e*, while preventing an unnecessary force from being exerted to the light emitting plane 214.

The attachment plate 216*b* includes side plate 216*f*, 216*g* on respective opposite sides (in Y direction) thereof. One end of each of the side plates 216*f*, 216*g* corresponding to a lower portion of the attachment plate 216*b* is mounted on the pivot shaft 215*g* to render the side plates 216*f*, 216*g* pivotable about the pivot shaft 215*g*. An L-shaped bent portion in cross section (mounting portion 216*h*) is formed on the attachment plate 216*b* at the opposite end thereof corresponding to an upper portion of the attachment plate 216*b*. A pair of engaging members 217, 218 are provided at respective ends (in Y direction) on the mounting portion 216*h*.

The engaging members 217, 218 are adapted to engage the pressing pad 216 with the cam plate 215*d* and the pivot plate 215*m*, respectively. Specifically, the engaging members 217, 218 are adapted for pivotally rotating the pressing pad 216 between the first position to render the pressing pad 216 in pressing contact with the light emitting plane 214 followed by a pivotal rotation of the cam plate 215*d* and the pivot plate 215*m* about the pivot shaft 215*g* (position where the cam follower 215*a* of the rotary disc 215*b* is moved to the position P1 in FIG. 3(*b*)) and the second position to render the pressing pad 216 away from the light emitting plane 214 (position where the cam follower 215*a* of the rotary disc 215*b* is moved to the position P3 in FIG. 3(*b*)). The cam plate 215*d* and the pivot plate 215*m* constitute a moving member which pivotally rotates the pressing pad 215 about the pivot shaft 215*g*.

The engaging member 217 includes a first bearing 217*a* fixedly mounted at a right end (+Y direction) of the mounting portion 216*h*, a second bearing 217*b* fixedly mounted at a leftward position (−Y direction) of the mounting portion 216*h* from the first bearing 217*a*, a slide member 217*c* in the form of a rod that is supported between the holders 217*a*, 217*b* to be slidable in the axial direction thereof, a bias member 217*e* such as a coil spring that is provided between an annular stopper 217*d* mounted at an intermediate position of the slide member 217*c* and the second bearing 217*b* to bias the slide member 217*c* toward the rightward direction (+Y direction) so as to protrude the rightward end (+Y direction) of the slide member 217*c* outward of the attachment plate 216*b* (i.e., toward an engageable position with the cam plate 215*d* ), and a knob 217*f* mounted at the leftward end (−Y direction) of the slide member 217*c* to exert a force in a direction opposite to the biasing direction of the bias member 217*e* so as to slide the slide member 217*c* leftward (−Y direction) (i.e., toward a non-engageable position with the cam plate 215*d*). The knob 217*f* is formed into such a shape as to protrude rearward (−X direction) in this embodiment.

The engaging member 218 includes a first bearing 218*a* fixedly mounted at a left end (−Y direction) of the mounting portion 216h, a second bearing 218b fixedly mounted at a rightward position (+Y direction) of the mounting portion 216h from the first bearing 218a, a slide member 218c in the form of a rod that is supported between the holders 218a, 218b to be slidable in the axial direction thereof, a bias member 218e such as a coil spring that is provided between an annular stopper 218d mounted at an intermediate position of the slide member 218c and the second bearing 218b to bias the slide member 218c toward the leftward direction (−Y direction) so as to protrude the leftward end (−Y direction) of the slide member 217c outward of the attachment plate 216b (i.e., toward an engageable position with the pivot plate 215m), and a knob 218f mounted at the rightward end (+Y direction) of the slide member 218c to exert a force in a direction opposite to the biasing direction of the bias member 218e so as to slide the slide member 218c rightward (+Y direction) (i.e., toward a non-engageable position with the pivot plate 215m). The knob 218f is formed into such a shape as to protrude rearward (−X direction) in this embodiment.

At a position of the cam plate 215d opposing to the slide member 217c, there is formed an engaging portion 215p with a hollow 215n therein for receiving the lead end of the slide member 217c. At a position of the pivot plate 215m opposing to the slide member 218c, there is formed an engaging portion 215r formed with a hollow 215q therein for receiving the lead end of the slide member 218c. With this arrangement, the lead end of the slide member 217c of the engaging member 217 is engagingly fitted in the hollow 215n of the engaging portion 215p. Likewise, the lead end of the slide member 218c of the engaging member 218 is engagingly fitted in the hollow 215q of the engaging portion 215r. With this arrangement, the pressing pad 216 is pivoted accompanied by a pivotal rotation of the cam plate 215d and the pivot plate 215m.

When an inwardly acting force (shown by the arrow in FIG. 23(b)) is applied to the engaging members 217, 218 by pushing the knob 217f of the engaging member 217 and the knob 218f of the engaging member 218 toward each other, for example, with a thumb and a middle finger of an operator, the respective lead ends of the slide members 217c, 218c are disengaged from the hollows 215n, 215q of the engaging portions 215p, 215r. Then, the pressing pad 216, as shown in FIG. 23(a), pivots about the pivot shaft 215g in such a direction as to be retracted away from the light emitting plane 214 of the image display device 211.

Figure 25A:
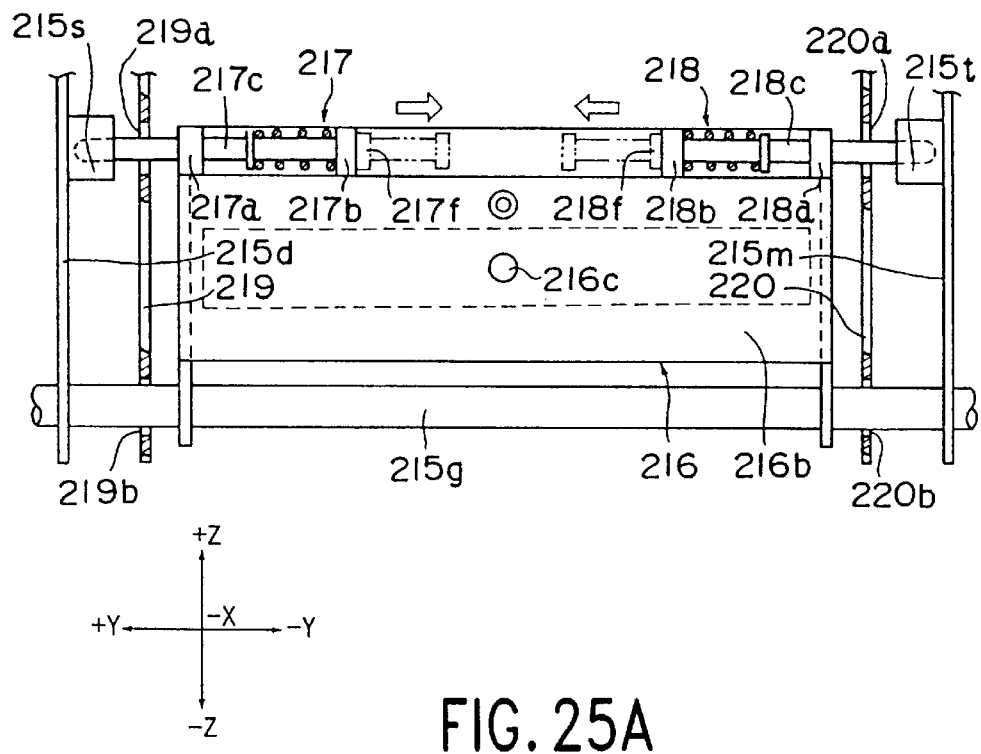
FIGS. 25(a) and 25(b) are diagrams showing another arrangement of the moving member for pivotally rotating the presser member in FIG. 3 about an axis of rotation, specifically, FIG. 25(a) being a rear view, and FIG. 25(b) being a perspective view.
Figure 25B:
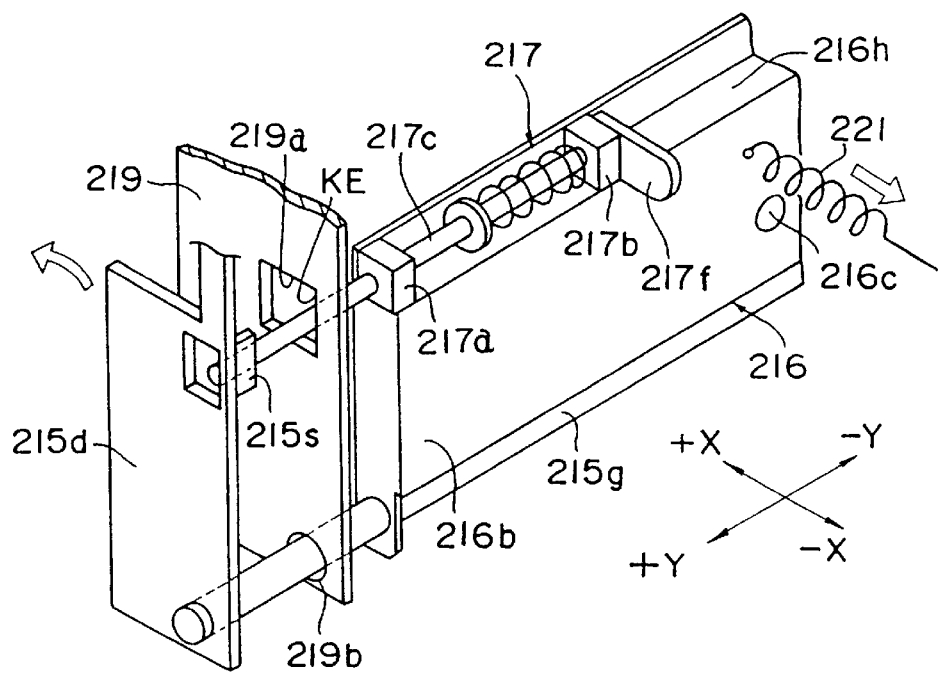

FIGS. 25(a) and 25(b) are diagrams showing an example of another arrangement of the moving member for rotating the pressing pad 216 about the pivot shaft 215g. FIG. 25(a) is a rear view showing the moving member together with the pressing pad 216 and the engaging members 217, 218. FIG. 25(b) is a partially perspective view showing the moving member together with the pressing pad 216 and the engaging member 217. The left/right direction shown in FIG. 25(a) denotes the direction viewed from the front side of the system (+X direction).

Specifically, in FIGS. 23(a) and 23(b), the right and left moving member for rotating the pressing pad 216 about the pivot shaft 215g correspond to the cam plate 215d provided with the engaging portion 215p, and the pivot plate 215m provided with the engaging portion 215r, respectively. In FIGS. 25(a) and 25(b), the right and left moving member comprises the cam plate 215d and a right engaging plate 219, and the pivot plate 215m and a left engaging plate 220, respectively such that the left and right engaging plates 220 and 219 respectively constitute the engaging members of the moving member. The cam plate 215d is formed with a presser plate 215s in place of the engaging portion 215p, and the pivot plate 215m is formed with a presser plate 215t in place of the engaging portion 215r. The attachment plate 216b of the pressing pad 216 is mounted with a bias member 221 such as a coil spring for biasing the pressing pad 216 in such a direction as to rotate the pressing pad 216 rearward (−X direction).

More specifically, the right engaging plate 219 is fixedly mounted between the pressing pad 216 and the cam plate 215, and is formed with an engaging hole 219a for inserting the slide member 217c in an upper portion thereof and a through hole 219b for rotatably inserting the pivot shaft 215g in a lower portion thereof. The left engaging plate 220 is fixedly mounted between the pressing pad 216 and the pivot plate 215m, and is formed with an engaging hole 220a for inserting the slide member 218c in an upper portion thereof and a through hole 220b for rotatably inserting the pivot shaft 215g in a lower portion thereof. The engaging holes 219a, 220a each has such a dimension as to render the pressing pad 216 movable between the first position in pressing contact with the light emitting plane 214 of the image display device 211 and the second position away from the light emitting plane 214 by moving the slide members 217c, 218c through the respective holes 219a, 220a in the fore and aft direction (X direction).

The pressing plate 215s is formed by partially cutting away the cam plate 215d, and is formed integral with the cam plate 215d at a position opposing to the lead end of the slide member 217c at a rear side (−X direction) of the slide member 217c. Likewise, the pressing plate 215t is formed by partially cutting away the pivot plate 215m, and is formed integral with the pivot plate 215m at a position opposing to the lead end of the slide member 218c at a rear side (−X direction) of the slide member 218c.

In the above arrangement, when the lead end of the slide member 217c constituting the engaging member 217 is guidingly inserted in the engaging hole 219a of the right engaging plate 219, and the lead end of the slide member 218c constituting the engaging member 218 is guidingly inserted in the engaging hole 220a of the left engaging plate 220, the pressing pad 216 is engaged with the right moving member constituting the cam plate 215d and the right engaging plate 219 and with the left moving member constituting the pivot plate 215m and the left engaging plate 220.

When the cam plate 215d and the pivot plate 215m are rotated in the direction shown by the arrow in FIG. 25(b), the lead ends of the respective slide members 217c, 218c are pressed forward (+X direction) by pressing contact with the right and left pressing plate 215s, 215t. Thereby, the pressing pad 216 is moved to the first position in pressing contact with the light emitting plane 214 against the biasing force of the bias member 221. On the other hand, when the cam plate 215d and the pivot plate 215m are rotated in a direction opposite to the direction shown by the arrow in FIG. 25(b), the pressing contact of the slide members 217c, 218c with the respective pressing plates 215s, 215t is released. Thereby, the pressing pad 216 is moved to the second position away from the light emitting plane 214 by the biasing force of the bias member 221.

The second position is, in the embodiment shown in FIG. 25(b), determined by a rear edge KE of each of the engaging holes 219a, 220a of the right and left engaging plates 219, 220. Specifically, the engaging holes 219a, 220a each has such a dimension as to set the rear edge KE inward of a pivotal area of the cam plate 215d and the pivot plate 215m.

With this arrangement, the pressing pad 216 is prevented from retracting away from the light emitting plane 214 beyond a permissible amount. Thereby, effectively suppressed is a jam of photographic paper which might have happened due to retraction of the pressing pad 216 from the light emitting plane 214 beyond the permissible amount.

Similar to the embodiment shown in FIGS. 23(a) and 23(b), in the above arrangement, when an inward directing force shown by the arrow in FIG. 25(a) is applied to the knob 217f of the engaging member 217 and the knob 218f of the engaging member 218, the lead ends of the respective slide members 217c, 218c are disengaged from the engaging holes 219a, 220a. Thereby, the pressing pad 216 is pivoted about the pivot shaft 215g and retracted away from the light emitting plane 214 of the image display device 211.

As mentioned above, according to the attachment structure of the pressing pad 216 having the above arrangement, the pressing pad 216 is easily detached from the moving member having the cam plate 215d and the moving member having the pivot plate 215m (or the moving member having the cam plate 215d and the right engaging plate 219, and the moving member having the pivot plate 215m and the left engaging plate 220). Thereby, a large space is secured between the light emitting plane 214 of the image display device 211 and the pressing pad 216 to improve maintenance of the system and facilitate jam removal operation.

In the embodiment shown in FIGS. 23(a), 23(b), 25(a) and 25(b), the pair of engaging members 217, 218 are mounted on the pressing pad 216 in a state that the slide members 217c, 218c are movable. Alternatively, the slide member 217c of the engaging member 217 may be fixedly set. In such a case, disengaging the slide member 218c of the engaging member 218 from the engaging portion 215r or the engaging plate 220 and moving the pressing pad 216 leftward (−Y direction) disengages the unmovable slide member 217c from the engaging portion 215p or the engaging plate 219.

In the embodiment shown in FIGS. 23(a), 23(b), 25(a) and 25(b), the engaging members 217, 218 are mounted on the pressing pad 216. As an altered form, in the case of the arrangement of FIGS. 23(a) and 23(b), the respective engaging members 217 and 218 may be mounted on the cam plate 215d and the pivot plate 215m in such a state that the left/right direction of the slide members 217c and 218c are reversed, and the engaging portions 215p and 215r engaged with the respective lead ends of the slide members 217c and 218c may be provided on the pressing pad 216.

In the embodiment shown in FIGS. 25(a) and 25(b), mounting the bias member 221 on the attachment plate 216b causes the pressing pad 216 to pivot rearward due to the biasing force of the bias member 221. Alternatively, for example, the following arrangement makes it possible to omit the bias member 221 and yet enables a pivotal rotation of the pressing pad 216 rearward. Specifically, the pressing pad 216 may be mounted such that the center of gravity thereof is constantly set rearward (−X direction) of the pivot shaft 215g, or plate springs having a substantially the same shape as the pressing plates 215s, 215t may be provided respectively at a position opposing to the pressing plate 215s of the cam plate 215d and a position opposing to the pressing plate 215t of the pivot plate 215m. With this arrangement, when the cam plate 215d and the pivot plate 215m are pivoted rearward, the respective lead ends of the slide members 217c, 218c are pressed rearward by the plate springs.

The pressing pad 216 is mounted on the moving member for moving the pressing pad 216 toward and away from the FOCRT by the engaging member. Accordingly, in the case of passing photographic paper by the light emitting plane of the FOCRT, setting the pressing pad 216 away from the FOCRT smoothly passes the photographic paper.

Since dust, such as paper dust, is likely adhering to the light emitting plane of the FOCRT, it is required to periodically clean the light emitting plane. Further, since a protective tape is attached to the light emitting plane of the FOCRT, it is required to replace the protective tape with a new one when the exposure is conducted for more than a predetermined number of times.

In the conventional system, however, even when the pressing pad is set away from the light emitting plane of the FOCRT, the clearance is set small to allow passage of the photographic paper. Also, the pressing pad is fixedly mounted on the moving member. Accordingly, an operator has a difficulty when performing maintenance such as removing dust, such as paper dust, adhering to the light emitting plane of the FOCRT and replacing the protective tape, which would take time for the maintenance.

As mentioned above, in the conventional system, even if the pressing pad is set away from the light emitting plane of the FOCRT, the clearance is set to allow mere passage of the photographic paper, and the pressing pad is fixedly mounted on the moving member. Accordingly, an operator has a difficulty when removing jammed photographic paper when jammed in the system, which would take time for the jam removal operation. On the other hand, according to the attachment structure of the pressing pad 216 having the above construction, various problems mentioned above can be effectively eliminated. It is certainly true to say that a conventional pressing pad 216 can be used in the photographic processing system of this invention if necessary.

The attachment structure of the pressing pad 216 in the above embodiment may be applied to a case where the image display device 211 uses a PLZT element or its equivalent, as well as the case where a FOCRT is used as the image display device 211. Further, in the above embodiment, the engaging members 217, 218 are used such that the pressing pad 216 is engageable with the moving member to pivot the pressing pad 216. Alternatively, it is possible to apply the arrangement of the engaging member to disengageably engage a first member and second member of a system other than the photographic processing system, not to mention engagement of the other parts of the photographic processing system.

Specifically, the engaging member for disengageably engaging the first member and the second member may comprise a slider supported on the first member to be movable in an axial direction thereof between an engageable position and a disengageable position with a lead end thereof engaged with an engaging portion of the second member, a bias member for urging the slider toward such a direction as to engage the lead end with the engaging portion to maintain the engaged state of the lead end with the engaging portion, and a knob for allowing an operator to exert a force in a direction opposite to the biasing force of the bias member.

With this arrangement, the lead end of the slider supported on the first member is biased by the bias member and engaged with the engaging portion of the second member to engage with the second member. Further, applying a force in the direction opposite to the biasing force of the bias member to the knob disengages the lead end of the slider from the engaging portion to release the engagement of the first member with the second member. Thereby, the first member can be easily detached from the second member.

FIGS. 26(a) to 27(b) are diagrams showing a preferred arrangement of the spool for photographic paper provided in the magazines MG1, MG2 of the first printing section 10 and the magazine MG3 of the second printing section 20.

Figure 26A:
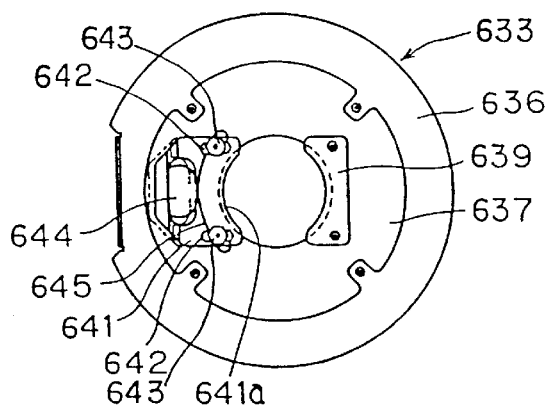
FIGS. 26(a) to 26(c) are diagrams showing a construction of a spool for photographic paper in a magazine each provided in the first printing section shown in FIG. 2 and the second printing section shown in FIG. 3, specifically, FIG. 26(a) being a top plan view when the spool is set upright, FIG. 26(b) being an elevational view in cross section of FIG. 26(a), and FIG. 26(c) being a bottom plan view of FIG. 26(b)
Figure 26B:
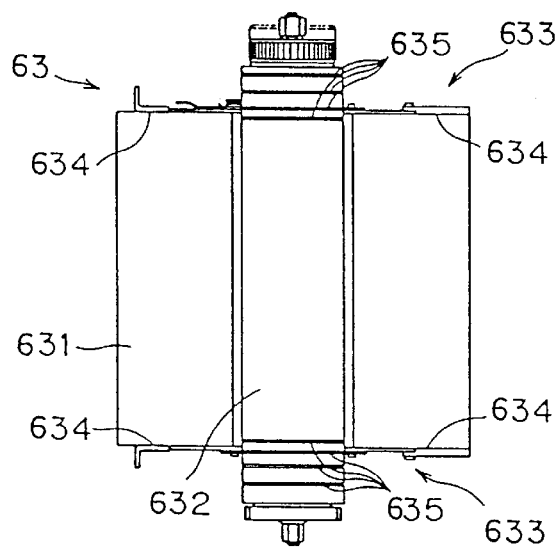

Specifically, the spool 63 shown in FIG. 26(b) includes a core member 632 for setting a paper cartridge 631 (including a core portion for winding a roll of photographic paper), spool plates 633 (width regulator) for respectively regulating the width of the photographic paper in the paper cartridge 631 set on the core member 632 from opposite ends, and a cloth member 634 as a paper dust remover provided partially or entirely on an inner surface of each of the spool plates 633 (in the embodiment, an outer circumference of the inner surface) in contact with the opposite ends of the roll of photographic paper set in the paper cartridge 631. The cloth member 634 is adapted for wiping off paper dust gathered around the opposite ends of the photographic paper during a withdrawal operation thereof, and preferably may include flocked fabric, felt, and non-woven cloth (velveteen in this embodiment).

Figure 27A:
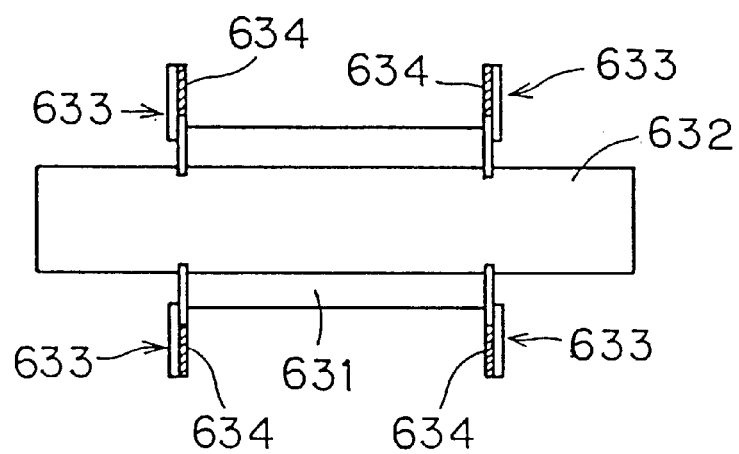
FIGS. 27(a) and 27(b) are schematic diagrams of the spool, specifically, FIG. 27(a) being a schematic view showing a construction of the spool in FIG. 26(b), and FIG. 27(b) being a schematic transverse sectional view of the spool in FIG. 27(a)
Figure 27B:
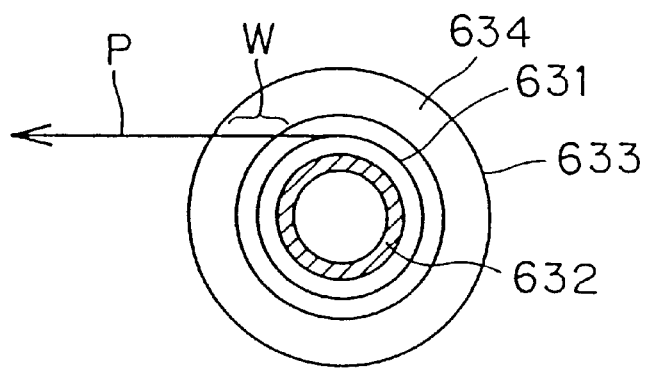

In this embodiment, as shown in an elevational and cross sectional view of FIG. 27(a) schematically showing the construction of the spool, the cloth member 634 made of velveteen is provided around the outer circumference of the inner surface of each of the spool plates 633. This arrangement is adopted, as shown in a transverse and cross sectional view of FIG. 27(b), taking into consideration that the opposite ends of the roll of photographic paper P drawn out from the paper cartridge 631 loaded on the core member 632 frictionally pass a cloth area W of the cloth member 634 made of velveteen to wipe off and remove the paper dust therefrom. The cloth member 634 made of velveteen is provided around the outer circumference of the inner surface of the spool plate 633 because the spool plate 633 is rotated about the axis of the core member 632 together with withdrawal of the photographic paper P from the paper cartridge 631. As an altered form, as long as it is sure that the spool plate 633 does not rotate together with withdrawal of photographic paper P, the cloth member 634 may be provided at least part of the inner surface of the spool plate 633 corresponding to a passing route of the opposite ends of the photographic paper P.

A plurality of grooves 635 for positioning the spool plate 633 are formed in the outer circumference of the core member 632 near the opposite ends thereof. A pair of grooves are selected from a plurality of left groove set and a plurality of right groove set respectively in correspondence to the width of the paper cartridge 631 to fit the corresponding spool plate 633 therein so as to position the paper cartridge 631 along a longitudinal direction of the core member 632. In general, the positioning of the spool plates 633 is performed by shifting one of the spool plates 633 in the corresponding groove 635, and this arrangement makes it possible to adjust the position of the spool plate 633 along the widthwise direction in conformity with the width of photographic paper with one push operation.

Figure 26C:
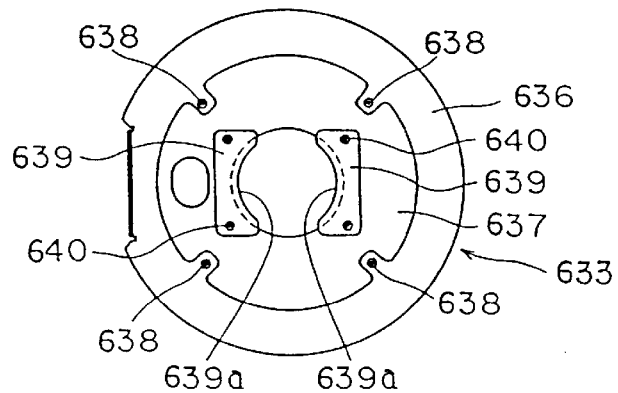

One of the spool plates 633 has, as shown in FIG. 26(c), a two-part form consisting of an outer circumference portion (outer circular plate 636) and an inner circumference portion (inner circular plate 637) combined together. The spool plate 633 is such that placing the outer circular plate 636 onto the inner circular plate 637 from outward and fixing these circular plates 636, 637 with a screw member 638 enlarges the outer diameter of the spool plate 633. The inner circular plate 637 and the outer circular plate 636 are made integral to each other. The cloth member 634 is attached to an inner surface of the outer circular plate 636 such that the inner surface of the inner circular plate 637 and the outer circular plate 636 are set flush with each other. A fixing plate 639 for fixing the spool plate 633 includes an arc portion 639a curved into such a shape as to fit along the groove 635 formed in the outer circumference of the core member 632. Fitting the fixing plates 639 along with the predetermined groove 635 in a state that the respective arc portions 639a are opposed to each other and fixing the fixing plates 639 on the inner circular plate 637 with a screw member 640 positions the spool plate 633.

The opposite spool plate 633 shown in FIG. 26(a) has a different arrangement from the above spool plate 633 in that the opposite spool plate 633 is movable in the width direction of the paper cartridge 631 with one push operation in correspondence to the width of the paper cartridge 631. Specifically, an arc portion 641a of a fixing plate 641 is retractable in and out of the groove 635 formed in the outer circumference of the core member 632 along the outer circumference of the inner circular plate 637. The fixing plate 641 is formed with oblong holes 642 each extending in the expanding/retracting direction. A pin 643 is fixed to the inner circular plate 637 through the corresponding oblong hole 642. A bar shape spring 645 is provided between the corresponding pin 643 and a center hole 644 of the fixing plate 641 in a state that the spring 645 is biased in such a direction as to fit the arc portion 641a in the groove 635. The arc portion 641a of the fixing plate 641 is movable by the biasing force of the spring 645 along the extending direction of the oblong holes 642 in such a manner that sliding the fixing plate 641 with a finger in a direction as to move the center hole 644 outward against the biasing force of the spring 645 disengages the arc portion 641a of the fixing plate 641 from the groove 635 along the extending direction of the oblong hole 642, and releasing the finger from the fixing plate 641, when the spool plate 633 is set at the predetermined position of the groove 635 in correspondence with the width of the photographic paper, fits the arc portion 641a of the fixing plate 641 in the predetermined groove 635.

With the thus constructed spool 63, when drawing out the photographic paper P from the spool 63, the photographic paper P is fed downstream with the opposite ends thereof frictionally passing the cloth member 634 in a state that paper dust adhered to the opposite ends is wiped off by the cloth member 634.

As mentioned above, the cloth member 634 is provided on the inner surface of the outer circumference of each of the spool plates 633 at least at a portion in contact with the opposite ends of the photographic paper P when the photographic paper P is about to be supplied. Accordingly, when the photographic paper P is drawn out from the paper cartridge 631 set on the core member 632, the opposite ends of the photographic paper P pass the cloth member 634 with a frictional force applied with the cloth area W, and paper dust gathered around the opposite ends of the photographic paper P is wiped off and removed. Accordingly, prevented is adhesion of paper dust on the surface of the photographic paper P before exposure and carriage of dust such as paper dust into the printing section. Consequently, prevented is generation of a white portion or white streak representing an unexposed portion corresponding to the adhered dust such as paper dust onto the photographic paper P or the image display plane 214. Printing with improved printing quality and with less printing failure can be ensured.

The spool for photographic paper having the above construction is not only limited to the photographic processing system but applicable to an apparatus other than the photographic processing system. Specifically, the spool comprising a core member for loading a photosensitive material such as photographic paper and a width regulator for regulating the width of the photosensitive material loaded on the core member may be provided with a paper dust remover provided on an inner portion of the width regulator in pressing contact with opposite widthwise ends of the photosensitive material at least during supply of the photosensitive material.

According to this arrangement, even if paper dust is adhered to the opposite ends of the photographic material, it is wiped off by the paper dust remover when drawing out the photographic material for exposure. As a result, the paper dust can be removed effectively from the photosensitive material without lowering printing efficiency.

Figure 28:
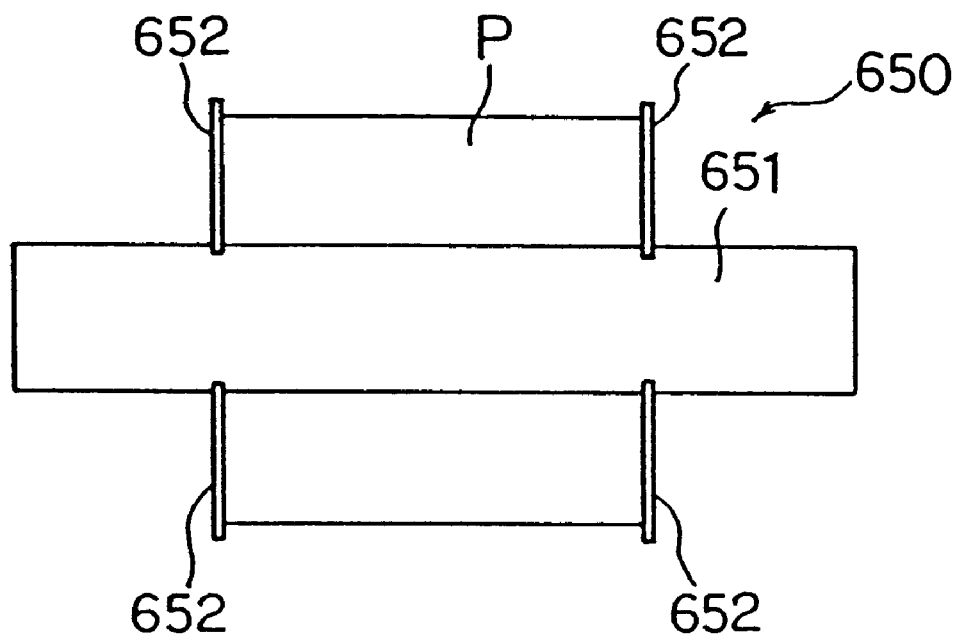
FIG. 28 is an elevational sectional view of a conventional spool for photographic paper.
Figure 29:
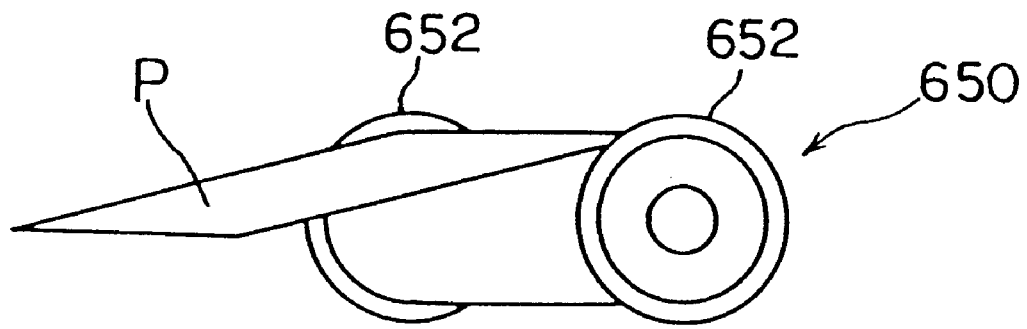
FIG. 29 is a perspective view showing a state that photographic paper is drawn out from the spool in FIG. 28 (a core member is not shown)

A conventional spool for photographic paper has a construction shown in FIGS. 28 and 29. The conventional spool 650 includes a core member 651 for winding photographic paper P and spool plates 652 for regulating the width of the photographic paper P from the opposite ends thereof.

In the conventional construction, paper dust resulting from cutting may likely be accumulated around the opposite widthwise ends of the photographic paper P when drawing out the photographic paper P from the spool 650. If such paper dust is adhered onto the surface of the photographic paper P, the adhered portion is unexposed when exposing, with the result that the unexposed portion is left white after development, which would lower printing quality.

In particular, in the case where the image display device 211 is composed of a FOCRT, the exposure is of a close-contact type, and dust is liable to be attracted onto the image display plane 214 due to static electricity generated thereon. Accordingly, there is involved a problem that, if dust such as paper dust is adhered onto the image display plane 214, the adhered portion is developed into a white streak along with the transport direction of the photographic paper P after development, which would lead to a printing failure.

To eliminate the above problem, periodically cleaning the image display plane 214 of the FOCRT is one idea to remove such dust. However, this would lower printing efficiency. Also, the periodical cleaning does not guarantee that attraction of dust such as paper dust onto the image display plane 214 is completely prevented. If the cleaning is not performed frequently, there cannot be avoided a possibility that dust such as paper dust is intruded into the printing section, which would lower exposing (printing) quality. On the other hand, according to the arrangement shown in FIGS. 26(*a*) to 27(*b*), these problems can be eliminated. Note that the spool having the arrangement shown in this embodiment is not necessarily required in the photographic processing system of this invention.

Figure 30:
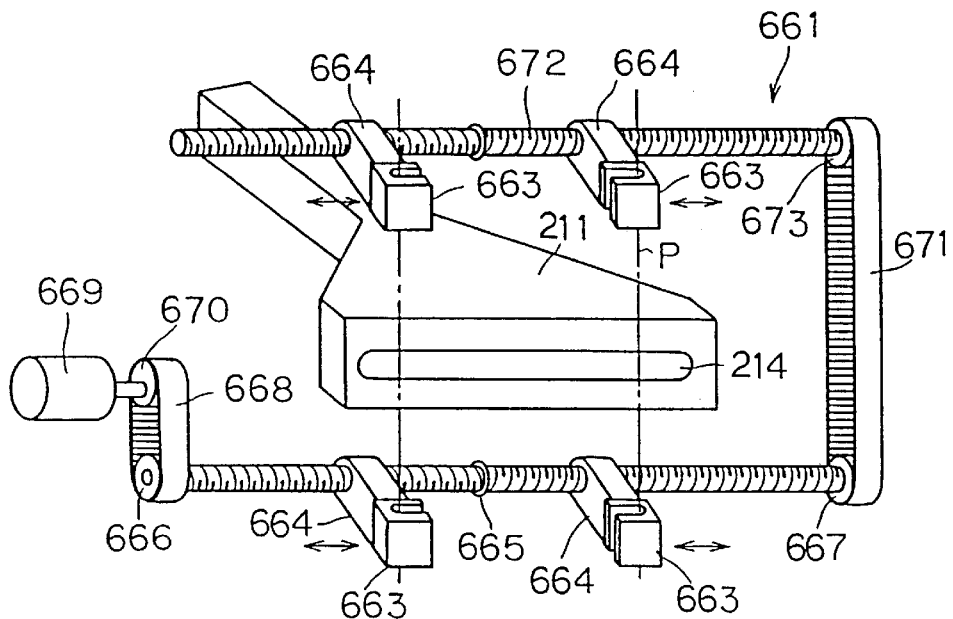
FIG. 30 is a perspective view showing a schematic construction of essential parts of a width-direction regulator in the second printing section in FIG. 3.
Figure 31A:
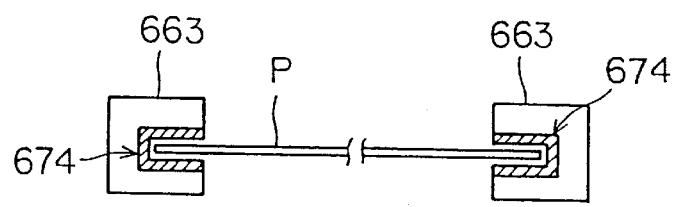
FIGS. 31(a) and 31(b) are diagrams showing a construction of a width regulating block of the width-regulator in FIG. 30, specifically, FIG. 31 (a) being a cross sectional view of the pair of blocks, and FIG. 31 (b) being a cross sectional view of the pair of blocks as an alteration.
Figure 31B:
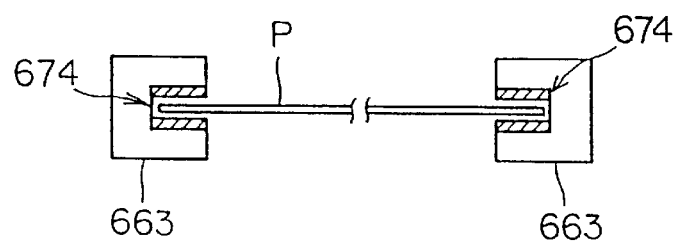
Figure 32:
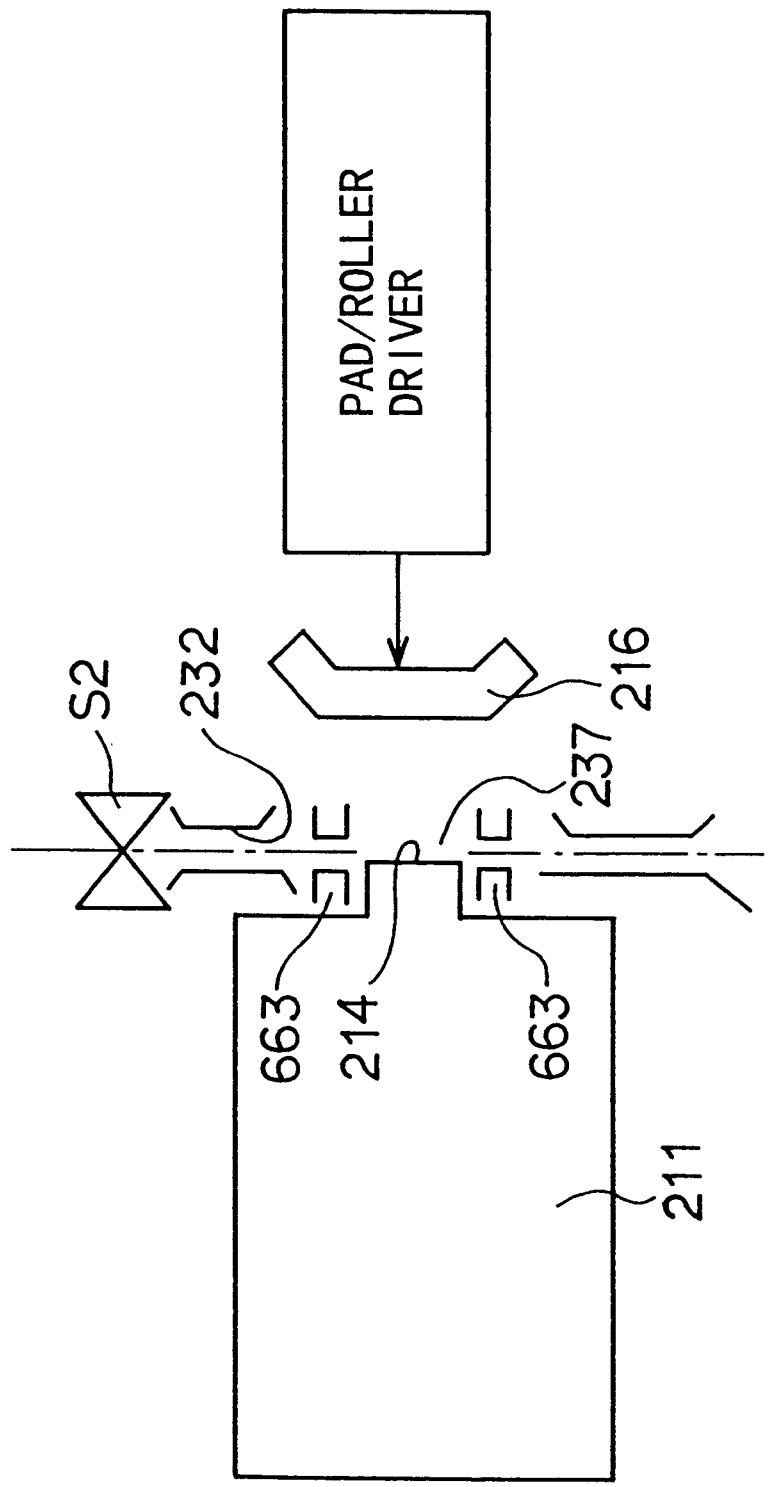
FIG. 32 is a diagram showing the essential parts of the second printing section in FIG. 3.

FIGS. 30 to 31(*b*) are diagrams showing a preferred arrangement of a width-direction regulator 661 for regulating (aligning) feeding of photographic paper in the width direction. As shown in FIG. 32, which enlargedly shows an essential part of the system in FIG. 3, the width-direction regulator 661 is provided near an upper and lower portion of the image display plane 214 of the image display device 211.

As shown in FIGS. 31(*a*) and 31(*b*), the width-direction regulator 661 for regulating feeding of photographic paper P is constructed such that pairs of width regulating blocks 663 each having a U-shaped recess is provided near the upper and lower portion of the image display plane 214 of the image display device 211 in a state that the U-shaped recess is opened opposing to each other and that photographic paper P passes between the upper width regulating block pair 663 and the lower width regulating block pair 663 in a state that the opposite width ends thereof are aligned thereby. The lower width regulating block pair 663 is each formed with an arm member 664, and a lead end of each of the arm members 664 is meshed with a threaded shaft 665.

The threaded shaft 665 has a right-handed screw portion on its left side and a left-handed screw portion on its right side with respect to a longitudinal center thereof. A pulley 666 is provided at one end of the threaded shaft 665 (left end of the righthanded screw portion), and a pulley 667 is provided at the opposite end thereof (right end of the left-handed screw portion). The pulley 666 is operatively connected to a pulley 670 provided at a lead end of a rotary shaft of a motor 669 via a belt 668, and the pulley 667 is operatively connected to a pulley 673 provided on a threaded shaft 672 having the same construction as the threaded shaft 665 via a belt 671. Arm members 664 of the upper width regulating block pair 663 are each meshed with the threaded shaft 672. Rotating the threaded shafts 665, 672 by the motor 669 moves the upper and lower width regulating block pairs 663 (U-shaped recess portions thereof) by equidistance corresponding to the width of photographic paper P to adjust the distance between the corresponding block of the upper (lower) width regulating block pairs 663.

As shown in FIG. 31(*a*), a cloth member 674 as a paper dust remover is attached to an entirety of an inner surface of the U-shaped recess of the width regulating block pair 663 by a double-sided adhesive tape or an adhesive agent. When the photographic paper P passes along the U-shaped recesses with the opposite width ends thereof aligned thereat, the cloth member 674 wipes off and removes paper dust accumulated on the opposite ends of the photographic paper P.

The cloth member 674 may preferably include flocked fabric, felt, and unwoven fabric. In this embodiment, the cloth member 674 as the paper dust remover is attached to the entirety of the inner surface of the U-shaped recess of the width regulating block 663. Alternatively, as shown in FIG. 31(*b*), the cloth member 674 as the paper dust remover may be partially provided on the inner surface of the U-shaped recess, e.g., an entire area of the opposing surfaces except a bottom surface. As an altered form, an inlet of the U-shaped recess may be widened to ease fitness of the photographic paper P.

According to this arrangement, when the photographic paper P is fed out from the loop forming section 235 and passes by the image display plane 214 of the image display device 211, even if paper dust remains at the opposite ends of the photographic paper before reaching the image display plane 214 of the image display device 211, such paper dust can be wiped off by the cloth member 674 provided on the U-shaped recess of the upper width regulating block pair 663. Thereby, paper dust intrusion onto the image display plane 214 is prevented.

Further, even if paper dust remains at the opposite ends of the photographic paper P before reaching the image display plane 214 of the image display device 211 when the photographic paper P in the paper housing box 243 is intermittently fed back in close-contact state with the image display plane 214 of the image display device 211 by a reverse rotation of the third transport roller pair 250, such paper dust is wiped off and removed by the cloth member 674 provided on the U-shaped recess of the lower width regulating block pair 663. Thereby, paper dust intrusion onto the image display plane 214 is prevented.

As mentioned above, at least a pair of width regulating blocks 663 for passing the photographic paper P in a state that the opposite width ends thereof are aligned by the U-shaped recesses are provided along the transport route on the way to the printing section, and the cloth member 674 as a paper dust remover is attached to the entirety of the inner surface of the U-shaped recess of the width regulating block pairs 663. With this arrangement, dust such as paper dust accumulated on the opposite ends of the photographic paper P is removed by the cloth member 674 before exposure. Accordingly, there can be prevented paper dust adhesion onto the surface of the photographic paper P during exposure and intrusion of dust such as paper dust into the printing section. There can be suppressed generation of a white portion or a white streak resulting from an unexposed portion of the photographic paper P due to adhesion of dust such as paper dust to the photographic paper P and the image display plane 214. Thereby, exposure with improved printing quality and with less exposing (printing) failure can be ensured.

In the above embodiment, the threaded shaft 665 with the right threaded portion and the left threaded portion is used to move the pair of width regulating blocks 663 toward and away from each other by equidistance in accordance with the width of the photographic paper P so as to enable distance adjustment. Alternatively, in place of the above manner of regulating the width of the photographic paper P, a moving mechanism for regulating the width of the photographic paper P by using a rack and a pinion gear may be adopted. It should be noted that the arrangement of the width-direction regulator is not necessarily required in the photographic processing system of this invention.

Figure 33:
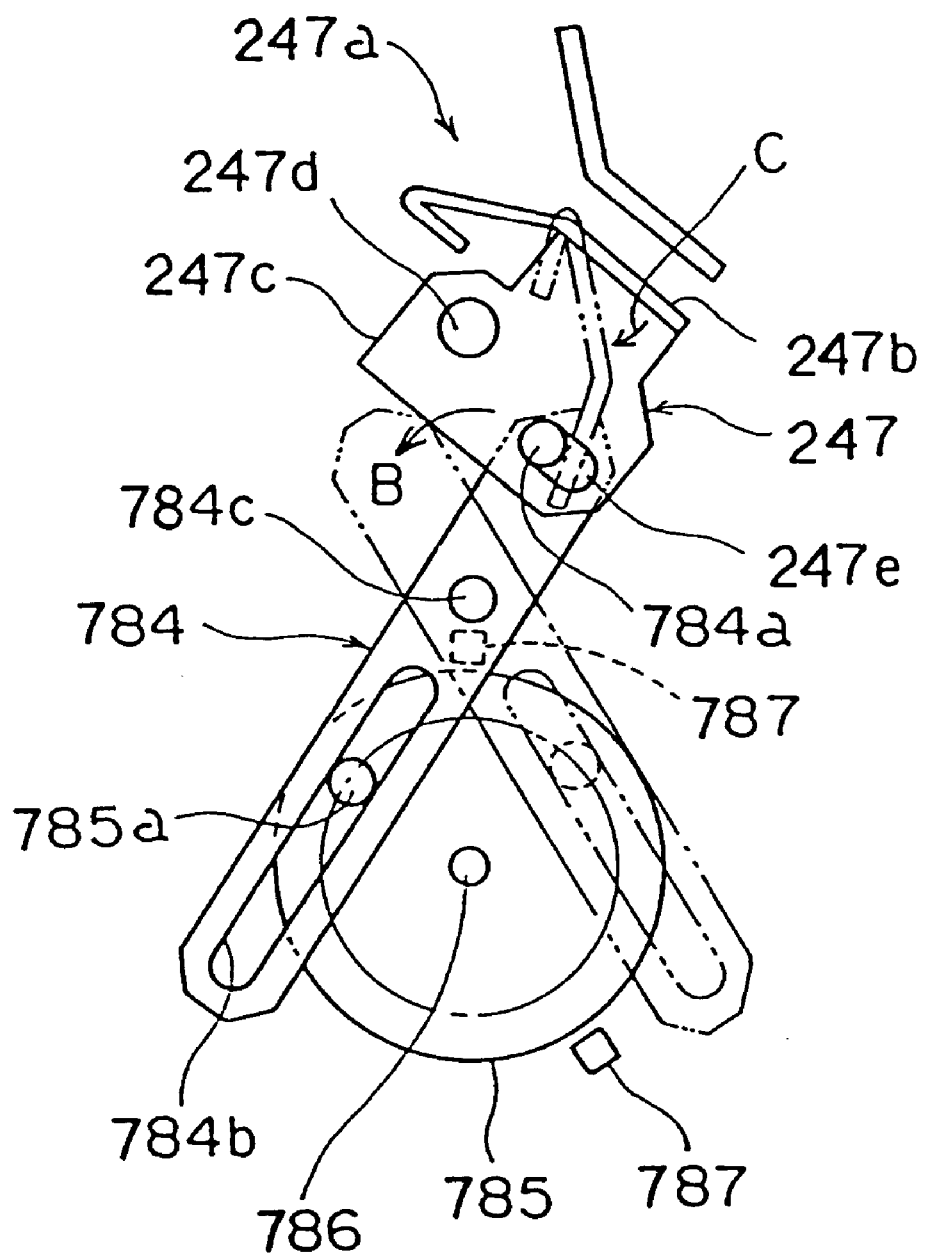
FIG. 33 is a diagram showing the construction of the guide plate and the guide driver unit in the second printing section in FIG. 3.

FIG. 33 is a diagram showing a preferred arrangement of a driver mechanism for the guide plate 247 provided downstream of the cutter unit 239.

The cutter unit 239 is controlled based on operation data inputted through the operation panel 50 by cutter drive controller means constituting the cutter driver unit 245 and the control section 60.

Figure 37A:
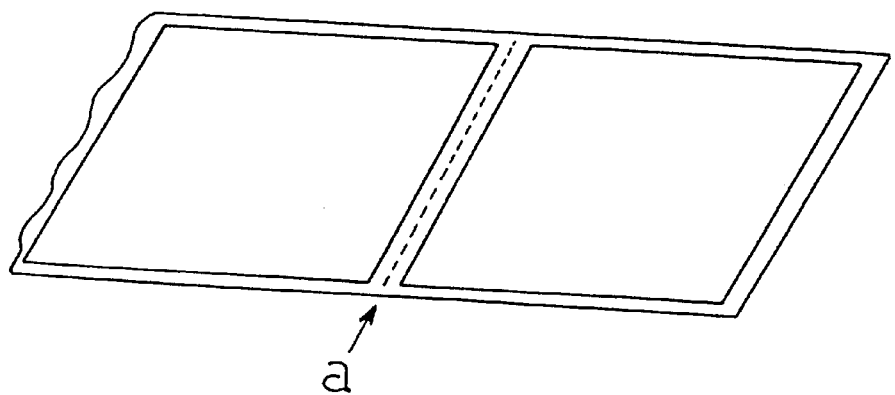
FIGS. 37(a) and 37(b) are diagrams showing a cutting manner of photographic paper, specifically, FIG. 37(a) showing a state that photographic paper is cut according to with-inner-frame format, and FIG. 37(b) showing a state that photographic paper is cut according to without-inner-frame format.
Figure 37B:
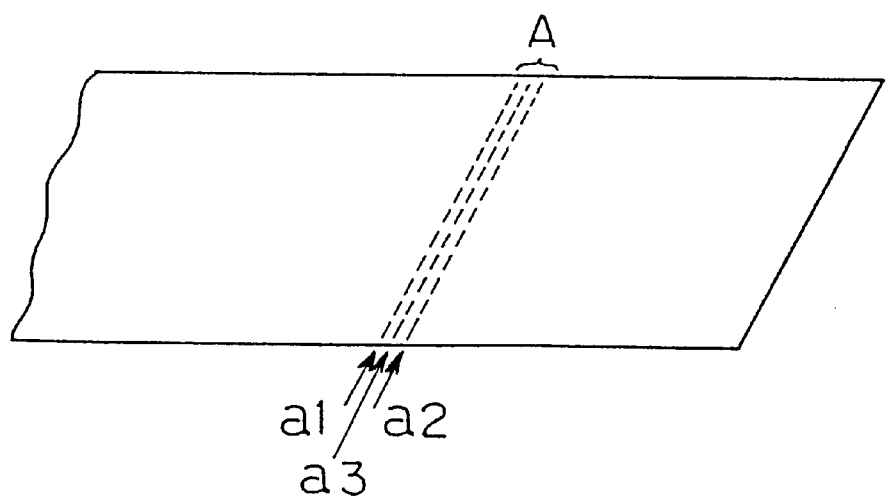

Specifically, in the case where the photographic paper is cut at the cut position a, as shown in FIG. 37(*a*), according to the with-inner-frame format (with-border format) where a white frame portion is provided around the periphery of each cut sheet of printed images, cutting is performed once without generation of small cut pieces (refuse). On the other hand, in the case where the photographic paper is cut at the cut positions a1, a2, as shown in FIG. 37(*b*), according to the without-inner-frame format (without-border format) where no white frame portion is provided around the periphery of each cut sheet, cutting is performed twice with the result that a small cut piece A, refuse of the photographic paper, is generated.

The refuse A corresponds to adjacent end portions (ends of adjacent exposed images) of two printed images which overlap with each other. By cutting the roll of photographic paper P at the cut positions a1, a2, the overlapped exposed portions are trimmed off to enable a next printed image without the overlap portion. Thereby, there can be eliminated a possibility that the end portions of the adjacent printed images overlap with each other to cope with the exposure on a roll of photographic paper according to the without-inner-frame format.

More specifically, as shown in FIG. 33, the guide plate 247 constitutes a transport guide portion 247*b* formed downstream of an inlet 247*a* which is opened in the transport route for the photographic paper. The guide plate 247 is pivotally supported about a pin 247*d* provided at a left side of a planar portion 247*c* extending from the transport guide portion 247*b*, and the planar portion 247*c* is formed with an engaging hole 247*e* at a right side thereof.

An arm-like operative link member 784 which pivots the guide plate 247 is provided with a pin 784*a* at one end thereof for engaging in the engaging hole 247*e* of the guide plate 247, and is formed with an oblong engaging hole 784*b*. The link member 784 is pivotally supported about the pin 784*c* provided between the pin 784*a* and the engaging hole 784*b*.

A disc member 785 for pivoting the link member 784 is provided with a pin 785*a* at an outer perimeter thereof for engaging in the engaging hole 784*b* of the link member 784, and a rotary drive shaft 786 of a DC motor is rotatably connected to the center of the disc member 785. The link member 784, the disc member 785, and the DC motor constitute the guide driver unit 248. With this arrangement, the guide plate 247 is moved between the first position (transport guide position) for guiding the photographic paper downstream through the inlet 247*a* and the second position (refuse guide position) for guiding the refuse of unnecessary end portions trimmed off from the exposed portion into the refuse collecting box 246. The DC motor constituting the guide driver unit 248 is controlled by the control section 60. The guide driver unit 248 and the control section 60 constitute the guide drive controller means.

Detector means 787 such as a reflective type photosensor for detecting a cutaway (not shown) formed in the outer perimeter of the disc member 785 is provided at two positions. The detector means 787 detects an angular rotated position of the disc member 785, namely, the pivoted position of the guide plate 247 (the transport guide position and the refuse guide position). An output signal from the detector means 787 is inputted to the control section 60.

The guide drive controller means controls the DC motor, during a trimming operation of the unnecessary end portion of the printed image, to rotate the disc member 785 in such a manner that an engagement of the pin 785*a* of the disc member 785 in the engaging hole 784*b* pivots the link member 784 about the pin 784*c* as to shift the link member 784 to the imaginary-lined state, thereby moving the transport guide portion 247*b* of the guide plate 247 toward the refuse guide position shown by the imaginary line in FIG. 33.

At this time, the detector means 787 monitors the angular rotated position of the disc member 785. When the detector means 787 detects the cutaway in the outer perimeter of the disc member 785, the guide drive controller means suspends the driving of the DC motor to set the guide plate 247 at the refuse guide position shown by the imaginary line. Similarly, when the detector means 787 detects the cutaway in the outer perimeter of the disc member 785 during the transport of the photographic paper, the guide drive controller means suspends the driving of the DC motor to set the guide plate 247 at the transport guide position shown by the solid line in FIG. 33.

Alternatively, a sensor for detecting an accumulated amount of refuse in the refuse collecting box 246 may be provided. When the sensor detects that the refuse in the refuse collecting box 246 exceeds a predetermined amount, alert means such as a buzzer and a lamp may be turned on to alert the operator that the box 246 is full.

Figure 34:
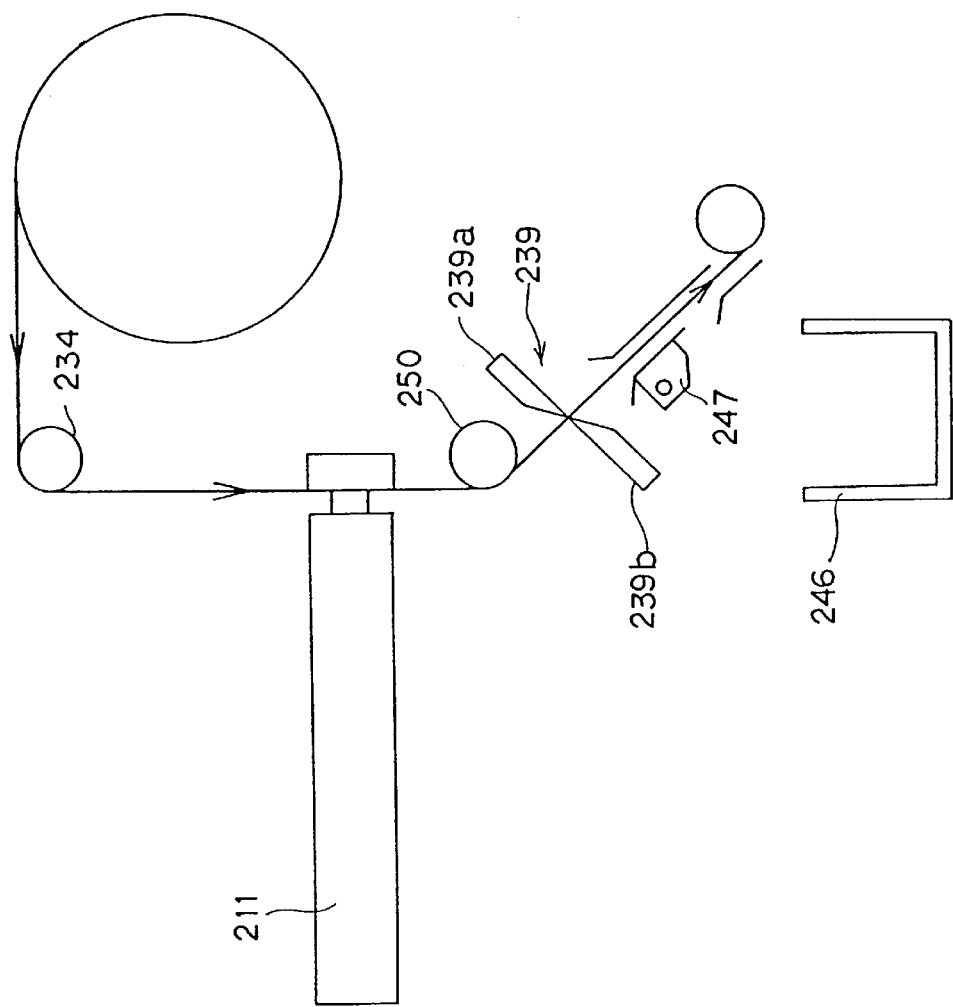
FIG. 34 is a schematic diagram of a printing unit and a cutter unit in the second printing section in FIG. 3.
Figure 35A:
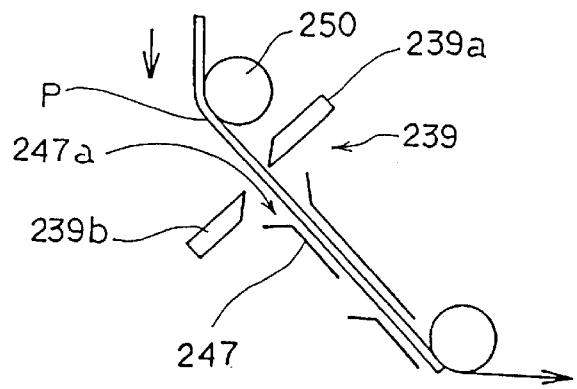
FIGS. 35(a) to 35(c) are schematic diagrams showing an operational state of the cutter unit in FIG. 34, specifically, FIG. 35(a) showing a state that photographic paper is fed toward the cutter unit, FIG. 35(b) showing a state that the photographic paper is about to be cut, and FIG. 35(c) showing a state before a lead end of the photographic paper is trimmed off.
Figure 35B:
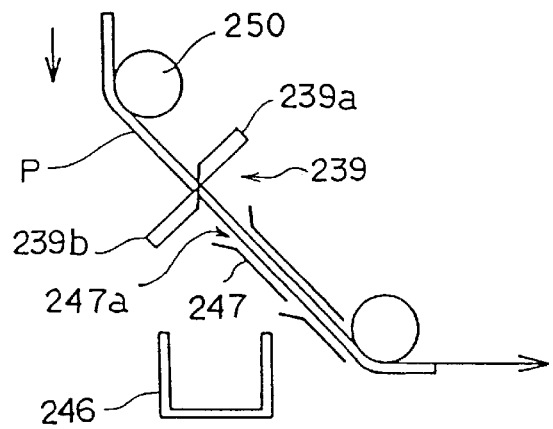
Figure 35C:
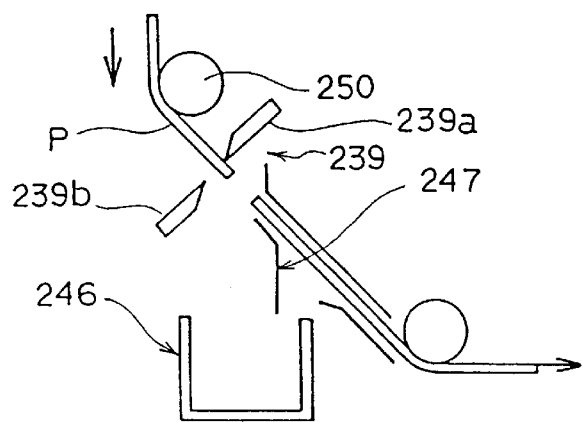

FIGS. 34 to 35(*c*) are diagrams schematically showing a manner of cutting the photographic paper P by the cutter unit 239. At an initial stage of cutting, as shown in FIG. 35(*a*), the first blade 239*a* and the second blade 239*b* are disposed in spaced relation, and the guide plate 247 is set at the transport guide position with the inlet 247a opened toward the photographic paper P. The photographic paper P is transported between the space of the first and second blades 239a, 239b toward the cutter unit 239 by a predetermined length corresponding to the exposed portion of the photographic paper P based on the position of the paper sensor S3 (see FIG. 3). When the photographic paper P is transported toward the cutter unit 239 by the predetermined length, as shown in FIG. 35(*b*), the first blade 239a and the second blade 239b are moved toward each other to cut the photographic paper P thereat.

In case of without-inner-frame format, the above cutting operation follows a lead-end trim-off operation of the remaining roll of photographic paper P. Specifically, as shown in FIG. 35(*c*), the photographic paper P after the cutting is transported slightly forward by the predetermined length (e.g., about 3 mm) toward the cutter unit 239 by the third transport roller pair 250, and the lead end of the photographic paper P is trimmed off by the first blade 239a and the second blade 239b. Thereby, the end portion of the exposed portion which is magnified with a slightly enlarged magnification ratio (corresponding to an unnecessary portion at the lead end of a next exposed image) is trimmed off.

Figure 36A:
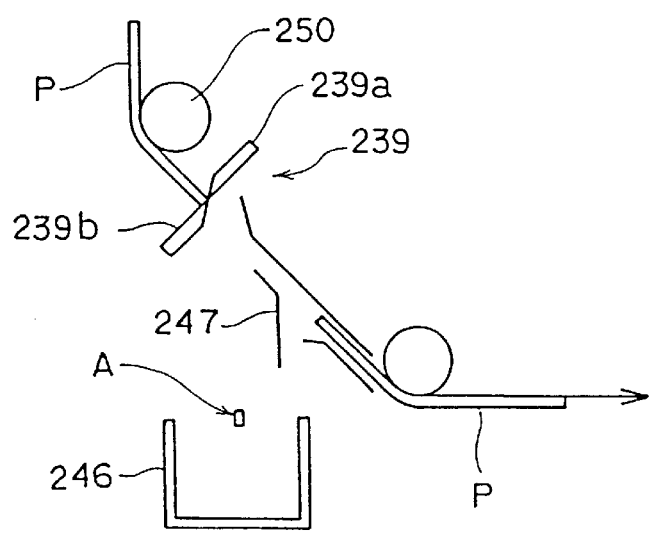
FIGS. 36(a) and 36(b) are schematic diagrams showing an operational state of the cutter unit in FIG. 34, specifically, FIG. 36(a) showing a state immediately after the lead end of the photographic paper is trimmed off, and FIG. 36(b) showing a state that the photographic paper is returned to a feed operation after the lead end trim-off operation.
Figure 36B:
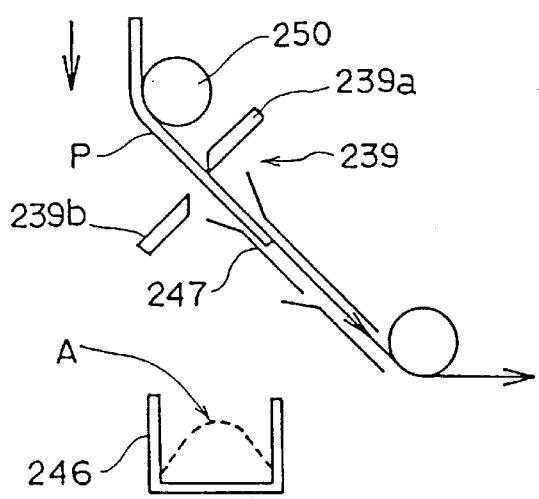

During the trim-off operation, as shown in FIG. 36(*a*), the guide plate 247 set at the downstream side of the first blade 239a and the second bade 239b is shifted to the refuse guide position to guide the refuse A into the refuse collecting box 246. With this arrangement, there can be prevented a case that the unnecessary printed end portion trimmed off by the first blade 239a and the second blade 239b flips back during the trimming operation into the paper transport route, which might have caused paper jam, because the inlet 247a opened toward the transport route is closed during the trim-off operation. Accordingly, the refuse A is securely guided into the refuse collecting box 246 and collected therein. The drawing of FIG. 36(*b*) shows a state that the remaining roll of photographic paper carrying the next exposed image is being transported toward the cutter unit 239 after the lead end trim-off operation.

As mentioned above, in the case where the without-inner-frame image is printed on the roll of photographic paper, the guide plate 247 is moved in such a direction as to guide the refuse into the refuse collecting box 246. Accordingly, even if the refuse trimmed off by the cutter unit 239 flips back during the trimming operation, the refuse can be securely collected into the refuse collecting box 246.

Further, since the guide drive controller means controllably sets the guide plate 247 at the refuse guide position during the trimming of the unnecessary printed end portion, one member is commonly used as the transport guide member and the refuse guide member. Accordingly, the number of parts can be reduced, and a problem such as paper jam resulting from intrusion of the refuse into the transport assembly can be prevented, thereby contributing to shortening of the printing time and reducing the printing failure.

In the conventional photographic processing system, in the case where the printing is of a close-contact type to obtain a composite image of picture image and character image and performed according to the with-inner-frame format (with-border), loaded is the magazine internally provided with the spool around which a roll of photographic paper is wound to transport the photographic paper drawn out from the spool to the printing section. When the photographic paper reaches the printing section, digital image is outputted in the unit of 1 to several lines successively while intermittently feeding the photographic paper to perform the close-contact printing onto the photographic paper. Thereafter, the photographic paper is cut by the cutter in correspondence to the printed region containing the picture image and the character image, and the cut sheet of photographic paper carrying the printed image is transported to the developing section for development.

In the case where the printing is conducted to obtain a composite image of picture image and character image according to the without-inner-frame format (without-border), the conventional photographic system is operated such that the photographic paper drawn out from the spool is cut by the predetermined length, and the cut sheet of photographic paper P is transported to the printing section. In the printing section, a picture image is printed onto a picture region on the cut sheet with a character region on the cut sheet covered with a shield mask. Thereafter, a character image on a lithographic negative film is printed onto the character region of the cut sheet with the picture region covered with a shield mask. Thus, the photographic paper is cut in advance before printing, printed with the picture image and the character image at the predetermined region, and then, transported to the developing section for development.

As another arrangement of the conventional photographic processing system, the following method can be adopted. When the printed image is to be obtained according to the without-inner-frame format (without-border), as shown in FIG. 37(*b*), an actual printing may be conducted according to the with-inner-frame format shown in FIG. 37(*a*) as mentioned above, and then a white frame portion generated by the with-inner-format may be trimmed off by the cutter.

When the with-inner-frame format (with-border) shown in FIG. 37(*a*) is adopted in the conventional system, digital image outputted in the unit of 1 to several lines is printed in close contact with the photographic paper while feeding the roll of photographic paper intermittently, and the photographic paper having the printed digital picture and character image is cut by the predetermined position a for cutting. However, in the case where the printing is of a close-contact type, not of a projection type and performed according to the without-inner-frame format (without-border) as shown in FIG. 37(*b*), the following problem cannot be avoided. If the photographic paper is cut by the predetermined length prior to the printing as performed in the method of the conventional system, an additional cumbersome operation is involved such that the cut sheets of photographic paper are required to be transported to the printing section one by one while securely nipping each of the cut sheets or attracting each of the cut sheets toward the printing plane by a vacuum sucking device and the like. This would make the arrangement of the transport section complex, and the timing of transporting the photographic paper in synchronism with 1 to several line output of digital image data must be set precisely to perform the close-contact printing. In any case, the transport control becomes difficult.

Further, when photographic paper is cut by the predetermined length on the downstream side of the printing section in the case where the printing is of a close-contact type using a roll of photographic paper and performed according to the without-inner-frame format (without-border) shown in FIG. 37(*b*), the following problem is involved. The above problems concerning to the transport accuracy and complex transport arrangement can be solved in this case, however, adjacent printed end portions (end portions of the exposed portions) of two exposed images are left in an overlapped state. Specifically, merely cutting the photographic paper at the cut position a3 corresponding to a center line between the adjacent end portions leaves the overlapped portion (overlapped exposed portion) at opposite ends of the cut sheet, which is not desirable as a finished state of printed image. To sum it all up, in the conventional system, the serial close-contact printing in which a roll of photographic paper is drawn out from the spool and cut at the predetermined length after a close-contact printing is feasible to the with-inner-frame format but could not be applied to the without-inner-frame format.

Further, in the case where the without-inner-frame image is obtained by trimming off the white frame portion generated by printing the image according to the with-inner-frame format, the arrangement and the control of the cutter unit become complicated, and the finished size of the cut sheet becomes smaller. On the contrary, the arrangement of this invention can handle the case of serial close-contact printing in which a roll of photographic paper is cut after a close-contact printing according to the without-inner-frame format.

The photographic processing system of this invention can take the following modified arrangements.

(1) A photographic processing system may comprise a first printing section for printing a film image on photographic paper as a photosensitive material by projection; a second printing section for printing an image displayed on an image display device onto the photographic paper by projection; and a common developing section for developing the exposed image on the photographic paper. The first printing section and the developing section are respectively disposed in the forward and rearward direction of the system, and the second printing section is disposed above the first printing section. The second printing section has a magazine loader unit for mounting a magazine formed with a withdrawal port, for the photographic paper, opened in the forward direction of the system, a first transporter for transporting the photographic paper drawn out from the magazine downward, and a second transporter extending rearward from lower part of the magazine loader unit for transporting the photographic paper transported from the first transporter to the developing section. The image display device has an image display plane opposing to the first transporter on the forward side of the first transporter.

With this arrangement, in the case where a picture image on a film is printed, the film image is optically printed on the photographic paper by the first printing section, and the photographic paper carrying the printed image is transported to the developing section shared by the second printing section for development. In the case where a composite image of a picture image on a film and a character image is printed a, digital image of the picture image, and character image that is digitized in advance, is printed on the photographic paper by the second printing section disposed above the first printing section, and the photographic paper carrying the printed image is transported to the developing section shared by the first printing section for development. When the image is printed in the second printing section, the photographic paper drawn out from the magazine is printed by the image display device on the way of the downward transport by the first transporter, and the photographic paper, after the printing, is transported to the developing section by the second transporter that extends rearward at the lower part of the magazine loader unit.

According to the above arrangement, selective use of the first printing section and the second printing section enables efficient printing of the composite image of the picture image and character image. Further, even in the case of printing a picture image on a film, the printing efficiency is not lowered. In addition, since the first printing section, the second printing section, and the developing section are arranged at appropriate positions, the system can be made compact.

(2) In the arrangement of (1), a loop forming section for storing the photographic paper in the form of a loop may be disposed upstream of the image display device in the first transporter, a storage section for temporarily storing the photographic paper, before a printing, which has been transported from the loop forming section via the image display device may be disposed downstream of the image display device in the first transporter, a guide member for guiding the photographic paper fed out from the loop forming section into the storage section may be provided, and transport drive controller means may be provided for controlling the loop forming section to feed the photographic paper from the loop forming section downstream by a length at least necessary for the printing while passing the photographic paper by the image display device without effecting printing, and then feed back the photographic paper toward upstream by the length while passing the photographic paper by the image display device for the printing when the image is printed in the second printing section.

With this arrangement, when the printing is performed by the second printing section, the photographic paper is stored in the loop forming section in the form of a loop, transported from the loop forming section toward the storage section by the length at least necessary for the printing while passing by the image display device without effecting the printing, and temporarily stored in the storage section. Then, the photographic paper stored in the storage section is fed back upstream to perform the printing by the image display device during the backward feeding. Further, according to this arrangement, the photographic paper can be fed into the storage section from the loop forming section by the exact length, and fed backward from the storage section with a precise feeding rate.

(3) In the arrangement of (2), the system may further comprise guide driver means for guiding the photographic paper fed out from the loop forming section toward the storage section only when a first frame image of the film is printed by the image display device.

With this arrangement, only when the first frame image is printed, the photographic paper stored in the loop forming section in the form of a loop is once transported to the storage section for temporal storage of the photographic paper therein, and then fed backward toward upstream side. According to this arrangement, although the photographic paper is required to be transported downstream into the storage section without a printing and then fed backward from the storage section for the printing when the first frame image is printed, the printing on the second and subsequent frame images is performed by direct feed back of the photographic paper from the downstream side. Accordingly, the processing speed can be raised.

(4) In one of the arrangements (1) to (3), the magazine loader unit may include a magazine loader mechanism having a guide rail vertically pivotable about a lengthwise end thereof and a magazine loading base mounted on the guide rail to be slidable in and out of the magazine loader unit along the guide rail.

With this arrangement, the following procedure is taken for replacement of the magazine loaded on the magazine loader unit. Specifically, the magazine loading base is drawn out from the magazine loader unit along the guide rail. Then, pushing the magazine loading base downward pivots the guide rail about the lengthwise end to lower the magazine loading base relative to the magazine loader unit. In this state, the magazine is removed from the magazine loading base and a new magazine is loaded thereon. Then, lifting the magazine loading base upward sets the guide rail in a horizontal posture. Thereafter, sliding the magazine loading base along the guide rail accommodates the magazine loading base into the magazine loader unit. With this arrangement, a magazine of a heavy weight can be easily loaded on the magazine loader unit.

(5) In one of the arrangements (1) to (4), the developing section may include a first inlet for introducing the photographic paper, after the printing by the first printing section, inside the developing section, a first feeder unit for feeding the photographic paper guided through the first inlet to a developing start position, a second inlet for introducing the photographic paper, after the printing by the second printing section, inside the developing section, and a second feeder unit for feeding the photographic paper guided through the second inlet to the developing start position.

With this arrangement, the photographic paper after the printing by the first printing section is transported to the developing section through the first inlet and guided to the developing start position by the first feeder unit. On the other hand, the photographic paper after the printing by the second printing section is transported to the developing section through the second inlet and guided to the developing start position by the second feeder unit. According to this arrangement, the printed image is securely developed by the developing section regardless of the location of the printing section.

As mentioned above, the present invention is directed to a photographic processing system comprising: a first printing section including a printing unit for printing a film image onto a photosensitive material by projection; a second printing section including a printing unit for printing image data onto the photosensitive material by converting the image data into a light signal and outputting the light signal; and a common developing section for developing the printed image on the photosensitive material wherein the first and second printing sections each has a magazine loader unit for mounting thereon a magazine including therein the photosensitive material in a roll form, and a transporter for transporting the photosensitive material drawn out from one of the magazines to the developing section via a corresponding one of the printing units.

According to this arrangement, in the case where a picture image on a film is printed, the film image is optically printed on the photographic paper by the first printing section, and the photographic paper carrying the printed image is transported to the developing section shared by the second printing section for development. In the case where a composite image of a picture image on a film and a character image is printed a, digital image of the picture image and character image that is digitized in advance is printed on the photographic paper by the second printing section, and the photographic paper carrying the printed image is transported to the developing section shared by the first printing section for development. As a result, the composite image of picture image and character image can be efficiently printed. Further, even in the case of printing a picture image on a film, the printing efficiency is not lowered, and the system of a compact size can be produced.

Preferably, the second printing section may be disposed above the first printing section.

According to this arrangement, in the case where a composite image of a picture image on a film and a character image is printed, digital image of picture image and character image that is digitized in advance is printed on the photographic paper by the second printing section disposed above the first printing section. As a result, the floor area occupied by the installation of the system can be reduced, and the system of compact size is produced.

Preferably, the photographic processing system may further comprise: a loop forming section disposed upstream of the printing unit in the transporter of the second printing section with respect to the feed direction of the photosensitive material for temporarily storing the photosensitive material in the form of a loop; a storage section disposed downstream of the printing unit in the transport unit for temporarily storing the photosensitive material, before a printing, which has been transported from the loop forming section via the printing unit, a guide member for guiding the photosensitive material fed out from the loop forming section into the storage section, and transport drive controller means for controlling the loop forming section to feed the photosensitive material from the loop forming section downstream of the printing unit by a length at least necessary for the printing while passing the photosensitive material by the printing unit without effecting the printing and then feed back the photosensitive material upstream by the length while passing the photosensitive material by the printing unit and effecting the printing when the image is printed in the second printing section.

According to this arrangement, when the printing is performed by the second printing section, the photographic paper is stored in the loop forming section in the loop form, transported from the loop forming section toward the downstream located storage section by the length at least necessary for the printing while passing by the printing unit without effecting the printing, and temporarily stored in the storage section. Then, the photographic paper stored in the storage section is fed back upstream to perform the printing by the printing unit during the backward feeding. Accordingly, the photosensitive material can be fed into the storage section from the loop forming section by the exact length, and fed backward from the storage section with a precise feeding rate.

Preferably, the photographic processing system may further comprise guide driver means for guiding the photosensitive material fed out from the loop forming section toward the storage section when a first frame image of the film is printed by the printing unit.

According to this arrangement, when the first frame image is printed the photographic paper stored in the loop forming section in the form of a loop is once transported to the storage section for temporal storage of the photographic paper therein, and then fed backward toward upstream side. Although the photographic paper is required to be transported downstream into the storage section without a printing at the initial stage and then fed backward from the storage section for the printing when the first frame image is printed, the printing on the second and subsequent frame images is performed by direct feed back of the photographic paper from the downstream side. Accordingly, the processing speed can be raised.

Preferably, the magazine loader unit in the second printing section may include a magazine loader mechanism having a guide rail vertically pivotable about a lengthwise end thereof and a magazine loading base mounted on the guide rail to be slidable in and out of the magazine loader unit along the guide rail.

According to this arrangement, the following procedure is taken for replacement of the magazine loaded on the magazine loader unit. Specifically, the magazine loading base is drawn out from the magazine loader unit along the guide rail. Then, pushing the magazine loading base downward pivots the guide rail about the lengthwise end to lower the magazine loading base relative to the magazine loader unit. In this state, the magazine is removed from the magazine loading base and a new magazine is loaded thereon. Then, lifting the magazine loading base upward sets the guide rail in a horizontal posture. Thereafter, sliding the magazine loading base along the guide rail accommodates the magazine loading base into the magazine loader unit. With this arrangement, a magazine of a heavy weight can be easily loaded on the magazine loader unit.

Preferably, the developing section may include a first inlet for introducing the photosensitive material after the printing by the first printing section inside the developing section, a first feeder unit for feeding the photosensitive material guided through the first inlet to a developing start position, a second inlet for introducing the photosensitive material after the printing by the second printing section inside the developing section, and a second feeder unit for feeding the photosensitive material guided through the second inlet to the developing start position.

According to this arrangement, the photographic paper after the printing by the first printing section is transported to the developing section through the first inlet and guided to the developing start position by the first feeder unit. On the other hand, the photographic paper after the printing by the second printing section is transported to the developing section through the second inlet and guided to the developing start position by the second feeder unit. According to this arrangement, the printed image is securely developed by the developing section regardless of the location of the printing section.

Preferably, the magazine may internally be provided with a spool for winding the photosensitive material, and the spool may include a core member for setting the photographic material thereon, a width regulator for regulating the width of the photosensitive material set on the core member, and a paper dust remover provided on an inner surface of the width regulator in pressing contact state with opposite width ends of the photosensitive material at least during supply of the photosensitive material.

According to this arrangement, paper dust adhered to the opposite ends of the photosensitive material during supply of the photosensitive material is wiped off by the paper dust remover. Thereby, the paper dust is prevented from adhering to the surface of the photosensitive material before printing and dust such as paper dust is prevented from intruding into the printing section. As a result, suppressed is generation of a white portion or white streak representing an unexposed portion corresponding to the adhered paper dust onto the photosensitive material or the image display plane of the image display device, and a printing with improved printing quality and with less printing failure can be assured.

Preferably, the photographic processing system may further comprise a width-direction regulator provided at a specified position along a transport route for the photosensitive material before the photographic material reaches the printing unit in the second printing section for regulating the width of the photosensitive material, and a paper dust remover provided at least part of an inner surface of the width-direction regulator in pressing contact with the photosensitive material.

According to this arrangement, paper dust adhered to the opposite ends of the photosensitive material before reaching the printing unit is wiped off by the paper dust remover. Thereby, the paper dust is prevented from adhering to the surface of the photosensitive material before printing and dust such as paper dust is prevented from intruding into the printing section. As a result, suppressed is generation of a white portion or white streak representing an unexposed portion corresponding to the adhered paper dust onto the photosensitive material or the image display plane of the image display device, and printing with improved printing quality and with less printing failure can be assured.

More preferably, the printing unit of the second printing section may include an image display device having a fiber optic cathode ray tube (FOCRT) for performing a contact-type exposure.

In the case where the image display device is of a FOCRT type, particularly dust is liable to be attracted to the image display device due to static electricity with the result that paper dust is liable to be adhered to the image display plane. However, according to this arrangement, since the paper dust remover is provided on the spool and/or the width-direction regulator, the paper dust is prevented from being attracted onto the image display plane of the printing unit. As a result, printing with improved printing quality and with less printing failure is enabled.

Preferably, the printing unit of the second printing section may include an image display device for performing a contact-type exposure and a presser member for rendering the photosensitive material in pressing contact with a light emitting plane of the image display device, and the presser member may be detachably mounted on a mover which selectively sets the presser member at a first position in pressing contact with the light emitting plane and a second position in spaced relation to the light emitting plane by an engaging member.

According to this arrangement, the presser member is detachably mounted on the moving member that sets the presser member between the first position in pressing contact with the light emitting plane and the second position in spaced relation to the light emitting plane by the engaging member. In this arrangement, the presser member can be easily detached from the moving member.

Preferably, the engaging member may include a slider supported on the presser member to be movable in an axial direction thereof with a lead end thereof engageable with an engaging portion of the mover, a bias member for urging the slider toward such a direction as to engage the lead end with the engaging potion to maintain the engaged state of the slider with the engaging portion, and a knob for allowing an operator to exert a force in a direction opposite to the biasing force of the bias member.

According to this arrangement, engagement of the lead end of the slider supported by the presser member with the engaging portion of the moving member due to the biasing force of the bias member facilitates mounting of the presser member on the moving member. Further, the engagement of the lead end of the slider with the engaging portion is released by application of a force in the direction opposite to the biasing direction by the knob, thereby releasing the engagement of the presser member with the moving member. As a result, the presser member can be easily detached from the moving member.

Preferably, the mover may be provided at the opposite ends of the presser member, and the engaging member may be so constructed that the lead end of the slider opposes to the corresponding mover at the opposite ends of the presser member.

According to this arrangement, the presser member is engaged with the moving member provided at the opposite ends of the presser member by the engaging member provided at the opposite ends thereof. As a result, the presser member is securely engaged with the moving member, and easily detached from the moving member.

Preferably, the presser member may be pivotally mounted on the mover about an end thereof to be movable toward and away from the light emitting plane of the image display device, and the engaging member may be provided at an end of the presser member opposite to the pivotal end.

According to this arrangement, when the presser member is detached from the moving member, the presser member is away from the light emitting plane of the image display device by a sufficiently large distance. As a result, maintenance service on the light emitting plane of the image display device can be facilitated.

Preferably, the presser member may have a pressing pad rendered into pressing contact with the photosensitive material, an attachment plate for mounting the pressing pad thereon, and a bias member for urging the pressing pad in a direction away from the attachment plate.

According to this arrangement, the photosensitive material is pressed against the image display device by the pressing pad attached to the attachment plate for elastic close contact with the light emitting plane of the image display device. As a result, the photosensitive material is securely rendered into close contact with the light emitting plane, while preventing an unnecessary force from being exerted on the light emitting plane.

Preferably, the photographic processing system may further comprise a cutter unit provided downstream of the second printing section with respect to the feed direction for cutting the photosensitive material after the printing, and cutter drive controller means for controlling the cutter unit and the transporter to cut the photosensitive material at a specified length in correspondence to with-inner-frame format when the photosensitive material is processed in accordance with the with-inner-frame format, whereas controlling the cutter unit and the transporter to cut the photosensitive material at a specified length in correspondence to without-inner-frame format and trim off an unnecessary end portion of the photosensitive material when the photosensitive material is processed in accordance with the without-inner-frame format.

According to this arrangement, when the with-inner-frame format is designated, the photosensitive material after the printing is cut at the corresponding specified length by the cutter unit. On the other hand, when the without-inner-frame format is designated, the photosensitive material is cut by the corresponding specified length, and then, the adjacent printed end portion thereof is trimmed off. As a result, there can be eliminated that the adjacent printed end portions (ends portions of the exposed portions) are left in an overlapped manner, which is not desirable as a finished state. Further, this arrangement makes it possible to cope with the serial printing in which images are serially printed using a roll of photographic material wound around the spool and cut according to the without-inner-frame format.

Preferably, the photographic processing system may further comprise a refuse collector disposed below the cutter unit for collecting refuse of the photosensitive material produced by trimming off the unnecessary end portion of the photosensitive material therein, and a guide member for guiding the refuse into the refuse collector.

According to this arrangement, the unnecessary printed end portion trimmed off by the cutter unit is guided into the refuse collector guided by the guide member. As a result, even if the unnecessary printed end portion flips back during the trimming operation, the flipped end portion is securely collected in the refuse collector.

Preferably, the photographic processing system may further comprise a refuse collector disposed below the cutter unit for collecting refuse of the photosensitive material produced by trimming off the unnecessary end portion of the photosensitive material therein, a guide member movable between a transport guide position for securing a transport route for the photosensitive material and a refuse guide position for closing the transport route for the photosensitive material while guiding the refuse of the photosensitive material into the refuse collector, and guide drive controller means for selectively setting the guide member at the refuse guide position when the unnecessary end portion of the photosensitive material is trimmed off and the transport guide position when the photosensitive material is cut at the specified length.

According to this arrangement, the unnecessary printed end portion trimmed off by the cutter unit is collected into the refuse collector guided by the guide member, with the guide member set at the position for closing the transport route for the photosensitive material. As a result, even if the unnecessary printed end portion flips back during the trimming operation, it is securely collected into the refuse collector. Further, the transport guide member and the refuse guide member can be commonly used, which reduces the number of parts. In addition, there can be eliminated the problem that the flipped back refuse is intruded in the transport assembly which may cause jam of the photosensitive material.

Exploitation in Industry

The present invention is directed to a photographic processing system comprising: a first printing section including a printing unit for printing a film image onto a photosensitive material by projection; a second printing section including a printing unit for printing image data onto the photosensitive material by converting the image data into a light signal and outputting the light signal; and a common developing section for developing the printed image on the photosensitive material, wherein the first and second printing sections each has a magazine loader unit for mounting thereon a magazine including therein the photosensitive material in a roll form, and a transporter for transporting the photosensitive material drawn out from one of the magazines to the developing section via corresponding one of the printing units. With this arrangement, a composite image of picture image and character image can be efficiently printed. Further, even in the case of printing a picture image on a film, the printing efficiency is not lowered, while ensuring the system of a compact size.

What is claimed is:

1. A photographic processing system, comprising:
    a first printing section including a printing unit for printing a film image onto photosensitive material by projection;
    a second printing section including a printing unit for printing image data onto photosensitive material by converting the image data into a light signal and outputting the light signal onto the photosensitive material to expose a print image;
    a common developing section for developing the print image and the film image on the photosensitive material;
    the first and second printing sections each having a magazine loader unit for mounting a magazine including therein the photosensitive material in a roll, and a transporter for transporting the photosensitive material from the magazine downstream to the developing section via a corresponding one of the printing units;

the transporter of the second printing section including:
a loop forming section disposed upstream of the printing unit of the second printing section for temporarily storing the photosensitive material in a loop and transporting the photosensitive material in the downstream direction and an upstream direction;
a storage section disposed downstream of the printing unit for temporarily storing the photosensitive material transported from the loop forming section via the printing unit;
a guide member for guiding the photosensitive material fed out from the loop forming section into the storage section; and
transport drive controller means for controlling the loop forming section to:
feed the photosensitive material from the loop forming section in the downstream direction passing the printing unit, without effecting printing, at least an image distance of the print image; and
to then feed back the photosensitive material in the upstream direction by the image distance, passing the photosensitive material by the printing unit and effecting printing of the print image in the second printing section.

2. The photographic processing system as set forth in claim 1, further comprising:
the guide member being disposable at a first position for guiding the photosensitive material transported from the loop forming section toward the storage section of the second printing section, and disposable at a second position whereat the photosensitive material is not passed to the storage section;
a guide driver means for positioning the guide member at said first position and said second position; and
the transport drive controller means controlling the guide driver means to direct the photosensitive material to the storage section only when a first frame image of the roll of the photosensitive material is printed by the printing unit of the second printing section.

3. The photographic processing system as set forth in claim 1, wherein the printing unit of the second printing section includes an image display device having a fiber optic cathode ray tube (FOCRT) for performing a contact-type exposure.

4. The photographic processing system as set forth in claim 1, wherein the printing unit of the second printing section includes:
an image display device for performing a contact-type exposure at a light emitting plane surface;
a presser member for rendering the photosensitive material in contact with the light emitting plane surface of the image display device; and
a presser member driver for moving the presser member to a first position placing the photosensitive material in pressing contact with the light emitting plane surface and a second position in spaced relation to the light emitting plane surface to permit the photosensitive material to pass the light emitting plane surface when an exposure is not effected.

5. The photographic processing system as set forth in claim 4, wherein the presser member has a pressing pad for contacting the photosensitive material, an attachment plate for mounting the pressing pad thereon, and a bias member for biasing the pressing pad in a direction away from the attachment plate.

6. A photographic processing system, comprising:
a first printing section including a printing unit for printing a film image onto photosensitive material by projection to expose a print image;
a second printing section including a printing unit for printing image data onto photosensitive material by converting the image data into a light signal and outputting the light signal onto the photosensitive material to expose a print image;
a common developing section for developing the print image on the photosensitive material from the first printing section and the second printing section;
the second printing section including:
a magazine storage area for storing the photosensitive material in a roll form; and
a transporter for transporting the photosensitive material in upstream and downstream directions, the transporter transporting the photosensitive material from the magazine storage area in the downstream direction to the developing section via the printing unit,
the transporter of the second printing section including:
a storage section disposed downstream of the printing unit for temporarily storing the photosensitive material transported from the magazine storage area via the printing unit;
a guide member for guiding the photosensitive material, after passing the printing unit, into the storage section; and
transport drive controller means for controlling the transporter to:
feed the photosensitive material from the magazine storage area in the downstream direction passing the printing unit, without effecting printing, at least an image distance of the print image; and
to then feed back the photosensitive material in an upstream direction by the image distance, passing the photosensitive material by the printing unit and effecting printing of the print image in the second printing section.

7. The photographic processing system of claim 6, further comprising:
the guide member being disposable at:
a first position for guiding the photosensitive material transported from the magazine storage area toward the storage section of the second printing section; and
at a second position whereat the photosensitive material is not guided to the storage section and is directed to the common developing section;
a guide driver means for positioning the guide member at said first position and said second position; and
the transport drive controller means controlling the guide driver means to direct the photosensitive material to the storage section only when a first frame image of the roll of the photosensitive material is printed by the printing unit of the second printing section.

8. The photographic processing system as set forth in claim 7, wherein the printing unit of the second printing section includes:
an image display device for performing a contact-type exposure at a light emitting plane surface;
a presser member for rendering the photosensitive material in contact with the light emitting plane surface of the image display device; and a presser member driver for moving the presser member to a first position placing the photosensitive material in pressing contact with the light emitting plane surface and a second position in spaced relation to the light emitting plane surface to permit the photosensitive material to pass the light emitting plane surface when an exposure is not effected.

9. The photographic processing system as set forth in claim 8, wherein said transport drive controller means includes means for:

controlling said presser member driver to position said presser member at said second position and said guide driver means to position said guide member to said first position such that, when said photographic material is guided in the downstream direction into the storage section, said presser member is spaced from the light emitting plane surface; and controlling said presser member driver to position said presser member at said first position such that, when said photographic material is transported in the upstream direction from the storage section to effect printings said presser member places said photographic material into pressing contact with the light emitting plane surface.

10. The photographic processing system as set forth in claim 9, wherein the presser member has a pressing pad for contacting the photosensitive material, an attachment plate for mounting the pressing pad thereon, and a bias member for biasing the pressing pad in a direction away from the attachment plate.

11. The photographic processing system as set forth in claim 10, wherein the printing unit of the second printing section includes an image display device having a fiber optic cathode ray tube (FOCRT) for performing a contact-type exposure.

12. The photographic processing system as set forth in claim 9, wherein the printing unit of the second printing section includes an image display device having a fiber optic cathode ray tube (FOCRT) for performing a contact-type exposure.

13. A photographic processing system, comprising:

a printing section including a printing unit for printing an image onto photosensitive material by exposure;

a developing section for developing the print image on the photosensitive material exposed by the printing section;

the printing section including:
  a magazine storage area for storing the photosensitive material in a roll form; and
  a transporter for transporting the photosensitive material in upstream and downstream directions, the transporter transporting the photosensitive material from the magazine storage area in the downstream direction to the developing section via the printing unit;

the transporter of the printing section including:
  storage section disposed downstream of the printing unit for temporarily storing the photosensitive material transported from the magazine storage area via the printing unit;
  a guide member for selectively guiding the photosensitive material, after passing the printing unit, to pass into one of the storage section and the developing section; and
  transport drive controller means for controlling the transporter to:
    feed the photosensitive material from the magazine storage area in the downstream direction passing the printing unit, without effecting printing, at least an image distance of the print image; and
    to then feed back the photosensitive material in an upstream direction by the image distance, passing the photosensitive material by the printing unit and effecting printing of the print image in the printing section.

14. The photographic processing system of claim 13, further comprising:

the guide member being disposable at a first position for guiding the photosensitive material transported from the magazine storage area toward the storage section of the printing section, and disposable at a second position whereat the photosensitive material is not passed to the storage section and is directed to the developing section;

a guide driver means for positioning the guide member at said first position and said second position; and the transport drive controller means controlling the guide driver means to direct the photosensitive material to the storage section only when a first frame image of the roll of the photosensitive material is printed by the printing unit of the printing section.

15. The photographic processing system as set forth in claim 14, wherein the printing unit of the printing section includes:

an image display device for performing a contact-type exposure at a light emitting plane surface;

a presser member for rendering the photosensitive material in contact with the light emitting plane surface of the image display device; and a presser member driver for moving the presser member to a first position placing the photosensitive material in pressing contact with the light emitting plane surface and a second position in spaced relation to the light emitting plane surface to permit the photosensitive material to freely pass the light emitting plane surface when an exposure is not effected.

16. The photographic processing system as set forth in claim 15, wherein said transport drive controller means includes means for:

controlling said presser member driver to position said presser member at said second position and said guide driver means to position said guide member to said first position such that, when said photographic material is guided in the downstream direction into the storage section, said presser member is spaced from the light emitting plane surface; and controlling said presser member driver to position said presser member at said first position such that, when said photographic material is transported in the upstream direction from the storage section to effect printing, said presser member places said photographic material into pressing contact with the light emitting plane surface.

17. The photographic processing system as set forth in claim 16, wherein the presser member has a pressing pad for contacting the photosensitive material, an attachment plate for mounting the pressing pad thereon, and a bias member for biasing the pressing pad in a direction away from the attachment plate.

18. The photographic processing system as set forth in claim 17, wherein the printing unit of the printing section includes an image display device having a fiber optic cathode ray tube (FOCRT) for performing a contact-type exposure.

19. The photographic processing system as set forth in claim 16, wherein the printing unit of the printing section includes an image display device having a fiber optic cathode ray tube (FOCRT) for performing a contact-type exposure.

* * * * *

UNITED STATES PATENT AND TRADEMARK OFFICE
CERTIFICATE OF CORRECTION

PATENT NO.    : 6,229,591 B1
DATED         : May 8, 2001
INVENTOR(S)   : Eiji Motooka et al.

It is certified that error appears in the above-identified patent and that said Letters Patent is hereby corrected as shown below:

<u>Title page,</u>
Item [87], please insert the following information:

-- Item [87]    PCT Pub. No.:    WO98/58292
                PCT Pub. Date:   December 23, 1998 --

Signed and Sealed this

Nineteenth Day of March, 2002

Attest:

JAMES E. ROGAN
*Attesting Officer*    *Director of the United States Patent and Trademark Office*